(12) United States Patent
Fukushima et al.

(10) Patent No.: US 7,043,594 B2
(45) Date of Patent: May 9, 2006

(54) LOCAL BUS BRIDGE

(75) Inventors: Kengo Fukushima, Tokyo (JP); Hideki Kochii, Tokyo (JP); Tetsuya Takeshita, Tokyo (JP)

(73) Assignee: NEC Engineering, Ltd., Tokyo (JP)

( * ) Notice: Subject to any disclaimer, the term of this patent is extended or adjusted under 35 U.S.C. 154(b) by 281 days.

(21) Appl. No.: 10/391,024

(22) Filed: Mar. 19, 2003

(65) Prior Publication Data

US 2003/0188081 A1 Oct. 2, 2003

(30) Foreign Application Priority Data

Mar. 28, 2002 (JP) ............................. 2002-090130

(51) Int. Cl.
*G06F 13/36* (2006.01)
(52) U.S. Cl. ...................... 710/314; 710/311; 710/306
(58) Field of Classification Search ............... 710/306, 710/311, 313–314
See application file for complete search history.

(56) References Cited

U.S. PATENT DOCUMENTS

| | | | | |
|---|---|---|---|---|
| 5,848,249 | A * | 12/1998 | Garbus et al. ............... | 710/311 |
| 6,131,119 | A * | 10/2000 | Fukui .......................... | 709/224 |
| 6,141,767 | A * | 10/2000 | Hu et al. ...................... | 714/1 |
| 6,219,697 | B1 * | 4/2001 | Lawande et al. ............ | 709/221 |
| 6,378,000 | B1 * | 4/2002 | Akatsu et al. ............... | 709/245 |
| 6,389,496 | B1 * | 5/2002 | Matsuda ...................... | 710/316 |
| 6,480,889 | B1 * | 11/2002 | Saito et al. .................. | 709/220 |
| 6,496,862 | B1 * | 12/2002 | Akatsu et al. ............... | 709/224 |
| 6,523,064 | B1 * | 2/2003 | Akatsu et al. ............... | 709/226 |
| 6,539,450 | B1 * | 3/2003 | James et al. ................. | 710/306 |
| 6,633,547 | B1 * | 10/2003 | Akatsu et al. ............... | 370/255 |
| 6,751,697 | B1 * | 6/2004 | Shima et al. ................ | 710/306 |
| 6,754,184 | B1 * | 6/2004 | Miyano et al. .............. | 370/257 |
| 2001/0023452 | A1 * | 9/2001 | Spalink et al. .............. | 709/232 |

(Continued)

FOREIGN PATENT DOCUMENTS

EP 933900 A2 * 8/1999

(Continued)

OTHER PUBLICATIONS

IEEE Standards Board; "P1394.1 Draft Standard for High Performance Serial Bus Bridges"; IEEE Standards Board; Draft 0.02; Mar. 13, 1997; all pages.*

(Continued)

*Primary Examiner*—Paul R. Myers
*Assistant Examiner*—Ryan Stiglic
(74) *Attorney, Agent, or Firm*—Foley & Lardner LLP

(57) ABSTRACT

In a serial bus network, an environment is provided, in which the serial bus is divided to two local buses and a specific terminal connected to one of the local buses can reliably occupy other terminals connected to the other local bus without influence on the terminals connected to the local buses. A specific terminal is connected to a local bus 101, to which an inner portal 3 is connected, and an ID information thereof is preliminarily recorded in a ROM 8. After a power source is turned on, the specific terminal connected to the side of the inner portal 3 is detected according to the ID information from the ROM 8. An ID information of all of nodes connected to a local bus 104, to which an outer portal 4 is connected, is read out and stored in a control portion 5. A bus reset is generated on the local bus 101. In order to give a connection information of the local bus 104, a self-ID packet is generated by the control portion 5 and transmits it through a dedicated PHY 6.

18 Claims, 51 Drawing Sheets

U.S. PATENT DOCUMENTS

2001/0043731 A1* 11/2001 Ito et al. .................... 382/132
2002/0059179 A1* 5/2002 Sato et al. .................... 707/1
2002/0085505 A1* 7/2002 Suda .......................... 370/253

FOREIGN PATENT DOCUMENTS

| EP | 1085706 | A2 | * | 3/2001 |
| EP | 1175044 | A2 | * | 1/2002 |
| EP | 1089497 | B1 | | 12/2004 |
| JP | 11-220485 | | | 8/1999 |
| JP | 2001-103085 | | | 4/2001 |

OTHER PUBLICATIONS

IEEE Standards Board; "IEEE Standard for a High Performance Serial Bus"; IEEE Standards Board; IEEE Std 1394-1995; Jul. 22, 1996; various pages.*

* cited by examiner

| 531a | 531b | 531c |
|---|---|---|
| Portal A node mng no | Portal A tx perf code | Portal A node ID |
| 0000 0000(h) | 00 | 00 0000 |

| 531d | 531e | 531f | 531g | 531h | 531i | 531j | 531k | 531l |
|---|---|---|---|---|---|---|---|---|
| Portal B node mng no | Portal B tx perf code | Portal B node ID | Portal B node mng no act fl | Portal B node act fl | Portal B self node fl | Portal B root fl | Portal B cntndr fl | virtual port mng no (pointer) |
| 0000 0000(h) | 10(b) | 11 1111(b) | 0 | 0 | 1 | 1 | 1 | 00 |
| 0000 0000(h) | 00(b) | 11 1111(b) | 0 | 0 | 0 | 0 | 0 | 01 |
| 0000 0000(h) | 00(b) | 11 1111(b) | 0 | 0 | 0 | 0 | 0 | 02 |
| 0000 0000(h) | 00(b) | 11 1111(b) | 0 | 0 | 0 | 0 | 0 | 03 |
| 0000 0000(h) | 00(b) | 11 1111(b) | 0 | 0 | 0 | 0 | 0 | 04 |
| 0000 0000(h) | 00(b) | 11 1111(b) | 0 | 0 | 0 | 0 | 0 | 05 |
| 0000 0000(h) | 00(b) | 11 1111(b) | 0 | 0 | 0 | 0 | 0 | 06 |
| 0000 0000(h) | 00(b) | 11 1111(b) | 0 | 0 | 0 | 0 | 0 | 07 |
| 0000 0000(h) | 00(b) | 11 1111(b) | 0 | 0 | 0 | 0 | 0 | 08 |
| 0000 0000(h) | 00(b) | 11 1111(b) | 0 | 0 | 0 | 0 | 0 | 09 |
| 0000 0000(h) | 00(b) | 11 1111(b) | 0 | 0 | 0 | 0 | 0 | 10 |
| 0000 0000(h) | 00(b) | 11 1111(b) | 0 | 0 | 0 | 0 | 0 | 11 |
| 0000 0000(h) | 00(b) | 11 1111(b) | 0 | 0 | 0 | 0 | 0 | 12 |
| 0000 0000(h) | 00(b) | 11 1111(b) | 0 | 0 | 0 | 0 | 0 | 13 |
| 0000 0000(h) | 00(b) | 11 1111(b) | 0 | 0 | 0 | 0 | 0 | 14 |

PKT0

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| 1 | 0 | | phy ID | | | | | 0 | L | | | gap cnt | | | | sp | | del | | c | | pwr | | p0 | | p1 | | p2 | | i | m |
| 1 | 0 | | Portal A PHY ID | | | | | 0 | 1 | | | 11 1111 | | | | SPEED | | 00 | | 1 | | 000 | | 11 | | PAPort | | PB#0 | | | 1 |

Fig. 7B

PKT1

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| 1 | 0 | | phy ID | | | | | 1 | | n | | rsv | | p3 | | p4 | | p5 | | p6 | | p7 | | p8 | | p9 | | p10 | | r | m |
| 1 | 0 | | Portal A PHY ID | | | | | 1 | | 0 | | 0 | | PB#1 | | PB#2 | | PB#3 | | PB#4 | | PB#5 | | PB#6 | | PB#7 | | PB#8 | | | 1 |

Fig. 7C

PKT2

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| 1 | 0 | | phy ID | | | | | 1 | | n | | rsv | | p11 | | p12 | | p13 | | p14 | | p15 | | reserve | | | | | | | |
| 1 | 0 | | Portal A PHY ID | | | | | 1 | | 1 | | 0 | | PB#9 | | PB#10 | | PB#11 | | PB#12 | | PB#13 | | 0000 0000 | | | | | | | |

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| 1 | 0 | phy ID | | | | | | 0 | L | gap cnt | | | | | | sp | | del | | c | pwr | | | p0 | | p1 | | p2 | | i | m |
| 1 | 0 | Portal A PHY ID | | | | | | 0 | 1 | 11 1111 | | | | | | SP | | 00 | | c | 000 | | | PB#n | | 00 | | 00 | | 0 | 0 |

Fig. 8

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| 1 | 0 | phy ID | | | | | | 0 | L | gap cnt | | | | | | sp | | del | | c | | pwr | | p0 | | p1 | | p2 | | i | m |
| 1 | 0 | 00 0000 | | | | | | 0 | L | 11 1111 | | | | | | SPEED | | DELAY | | C | | POWER | | 10 | | 01 | | 00 | | 0 | 0 |

PKT0

Fig. 14A

PKT1

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|----|----|----|----|----|----|----|----|----|----|----|----|----|----|----|----|----|----|----|----|----|----|
| 1 | 0 | phy ID | | | | | | 0 | L | gap cnt | | | | | | sp | | del | | c | | pwr | | p0 | | p1 | | p2 | | i | m |
| 1 | 0 | 00 0001 | | | | | | 0 | 1 | 11 1111 | | | | | | 10 | | 00 | | 0 | | 000 | | 11 | | 01 | | 01 | | 1 | 1 |

Fig. 14B

PKT2

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|----|----|----|----|----|----|----|----|----|----|----|----|----|----|----|----|----|----|----|----|----|----|
| 1 | 0 | phy ID | | | | | | 1 | n | rsv | | | | p3 | | p4 | | p5 | | p6 | | p7 | | p8 | | p9 | | p10 | | i | m |
| 1 | 0 | 00 0001 | | | | | | 1 | 0 | 0 | | | | 01 | | 01 | | 01 | | 01 | | 01 | | 01 | | 01 | | 01 | | 1 | 1 |

Fig. 14C

PKT3

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|----|----|----|----|----|----|----|----|----|----|----|----|----|----|----|----|----|----|----|----|----|----|
| 1 | 0 | phy ID | | | | | | 1 | n | rsv | | | | p11 | | p12 | | p13 | | p14 | | p15 | | reserve | | | | | | | |
| 1 | 0 | 00 0001 | | | | | | 1 | 1 | 0 | | | | 01 | | 01 | | 01 | | 01 | | 01 | | 0000 0000 | | | | | | | |

PKT0

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|----|----|----|----|----|----|----|----|----|----|----|----|----|----|----|----|----|----|----|----|----|----|
| 1 | 0 | phy ID | | | | | | 0 | L | gap cnt | | | | | | sp | | del | | c | pwr | | | p0 | | p1 | | p2 | | i | m |
| 1 | 0 | 00 0000 | | | | | | 0 | 1 | GAP COUNT | | | | | | SPEED | | DELAY | | C | POWER | | | 10 | | 01 | | 00 | | 0 | 0 |

Fig. 20B

PKT1

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|----|----|----|----|----|----|----|----|----|----|----|----|----|----|----|----|----|----|----|----|----|----|
| 1 | 0 | phy ID | | | | | | 0 | L | gap cnt | | | | | | sp | | del | | c | pwr | | | p0 | | p1 | | p2 | | i | m |
| 1 | 0 | 00 0001 | | | | | | 0 | 1 | GAP COUNT | | | | | | SPEED | | DELAY | | C | POWER | | | 10 | | 01 | | 00 | | 0 | 0 |

Fig. 20C

PKT2

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|----|----|----|----|----|----|----|----|----|----|----|----|----|----|----|----|----|----|----|----|----|----|
| 1 | 0 | phy ID | | | | | | 0 | L | gap cnt | | | | | | sp | | del | | c | pwr | | | p0 | | p1 | | p2 | | i | m |
| 1 | 0 | 00 0010 | | | | | | 0 | 1 | GAP COUNT | | | | | | SPEED | | DELAY | | C | POWER | | | 10 | | 11 | | 00 | | 1 | 0 |

PKT3

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|----|----|----|----|----|----|----|----|----|----|----|----|----|----|----|----|----|----|----|----|----|----|
| 1 | 0 | \multicolumn{6}{|c|}{phy ID} | 0 | L | \multicolumn{6}{|c|}{gap cnt} | \multicolumn{2}{|c|}{sp} | \multicolumn{2}{|c|}{del} | c | \multicolumn{3}{|c|}{pwr} | \multicolumn{2}{|c|}{p0} | \multicolumn{2}{|c|}{p1} | \multicolumn{2}{|c|}{p2} | i | m |
| 1 | 0 | 0 | 0 | 0 | 1 | 0 | 1 | 0 | 1 | 1 | 1 | 1 | 1 | 1 | 1 | 1 | 0 | 0 | 0 | 1 | 0 | 0 | 0 | 1 | 1 | 1 | 1 | 0 | 1 | 0 | 1 |

Fig. 20D

PKT4

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|----|----|----|----|----|----|----|----|----|----|----|----|----|----|----|----|----|----|----|----|----|----|
| 1 | 0 | \multicolumn{6}{|c|}{phy ID} | 1 | \multicolumn{2}{|c|}{n} | \multicolumn{3}{|c|}{rsv} | \multicolumn{2}{|c|}{p3} | \multicolumn{2}{|c|}{p4} | \multicolumn{2}{|c|}{p5} | \multicolumn{2}{|c|}{p6} | \multicolumn{2}{|c|}{p7} | \multicolumn{2}{|c|}{p8} | \multicolumn{2}{|c|}{p9} | \multicolumn{2}{|c|}{p10} | i | m |
| 1 | 0 | 0 | 0 | 0 | 1 | 0 | 1 | 1 | 1 | 0 | 0 | 0 | 0 | 0 | 1 | 0 | 1 | 0 | 1 | 0 | 1 | 0 | 1 | 0 | 1 | 0 | 1 | 0 | 1 | 0 | 1 |

Fig. 20E

PKT5

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|----|----|----|----|----|----|----|----|----|----|----|----|----|----|----|----|----|----|----|----|----|----|
| 1 | 0 | \multicolumn{6}{|c|}{phy ID} | 1 | \multicolumn{2}{|c|}{n} | \multicolumn{3}{|c|}{rsv} | \multicolumn{2}{|c|}{p11} | \multicolumn{2}{|c|}{p12} | \multicolumn{2}{|c|}{p13} | \multicolumn{2}{|c|}{p14} | \multicolumn{2}{|c|}{p15} | \multicolumn{6}{|c|}{reserve} |
| 1 | 0 | 0 | 0 | 0 | 1 | 0 | 1 | 1 | 1 | 1 | 0 | 0 | 0 | 0 | 1 | 0 | 1 | 0 | 1 | 0 | 1 | 0 | 1 | 0 | 1 | 0 | 0 | 0 | 0 | 0 | 0 |

Fig. 20F

| 531a | 531b | 531c |
|---|---|---|
| Portal A node mng no | Portal A tx perf code | Portal A node ID |
| 0000 0001(h) | 01 | 00 0001 |

| | 531d | 531e | 531f | 531g | 531h | 531i | 531j | 531k | 531l |
|---|---|---|---|---|---|---|---|---|---|
| | Portal B node mng no | Portal B tx perf code | Portal B node ID | Portal B node mng no act fl | Portal B node act fl | Portal B self node fl | Portal B root fl | Portal B cntndr fl | virtual port mng no (pointer) |
| 00 0011 | 0000 0000(h) | 10(b) | 11 1111(b) | 0 | 0 | 1 | 1 | 1 | 00 |
| 11 1111 | 0000 0000(h) | 00(b) | 11 1111(b) | 0 | 0 | 0 | 0 | 0 | 01 |
| 11 1111 | 0000 0000(h) | 00(b) | 11 1111(b) | 0 | 0 | 0 | 0 | 0 | 02 |
| 11 1111 | 0000 0000(h) | 00(b) | 11 1111(b) | 0 | 0 | 0 | 0 | 0 | 03 |
| 11 1111 | 0000 0000(h) | 00(b) | 11 1111(b) | 0 | 0 | 0 | 0 | 0 | 04 |
| 11 1111 | 0000 0000(h) | 00(b) | 11 1111(b) | 0 | 0 | 0 | 0 | 0 | 05 |
| 11 1111 | 0000 0000(h) | 00(b) | 11 1111(b) | 0 | 0 | 0 | 0 | 0 | 06 |
| 11 1111 | 0000 0000(h) | 00(b) | 11 1111(b) | 0 | 0 | 0 | 0 | 0 | 07 |
| 11 1111 | 0000 0000(h) | 00(b) | 11 1111(b) | 0 | 0 | 0 | 0 | 0 | 08 |
| 11 1111 | 0000 0000(h) | 00(b) | 11 1111(b) | 0 | 0 | 0 | 0 | 0 | 09 |
| 11 1111 | 0000 0000(h) | 00(b) | 11 1111(b) | 0 | 0 | 0 | 0 | 0 | 10 |
| 11 1111 | 0000 0000(h) | 00(b) | 11 1111(b) | 0 | 0 | 0 | 0 | 0 | 11 |
| 11 1111 | 0000 0000(h) | 00(b) | 11 1111(b) | 0 | 0 | 0 | 0 | 0 | 12 |
| 11 1111 | 0000 0000(h) | 00(b) | 11 1111(b) | 0 | 0 | 0 | 0 | 0 | 13 |
| 11 1111 | 0000 0000(h) | 00(b) | 11 1111(b) | 0 | 0 | 0 | 0 | 0 | 14 |

| Portal A node mng no | Portal A tx perf code | Portal A node ID | Portal B node mng no | Portal B tx perf code | Portal B node ID | Portal B node mng no act fl | Portal B node act fl | Portal B self node fl | Portal B root fl | Portal B cntndr fl | virtual port mng no (pointer) |
|---|---|---|---|---|---|---|---|---|---|---|---|
| 0000 0001(h) | 01 | 00 0001 | | | | | | | | | |
| | | 11 1111 | 0000 0000(h) | 00(b) | 00 0000(b) | 0 | 1 | 0 | 0 | 0 | 00 |
| | | 11 1111 | 0000 0000(h) | 00(b) | 00 0001(b) | 0 | 1 | 1 | 0 | 1 | 01 |
| | | 11 1111 | 0000 0000(h) | 00(b) | 00 0010(b) | 0 | 1 | 0 | 0 | 0 | 02 |
| | | 11 1111 | 0000 0000(h) | 00(b) | 00 0011(b) | 0 | 1 | 0 | 1 | 1 | 03 |
| | | 11 1111 | 0000 0000(h) | 00(b) | 11 1111(b) | 0 | 0 | 0 | 0 | 0 | 04 |
| | | 11 1111 | 0000 0000(h) | 00(b) | 11 1111(b) | 0 | 0 | 0 | 0 | 0 | 05 |
| | | 11 1111 | 0000 0000(h) | 00(b) | 11 1111(b) | 0 | 0 | 0 | 0 | 0 | 06 |
| | | 11 1111 | 0000 0000(h) | 00(b) | 11 1111(b) | 0 | 0 | 0 | 0 | 0 | 07 |
| | | 11 1111 | 0000 0000(h) | 00(b) | 11 1111(b) | 0 | 0 | 0 | 0 | 0 | 08 |
| | | 11 1111 | 0000 0000(h) | 00(b) | 11 1111(b) | 0 | 0 | 0 | 0 | 0 | 09 |
| | | 11 1111 | 0000 0000(h) | 00(b) | 11 1111(b) | 0 | 0 | 0 | 0 | 0 | 10 |
| | | 11 1111 | 0000 0000(h) | 00(b) | 11 1111(b) | 0 | 0 | 0 | 0 | 0 | 11 |
| | | 11 1111 | 0000 0000(h) | 00(b) | 11 1111(b) | 0 | 0 | 0 | 0 | 0 | 12 |
| | | 11 1111 | 0000 0000(h) | 00(b) | 11 1111(b) | 0 | 0 | 0 | 0 | 0 | 13 |
| | | 11 1111 | 0000 0000(h) | 00(b) | 11 1111(b) | 0 | 0 | 0 | 0 | 0 | 14 |

| Portal A node mng no (531a) | Portal A tx perf code (531b) | Portal A node ID (531c) |
|---|---|---|
| 0000 0001(h) | 01 | 00 0001 |

| Portal B node mng no (531d) | Portal B tx perf code (531e) | Portal B node ID (531f) | Portal B node mng no act fl (531g) | Portal B node act fl (531h) | Portal B self node fl (531i) | Portal B root fl (531j) | Portal B cntndr fl (531k) | virtual port mng no (pointer) (531l) |
|---|---|---|---|---|---|---|---|---|
| 0000 0002(h) | 10(b) | 00 0000(b) | 1 | 1 | 0 | 0 | 0 | 00 |
| 0000 0000(h) | 00(b) | 00 0001(b) | 0 | 1 | 0 | 0 | 1 | 01 |
| 0000 0003(h) | 01(b) | 00 0010(b) | 1 | 1 | 1 | 0 | 0 | 02 |
| 0000 0004(h) | 10(b) | 00 0011(b) | 1 | 1 | 0 | 1 | 1 | 03 |
| 0000 0000(h) | 00(b) | 11 1111(b) | 0 | 0 | 0 | 0 | 0 | 04 |
| 0000 0000(h) | 00(b) | 11 1111(b) | 0 | 0 | 0 | 0 | 0 | 05 |
| 0000 0000(h) | 00(b) | 11 1111(b) | 0 | 0 | 0 | 0 | 0 | 06 |
| 0000 0000(h) | 00(b) | 11 1111(b) | 0 | 0 | 0 | 0 | 0 | 07 |
| 0000 0000(h) | 00(b) | 11 1111(b) | 0 | 0 | 0 | 0 | 0 | 08 |
| 0000 0000(h) | 00(b) | 11 1111(b) | 0 | 0 | 0 | 0 | 0 | 09 |
| 0000 0000(h) | 00(b) | 11 1111(b) | 0 | 0 | 0 | 0 | 0 | 10 |
| 0000 0000(h) | 00(b) | 11 1111(b) | 0 | 0 | 0 | 0 | 0 | 11 |
| 0000 0000(h) | 00(b) | 11 1111(b) | 0 | 0 | 0 | 0 | 0 | 12 |
| 0000 0000(h) | 00(b) | 11 1111(b) | 0 | 0 | 0 | 0 | 0 | 13 |
| 0000 0000(h) | 00(b) | 11 1111(b) | 0 | 0 | 0 | 0 | 0 | 14 |

PKT0

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| 1 | 0 | phy ID | | | | | | 0 | L | gap cnt | | | | | | sp | | del | | c | | pwr | | p0 | | p1 | | p2 | | i | m |
| 10 | | 00 0000 | | | | | | 0 | 1 | GAP COUNT | | | | | | SPEED | | DELAY | | C | | POWER | | 10 | | 01 | | 00 | | 0 | 1 |

Fig. 28B

PKT1

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| 1 | 0 | phy ID | | | | | | 0 | L | gap cnt | | | | | | sp | | del | | c | | pwr | | p0 | | p1 | | p2 | | i | m |
| 10 | | 00 0001 | | | | | | 0 | 1 | GAP COUNT | | | | | | SPEED | | DELAY | | C | | POWER | | 10 | | 01 | | 00 | | 0 | 1 |

| PKT2 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| | 1 | 0 | phy ID | | | | | 0 | L | gap cnt | | | | | | sp | | del | | c | | pwr | | p0 | | p1 | | p2 | | i | m |
| | 1 | 0 | 00 0010 | | | | | 0 | 1 | GAP COUNT | | | | | | SPEED | | DELAY | | C | | POWER | | 10 | | 11 | | 00 | | 1 | 1 |

Fig. 28C

| PKT3 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| | 1 | 0 | phy ID | | | | | 0 | L | gap cnt | | | | | | sp | | del | | c | | pwr | | p0 | | p1 | | p2 | | i | m |
| | 1 | 0 | 00 0011 | | | | | 0 | 1 | 11 1111 | | | | | | 00 | | 00 | | 0 | | 000 | | 10 | | 00 | | 00 | | 0 | 0 |

Fig. 28D

PKT4:

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|----|----|----|----|----|----|----|----|----|----|----|----|----|----|----|----|----|----|----|----|----|----|
| 1 | 0 | phy ID | | | | | | 0 | L | gap cnt | | | | | | sp | | del | | c | | pwr | | | p0 | p1 | | p2 | | i | m |
| 1 | 0 | 00 0100 | | | | | | 0 | 1 | 11 1111 | | | | | | 10 | | 00 | | 1 | | 000 | | | 11 | 11 | | 11 | | 1 | 1 |

Fig. 28E

PKT5:

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|----|----|----|----|----|----|----|----|----|----|----|----|----|----|----|----|----|----|----|----|----|----|
| 1 | 0 | phy ID | | | | | | 1 | n | | | rsv | | p3 | | p4 | | p5 | | p6 | | p7 | | p8 | | p9 | | p10 | | i | m |
| 1 | 0 | 00 0100 | | | | | | 1 | 0 | | | 0 | | 10 | | 10 | | 01 | | 01 | | 01 | | 01 | | 01 | | 01 | | 0 | 1 |

Fig. 28F

PKT6:

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|----|----|----|----|----|----|----|----|----|----|----|----|----|----|----|----|----|----|----|----|----|----|
| 1 | 0 | phy ID | | | | | | 1 | n | | | rsv | | p11 | | p12 | | p13 | | p14 | | p15 | | reserve | | | | | | | |
| 1 | 0 | 00 0100 | | | | | | 1 | 1 | | | 0 | | 01 | | 01 | | 01 | | 01 | | 01 | | 0000 0000 | | | | | | | |

Fig. 28G

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| 1 | 0 | phy ID | | | | | | 0 | L | gap cnt | | | | | | sp | | del | | c | pwr | | | p0 | | p1 | | p2 | | i | m |
| 10 | | 00 0101 | | | | | | 0 | 1 | 11 1111 | | | | | | 01 | | 00 | | 0 | 000 | | | 11 | | 00 | | 00 | | 0 | 0 |

PKT7

Fig. 28H

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| 1 | 0 | phy ID | | | | | | 0 | L | gap cnt | | | | | | sp | | del | | c | pwr | | | p0 | | p1 | | p2 | | i | m |
| 10 | | 00 0110 | | | | | | 0 | 1 | 11 1111 | | | | | | 10 | | DELAY | | 1 | power | | | 11 | | 00 | | 00 | | 0 | 0 |

PKT8

Fig. 28I

| Portal A node mng no | Portal A tx perf code | Portal A node ID | | | | | | | | | | |
|---|---|---|---|---|---|---|---|---|---|---|---|---|
| 0000 0001(h) | 01 | 00 0001 | | | | | | | | | | |

| | | Portal B node mng no (531d) | Portal B tx perf code (531e) | Portal B node ID (531f) | Portal B node mng no act fl (531g) | Portal B node act fl (531h) | Portal B self node fl (531i) | Portal B root fl (531j) | Portal B cntndr fl (531k) | virtual port mng no (pointer) (531l) |
|---|---|---|---|---|---|---|---|---|---|---|
| | 00 0011 | 0000 0002(h) | 00(b) | 11 1111(b) | 1 | 0 | 0 | 0 | 0 | 00 |
| | 00 0100 | 0000 0000(h) | 00(b) | 00 0000(b) | 0 | 1 | 1 | 0 | 1 | 01 |
| | 00 0101 | 0000 0003(h) | 01(b) | 00 0001(b) | 1 | 1 | 0 | 0 | 0 | 02 |
| | 00 0110 | 0000 0004(h) | 10(b) | 00 0010(b) | 1 | 1 | 0 | 1 | 1 | 03 |
| | 11 1111 | 0000 0000(h) | 00(b) | 11 1111(b) | 0 | 0 | 0 | 0 | 0 | 04 |
| | 11 1111 | 0000 0000(h) | 00(b) | 11 1111(b) | 0 | 0 | 0 | 0 | 0 | 05 |
| | 11 1111 | 0000 0000(h) | 00(b) | 11 1111(b) | 0 | 0 | 0 | 0 | 0 | 06 |
| | 11 1111 | 0000 0000(h) | 00(b) | 11 1111(b) | 0 | 0 | 0 | 0 | 0 | 07 |
| | 11 1111 | 0000 0000(h) | 00(b) | 11 1111(b) | 0 | 0 | 0 | 0 | 0 | 08 |
| | 11 1111 | 0000 0000(h) | 00(b) | 11 1111(b) | 0 | 0 | 0 | 0 | 0 | 09 |
| | 11 1111 | 0000 0000(h) | 00(b) | 11 1111(b) | 0 | 0 | 0 | 0 | 0 | 10 |
| | 11 1111 | 0000 0000(h) | 00(b) | 11 1111(b) | 0 | 0 | 0 | 0 | 0 | 11 |
| | 11 1111 | 0000 0000(h) | 00(b) | 11 1111(b) | 0 | 0 | 0 | 0 | 0 | 12 |
| | 11 1111 | 0000 0000(h) | 00(b) | 11 1111(b) | 0 | 0 | 0 | 0 | 0 | 13 |
| | 11 1111 | 0000 0000(h) | 00(b) | 11 1111(b) | 0 | 0 | 0 | 0 | 0 | 14 |

Fig. 32

PKT0

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|----|----|----|----|----|----|----|----|----|----|----|----|----|----|----|----|----|----|----|----|----|----|
| 1 | 0 | phy ID | | | | | | 0 | L | gap cnt | | | | | | sp | | del | | c | | pwr | | p0 | | p1 | | p2 | | i | m |
| 1 | 0 | 00 0000 | | | | | | 0 | 1 | GAP COUNT | | | | | | SPEED | | DELAY | | C | | POWER | | 10 | | 01 | | 00 | | 0 | 1 |

Fig. 36A

PKT1

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|----|----|----|----|----|----|----|----|----|----|----|----|----|----|----|----|----|----|----|----|----|----|
| 1 | 0 | phy ID | | | | | | 0 | L | gap cnt | | | | | | sp | | del | | c | | pwr | | p0 | | p1 | | p2 | | i | m |
| 1 | 0 | 00 0001 | | | | | | 0 | 1 | GAP COUNT | | | | | | SPEED | | DELAY | | C | | POWER | | 10 | | 01 | | 00 | | 0 | 1 |

Fig. 36B

PKT2

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|----|----|----|----|----|----|----|----|----|----|----|----|----|----|----|----|----|----|----|----|----|----|
| 1 | 0 | phy ID | | | | | | 0 | L | gap cnt | | | | | | sp | | del | | c | | pwr | | p0 | | p1 | | p2 | | i | m |
| 1 | 0 | 00 0010 | | | | | | 0 | 1 | GAP COUNT | | | | | | SPEED | | DELAY | | C | | POWER | | 10 | | 11 | | 00 | | 0 | 1 |

Fig. 36C

| PKT3 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| | 1 | 0 | phy ID | | | | | 0 | L | gap cnt | | | | | | sp | | del | | c | pwr | | | p0 | | p1 | | p2 | | i | m |
| | 1 | 0 | 00 0011 | | | | | 0 | 1 | 11 1111 | | | | | | SPEED | | 00 | | C | 000 | | | 10 | | 00 | | 00 | | 0 | 1 |

Fig. 36D

| PKT4 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| | 1 | 0 | phy ID | | | | | 0 | L | gap cnt | | | | | | sp | | del | | c | pwr | | | p0 | | p1 | | p2 | | i | m |
| | 1 | 0 | 00 0100 | | | | | 0 | 1 | 11 1111 | | | | | | SPEED | | 00 | | C | 000 | | | 10 | | 00 | | 00 | | 0 | 1 |

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|----|----|----|----|----|----|----|----|----|----|----|----|----|----|----|----|----|----|----|----|----|----|
| 1 | 0 | phy ID | | | | | | 0 | L | gap cnt | | | | | | sp | | del | | c | | pwr | | p0 | | p1 | | p2 | | i | m |
| 1 0 | | 00 0101 | | | | | | 0 | 1 | 1 1 1 1 1 1 | | | | | | SPEED | | 0 0 | | 1 | | 0 0 0 | | 1 1 | | 1 1 | | 1 1 | | 0 | 1 |

PKT5

Fig. 36G

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|----|----|----|----|----|----|----|----|----|----|----|----|----|----|----|----|----|----|----|----|----|----|
| 1 | 0 | phy ID | | | | | | 1 | n | | | rsv | | p3 | | p4 | | p5 | | p6 | | p7 | | p8 | | p9 | | p10 | | i | m |
| 1 0 | | 00 0101 | | | | | | 1 | 0 | | | 0 | | 1 1 | | 0 1 | | 0 1 | | 0 1 | | 0 1 | | 0 1 | | 0 1 | | 0 1 | | 0 | 1 |

PKT6

Fig. 36H

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|----|----|----|----|----|----|----|----|----|----|----|----|----|----|----|----|----|----|----|----|----|----|
| 1 | 0 | phy ID | | | | | | 1 | n | | | rsv | | p11 | | p12 | | p13 | | p14 | | p15 | | reserve | | | | | | | |
| 1 0 | | 00 0101 | | | | | | 1 | 1 | | | 0 | | 0 1 | | 0 1 | | 0 1 | | 0 1 | | 0 1 | | 0000 0000 | | | | | | | |

PKT7

LOCAL BUS BRIDGE

BACKGROUND OF THE INVENTION

1. Field of the Invention

The present invention relates to a local bus bridge and, in particular, the present invention relates to a local bus bridge for dividing a serial bus into first and second local buses to mutually send/receive information between nodes connected to the local buses.

2. Description of Related Art

There has been recent tendency for the performance of computers to become higher and higher, and peripheral devices such as memory devices thereof are advanced correspondingly. Historically, electric or electronic products for home use have been clearly distinguished from computerized products. However, the computerization of home use products and the digitalization of home use products have advanced, so that an environment, in which both can co-exist has become necessary.

Under such background, as an interface capable of realizing a high speed transfer of a large amount of data, there is a high speed serial bus standardized by IEEE (The Institute of Electrical and Electronics Engineers) 1394. The high speed serial bus will be referred to as IEEE1394 bus, hereinafter. The IEEE1394 bus is described in "IEEE Standard for a High Performance Serial Bus", which will be referred to as IEEE1394-1995, hereinafter.

In the IEEE1394-1995, the data transfer speed is defined as 100 Mbps, 200 Mbps and 400 Mbps. Further, in IEEE1394.b, which is an expanded standard of the IEEE1394-1995, the maximum data transfer speed is defined as 3200 Mbps.

A signal line is constructed with shielded twisted pairs and is driven by a small amplitude differential signal by taking anti noise characteristics thereof into consideration. Data is constructed with a data portion and a strobe portion, and a clock signal is generated on a receiving side by an exclusive OR of the data portion and the strobe portion.

An example of a network constructed by using the IEEE1394 bus is shown in FIG. 38. The IEEE1394 bus employs a cable 2100, which can be easily handled and has a simple construction. Further, the connection configuration is not limited to the daisy chain connection such as nodes (terminal devices) 2101 to 210n as in the SCSI (Small Computer System Interface). It is possible to connect the node 2101 through nodes 2111, 2121 and 2122 to other nodes 2131 to 2134 by branching the connection at nodes each having a plurality of ports 2130.

An important feature of the IEEE1394 bus is that an addition of a new node to or deletion of a node from a network of the IEEE1394 bus can be done without turning a power source off. In the IEEE1394-1995, the 64-bit fixed addressing according to the IEEE1212 standard is employed.

FIG. 39 shows an address map of the IEEE1394. The most significant 16 bits of each address indicate a node ID 2201. The most significant 10 bits of the node ID 2201 define a bus ID 2202, and the least significant 6 bits thereof define a PHY (Physical) ID 2203. The bus ID 2201 can assign any one of buses numbered "0" to "1023". The bus number "1023" indicates a local bus 2204, which is directly connected to a node from which data is transferred. The PHY ID 2203 can assign any one of nodes number "0" to "63". The node number "63" indicates broadcast 2205, by which data should be transferred to all nodes connected to the bus.

Therefore, in the IEEE1394, the number of buses is 1023 and 63 nodes can be connected to each bus. Consequently, a total of 64449 nodes can be connected by the IEEE1394 bus. An address space assigned to each node includes the remaining 48 bits (256 terabytes). Addresses from 0 to 'FFFF DFFF FFFF' are assigned to a memory space 2208, addresses from 'FFFF E000 0000' to 'FFFF FFFF FFFF' are assigned to a private space 2207 and addresses from 'FFFF F000 0000' to 'FFFF FFFF FFFF' are assigned to a register space 2206, where the numbers marked off by inverted commas are hexadecimal numbers.

The register of the IEEE1394 is defined by a style employing CSR (Control and Status Registers) architecture standardized by the IEEE1212. Addresses from '000 0000' to '000 01FF' of the register space of the CSR is constructed with a CSR core and basic register space 2209. Subsequent thereto, addresses from '000 0200' to '000 03FF' is reserved by a bus-dependent service 2210. Further, a space subsequent to the address '000 0800' is reserved as a space 2212 for node-dependent resource in initial units.

A transaction correspondent node has to be installed an information indicative of features and functions of the node, such as company identifier, etc., in a configuration ROM space 2211. The configuration ROM has a minimum format system containing only company identifier such as shown in FIG. 40 or a general format system such as shown in FIG. 41. There are a node vendor ID 2302 (that is, company identifier) and a chip ID 2303 in a bus info block 2301 of the general format.

In FIG. 38, the respective nodes are connected to each other by the cables 2100 each including two sets of twisted pair lines. The port 2130 of each node applies a predetermined bias voltage to a signal line of each cable 2100. When a new node is added to or a node is deleted from the network shown in FIG. 38, for example, when a port 2140 of a node 2141 and the port 2130 of the node 2134 are newly connected to each other by a cable, the node 2134, which detects a variation of the bias voltage on the signal line at the port 2130, sends a bus reset signal, which is a signal for initializing the whole network, to the whole network.

The respective nodes, which receive the bus reset signal, and the node 2134, which transmitted the bus reset signal, annul presently stored buses and presently stored information (topology information) related to the nodes in the network. With this procedure, the initialization of the network is completed. Subsequent thereto, a reconstruction of the topology information is performed in the network.

In this reconstruction of topology information, the PHY ID 2203 shown in FIG. 39 is assigned to each node and a root node for managing a control right of the buses and an isochronous resource manager (referred to as IRM, hereinafter) for managing an isochronous resource to be described later are determined. Since the procedures from the bus initialization to the reconstruction of topology are automatically performed among the respective nodes, a user of the network is not requested to set them for every node. The function of the IEEE1394 bus having these features is not limited to means for providing connection between a computer and peripheral devices thereof. The IEEE1394 bus also makes connections between all devices in homes possible.

On the IEEE1394 bus, a process for transferring packets is referred to as a subaction, which is roughly classified to two kinds. One of the kinds is called as an isochronous subaction having a function of transferring packets at regular intervals, which is the feature of the IEEE1394 bus. In this subaction, the packets are transferred not to a specific node but to all nodes of the whole network by using channel addresses.

The other kind is called as an asynchronous subaction, which is an asynchronous transfer method. Unlike the isochronous subaction, packets can not be transferred at regular intervals in the asynchronous subaction. Instead, a header information of several bytes and a real data are transferred to an assigned node and the assigned node, which received the header information and the real data, returns an acknowledge packet necessarily. However, in a case of a subaction, which does not require acknowledge packet, such as broadcast in which the PHY ID 2203 within a destination address is 63 or an asynchronous stream packet defined in IEEE1394a-2000, which is an expansion standard of the IEEE1394-1995, no acknowledge packet is returned.

An example of a system construction of the IEEE1394 is shown in FIG. 42. A transaction-correspondent node connected to the IEEE1394 bus has a hardware function 2401 composed of a Physical Layer function 2403 and a link layer function 2404 and a firmware function 2402 composed of a transaction layer function 2405 and a serial bus management function 2406. Transmission packets are transmitted from the transaction layer function 2405 through the link layer function 2404 and the physical layer function 2405 to the IEEE1394 bus 2400. Receiving packets are transmitted from the IEEE1394 bus 2400 through the physical layer function 2403 and the link layer function 2404 to the transaction layer function 2405.

The physical layer function 2403 performs a flow from the initialization by bus reset to the construction of topology, a conversion of the serial bus of the IEEE1394 bus 2400 and the parallel bus of the link layer function 2404 and an entry to an arbitration on the IEEE1394 bus 2400, etc. In the topology construction phase, the physical layer function 2403 is to automatically transmit a packet, which is called self identification (self-ID) packet, for notifying other nodes of its node ID 2201, its transfer speed and connection information, etc.

The link layer function 2404 performs a control of a cycle start packet to be described later, a packet transmission control, a retry control, a packet receiving control and the above mentioned CSR management, etc. The transaction layer function 2405 performs a transmission packet generation and a receiving packet processing, etc. The serial bus management function 2406 performs a node control and the above-mentioned IRM function, etc.

An example of a bus on which the isochronous subaction and the asynchronous subaction are performed is shown in FIG. 43. As mentioned above, a root node is settled on the IEEE1394 bus by the topology construction after the bus setting and, in an environment in which there is the isochronous packet, the root node thus settled becomes a cycle master for transmitting a cycle start packet 2502.

The cycle master transmits cycle start packets 2502 at intervals of about 125 μs. When a node, which acquired the isochronous resource from the IRM, detects the cycle start packet 2502, the node transmits an isochronous packet 2503. When the node completes a transfer of all isochronous packets 2503 within the cycle period 2501 of about 125 μs and detects a subaction gap 2506, respective nodes transmit the asynchronous packet 2504 and nodes, which receive the asynchronous packet, return the acknowledge packets 2505 thereto.

Incidentally, the cycle start packet 2502 is also an asynchronous packet. There are two kinds of the transaction in the asynchronous subaction.

FIG. 44 shows a data flow in a unified transaction, which is one of the two kinds of transaction. In FIG. 44, a request packet transmitted from a transaction layer 2601 of a requesting node is received by a transaction layer 2604 of a response node through a link layer 2602 of the requesting node and a link layer 2603 of the response node. The transaction layer 2604 of the response node immediately transmits an acknowledge packet of completion to the request packet and the transaction is completed when the transaction layer 2601 of the requesting node confirms the acknowledge packet.

FIG. 45 shows a data flow in a split transaction, which is the other kind of transaction. In FIG. 45, a request packet transmitted from a transaction layer 2601 of a requesting node is received by a transaction layer 2604 of a response node similarly to the unified transaction. The transaction node 2604 of the response node transmits an acknowledge packet, which is pending, in response to the request packet to terminate the transaction temporarily. Thereafter, the transaction node 2604 transmits a response packet indicative of completion at a time when the response to the request previously received request is prepared in the transaction layer 2604 of the response node. When the transaction layer 2601 of the request node confirms the packet and the transaction layer 2604 of the response node confirms the transmitted acknowledge packet, the transaction is completed.

In the IEEE1394 bus, since the above mentioned bus resetting occurs to perform the initialization of the bus every time when a cable is connected or disconnected, the efficiency of bus utilization is lowered. In order to solve this problem, an IEEE1394 bus bridge for dividing bus by using the bus ID is defined by P13934.1 and an example thereof is disclosed in JPH11-220485A.

Since, in the conventional IEEE1394 bus described hereinbefore, all nodes connected to the bus have the right of use of any one of the nodes connected to the IEEE1394 bus, there is a problem that one node can not occupy other nodes.

Further, since, when the IEEE1394 bus is divided by using the IEEE1394 bus bridge, the step from the bus resetting to the construction of topology information is also divided, there is no means for knowing existence of nodes connected to the bus upstream from the IEEE1394 bus bridge.

SUMMARY OF THE INVENTION

An object of the present invention is to provide a local bus bridge capable of providing an environment in which a specific node connected to the IEEE1394 bus can reliably occupy nodes connected to the bus.

Another object of the present invention is to provide a local bus bridge capable of providing an environment in which nodes connected to a bus can mutually recognize existence thereof even when the bus is divided.

A local bus bridge according to the present invention for connecting a first local bus to which a plurality of nodes are connected to a second local bus to which a plurality of nodes are connected comprises means for notifying the first local bus, to which a specific node is connected, of an information of connection of the second local bus and means for providing only an information of the specific node to the second local bus.

In other words, the local bus bridge according to the present invention is featured by that, in the IEEE1394 local bus bridge, a bus is divided without changing its bus ID and nodes connected to buses thus divided can mutually receive/ transmit packets by mutually recognizing the nodes unconsciously of the division of bus.

In the local bus bridge according to the present invention, one of the nodes connected to one of the divided buses behaves as a specific node connected to the other divided bus and the existence of other nodes is concealed. Therefore, the specific node can occupy a node connected to the same bus.

BRIEF DESCRIPTION OF THE DRAWINGS

Specific embodiments of the present invention will now be described, by way of example only, with reference to the accompanying of drawings in which:

FIG. 5 is a block diagram showing a construction of an ID conversion table shown in FIG. 4;

FIG. 7A to FIG. 7C show a detailed construction of self-ID packets of a local bus bridge;

FIG. 8 shows a detailed construction of a self-ID packet of each node of a portal B;

FIG. 14A to FIG. 14D show a detailed construction of self-ID packets of when the initial bus reset to the portal A is issued in the registering mode;

FIG. 20A to FIG. 20F show a detailed construction of self-ID packets when the initial bus rest to the portal A is issued in the registration mode, according to the embodiment of the present invention;

FIG. 22 shows a construction of an ID conversion table to which an information of the registered node is reflected, in the embodiment of the present invention;

FIG. 24 shows a construction of an ID conversion table constructed by the self identification phase of the portal B in the embodiment of the present invention;

FIG. 25 shows a construction of the ID conversion table at a time when a node management number of the portal B in the embodiment of the present invention;

FIG. 28A to FIG. 28I show a detailed construction of self-ID packets when the second bus reset to the portal A is issued in the normal mode, according to the embodiment of the present invention;

FIG. 32 shows a construction of the ID conversion table when a node D is disconnected in the embodiment of the present invention;

FIG. 36A to FIG. 36H show a detailed construction of self-ID packets when the bus reset is issued in the case where the repeater exist, in the another embodiment of the present invention;

DETAILED DESCRIPTION OF THE PREFERRED EMBODIMENTS

Figure 1:
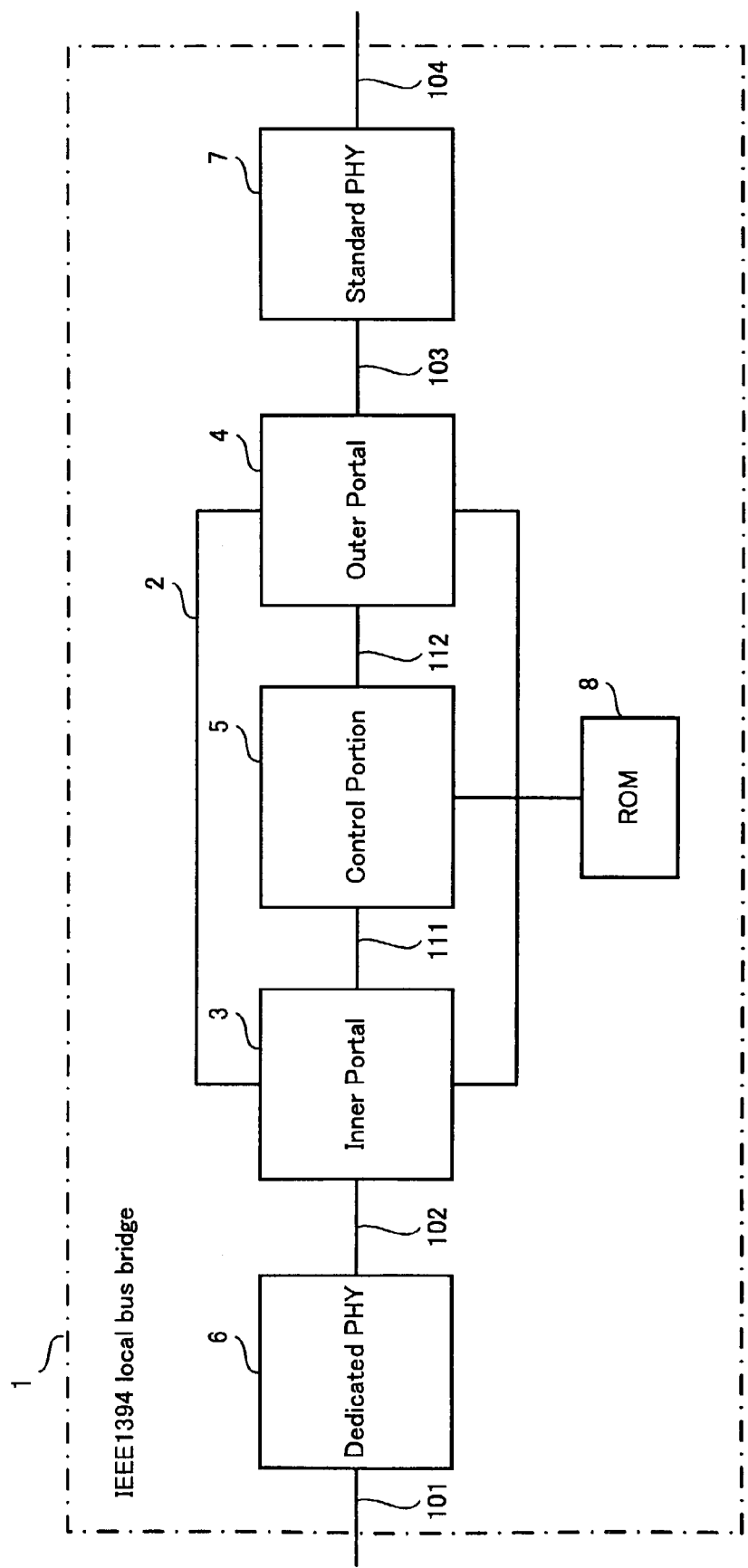
FIG. 1 is a block diagram showing a construction of a local bus bridge according to an embodiment of the present invention.

Now, embodiments of the present invention will be described with reference to the drawings. FIG. 1 is a block diagram showing a construction of an IEEE1394 local bus bridge according to an embodiment of the present invention. In FIG. 1, the IEEE1394 local bus bridge 1, which will be simply referred to as "local bus bridge", hereinafter) is constructed with a LINK function 2, a dedicated PHY (Physical Layer) function 6, a standard PHY function 7 and a ROM (Read Only Memory) 8. The PHY function means a hardware having the function of the physical layer defined by the IEEE1394-1995 standard or the expanded standard thereof.

Further, the LINK function 2 is constructed with an inner portal 3, an outer portal 4 and a control portion 5. The inner portal 3 and the outer portal 4 are connected to the dedicated PHY function 6 and the standard PHY function 7 through PHY-link interfaces 102 and 103, respectively.

The inner portal 3 functions as a node on a local bus 101 and transmits an information of nodes connected to a local bus 104. The outer portal 4 functions as a specific node connected to the local bus 101 on the local bus 104 and does not transmit an information of other nodes connected to the local bus 101.

Further, the inner portal 3 and the outer portal 4 are connected to the control portion 5 through inner buses 111 and 112, respectively, and can communicate mutually. Further, the portals can read and write a necessary information such as information of a configuration ROM, etc., from the control portion 5 with respect to a ROM 8.

In addition to the functions of the serial bus management, the transaction layer and the link layer, the control portion 5 performs a bus reset division, a mirroring of the configuration ROM, a NODE ID conversion and a transfer speed conversion.

The local bus bridge 1 connects a specific terminal to the local bus 101 to which the inner portal 3 is connected through the dedicated PHY 6, preliminarily stores an ID information of the specific terminal in the ROM 8 and, after a power source is turned on, detects the specific terminal connected to the side of the inner portal 3 on the basis of the ID information from the ROM 8.

On the other hand, the local bus bridge 1 reads an ID information of all terminals connected to the local bus 104 connected to the outer portal 4 through the standard PHY 7 and stores them in the control portion 5. The local bus bridge 1 generates a bus reset on the local bus 101 again, generates a self-ID packet for notifying a connection information of the local bus 104 by the control portion 5 and transmits the self-ID packet through the dedicated PHY 6. Further, the local bus bridge 1 behaves as the specific terminal connected to the local bus 101 by presenting only an information of the specific terminal to the local bus 104.

Figure 2:
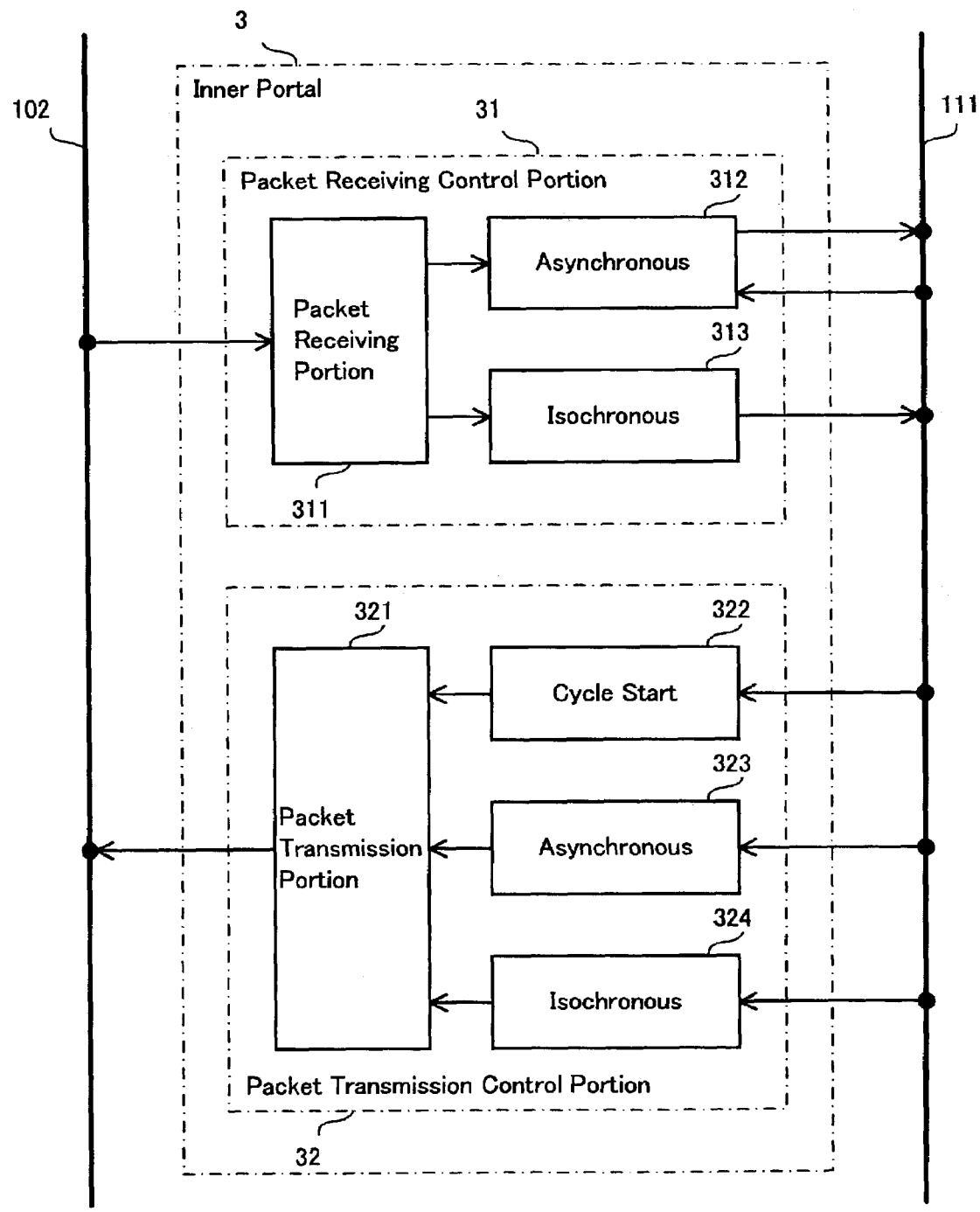
FIG. 2 is a block diagram showing a construction of an inner portal shown in FIG. 1.

FIG. 2 is a block diagram showing a construction of the inner portal 3 shown in FIG. 1. In FIG. 2, the inner portal 3 is constructed with a packet receiving control portion 31 and a packet transmission control portion 32. The packet receiving control portion 31 is constructed with a packet receiving portion 311, an asynchronous packet receiving control portion 312 and an isochronous packet receiving control portion 313. The packet transmission control portion 32 is constructed with a packet transmitting portion 321, a cycle start packet transmission control portion 322, an asynchronous packet transmission control portion 323 and an isochronous packet transmission control portion 324.

The packet receiving portion 311 of the packet receiving control portion 31 receives a packet transmitted from the local bus 101 through the dedicated PHY function 6, divides the packet to an asynchronous packet and an isochronous packet and transfers them to the respective receiving control portions 312 and 313, respectively. When the asynchronous packet receiving control portion 312 receives the asynchronous packet, it sends a necessary information to the control portion 5 and, upon permission, transfers it to the control portion 5 together with the necessary information. When the isochronous packet receiving control portion 313 receives the isochronous packet, it transfers the packet to the control portion 5 together with an information necessary for transfer.

In the packet transmission control portion 32, when the packet is transferred from the control portion 5 to the cycle start packet transmission control portion 322, the packet is transmitted from the packet transmission portion 321 to the dedicated PHY function 6 with an asynchronous timing and the asynchronous subaction on the local bus 101 is performed.

Similar to the cycle start packet, the packet transferred from the control portion 5 to the asynchronous transmission control portion 323 is transmitted from the packet transmission portion 321 with the asynchronous timing. It should be noted that the cycle start packet is transmitted prior to the transmission of the asynchronous packet. The isochronous transmission control portion 324 performs the isochronous subaction with the isochronous timing.

Figure 3:
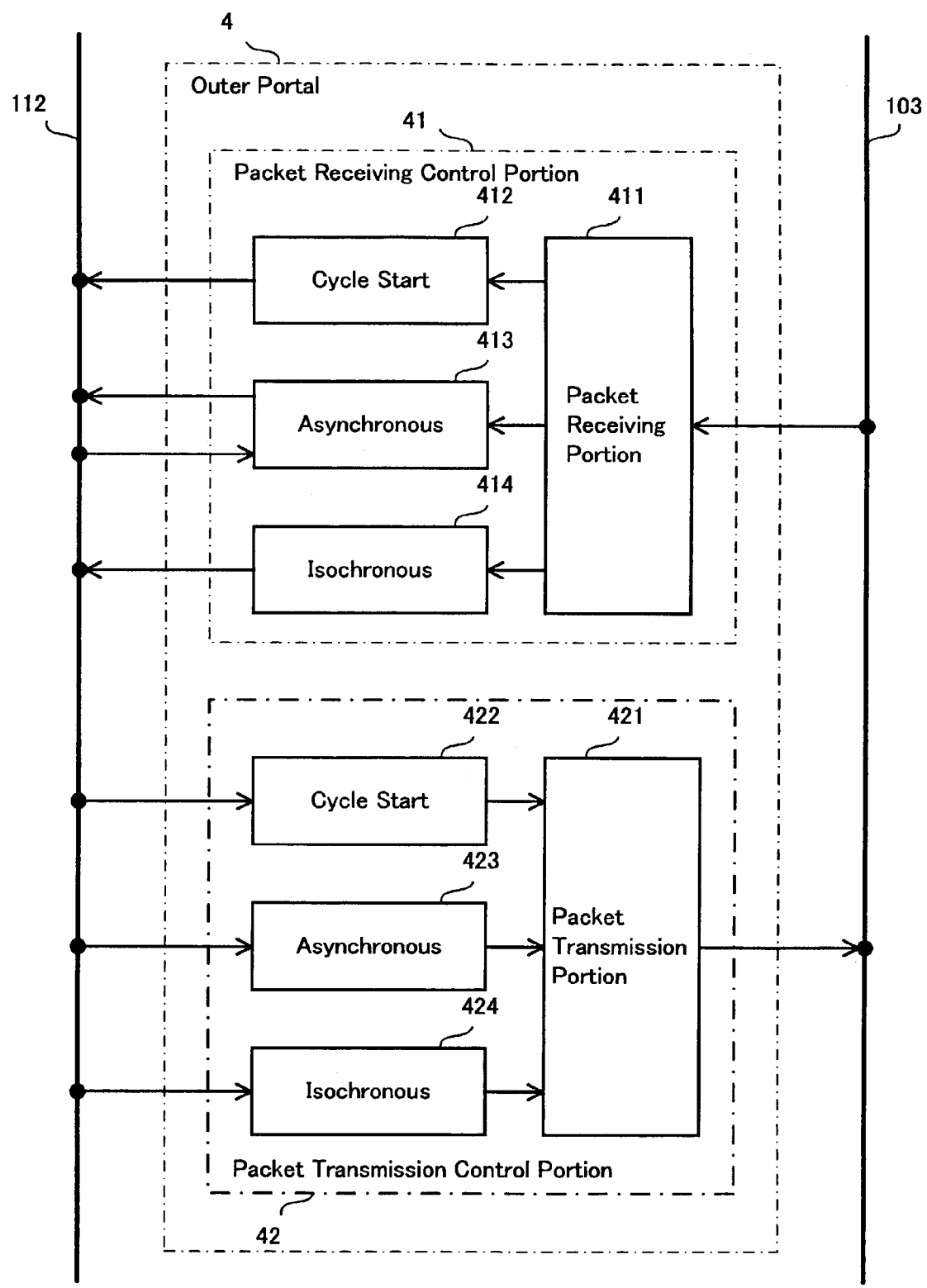
FIG. 3 is a block diagram showing a construction of an outer portal shown in FIG. 1.

FIG. 3 is a block diagram showing a construction of the outer portal 4. In FIG. 3, the outer portal 4 is constructed with a packet receiving control portion 41 and a packet transmission control portion 42. The packet receiving control portion 41 is constructed with a packet receiving portion 411, a cycle start packet receiving portion 412, an asynchronous packet receiving control portion 413 and an isochronous packet receiving control portion 414. The packet transmission control portion 42 is constructed with a packet transmission portion 421, a cycle start packet transmission portion 422, an asynchronous packet transmission control portion 423 and an isochronous packet transmission portion 424. An operation in the outer portal 4 is similar to that of the inner portal 3, except the cycle start packet receiving control portion 412.

Since the inner portal 3 becomes the cycle master and the IRM by an operation of the dedicated PHY function 6 to be described later, the cycle start packet is transmitted in only the transmitting direction thereof. However, in the outer portal 4, the cycle master is changed every bus reset and the transmitting/receiving directions of the cycle start packet are determined accordingly. The transmitting operation of the outer portal 4 is similar to the operation of the inner portal 3, so that the packet from the local bus 104 is received through the standard PHY function 7 and transferred to the control portion 5 through the packet receiving portion 411 and the cycle start packet receiving control portion 412.

Figure 4:
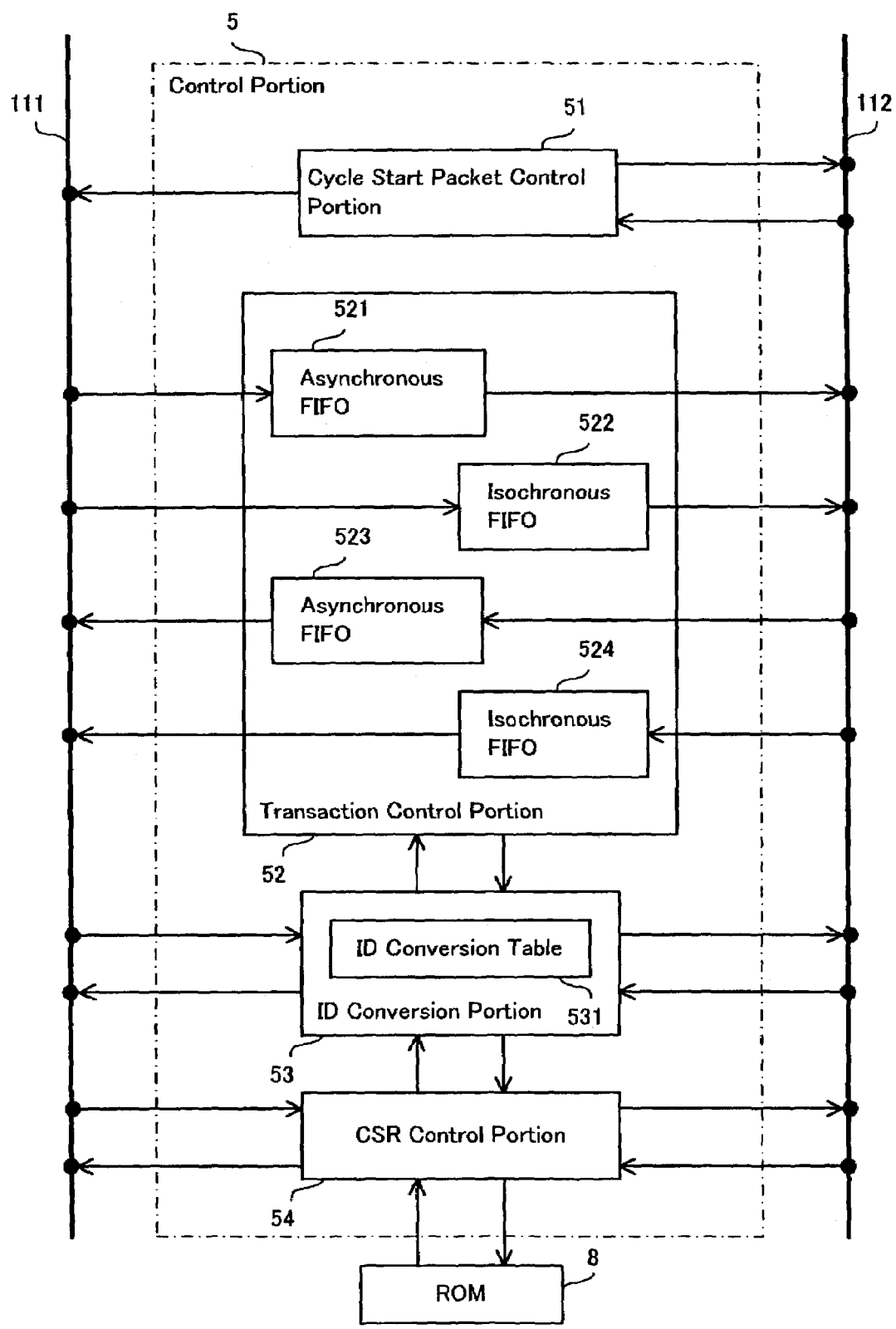
FIG. 4 is a block diagram showing a construction of a control portion shown in FIG. 1.

FIG. 4 is a block diagram showing a construction of the control portion 5 shown in FIG. 1. In FIG. 4, the control portion 5 is constructed with a cycle start packet control portion 51, a transaction control portion 52, an ID conversion portion 53 and a CSR (Control and Status Registers) control portion 54. The transaction control portion 52 is constructed with an asynchronous packet transfer FIFO (First-In First-Out) 521 for transferring packets from the inner portal 3 to the outer portal 4, an isochronous packet transfer FIFO 522, an asynchronous packet transfer FIFO 523 for transferring packets from the outer portal 4 to the inner portal 3 and an isochronous transfer FIFO 524.

The cycle start packet control portion 51 checks whether or not the outer portal 4 is the cycle master and, when the outer portal is the cycle master, performs a transmission to both the inner portal 3 and the outer portal 4 with the transmission timing of the cycle master packet. When the outer portal 4 is not the cycle master, the cycle start packet control portion 51 transmits the cycle master packet to the inner portal 3 with the timing of the cycle start packet transfer when the cycle start packet is transferred from the outer portal 4.

When the transaction control portion 52 receives an asynchronous packet from the inner portal 3, it transmits the packet to the outer portal 4 after the whole packet is received by the asynchronous packet transfer FIFO 521. The transfer of the asynchronous packet from the outer portal 4 is the same as that mentioned above.

When the transaction control portion 52 receives an isochronous packet from the inner portal 3, it transfers the packet to the outer portal 4 with such timing as that the packet is transmitted after the cycle start packet received/transmitted by the outer portal 4 is transmitted. Transfer of the packet from the outer portal 4 is basically the same as that mentioned above. However, the transmission timings are slightly different from each other as will be described later.

The ID conversion portion 53 knows a topology of nodes connected to the local bus 101 of the inner portal 3 and a topology of nodes connected to the local bus 104 of the outer portal 4 and holds the information thereof in the ID conversion table 531.

FIG. 5 shows a construction of the ID conversion table 531 shown in FIG. 4. In FIG. 5, the inner portal 3 is referred to as portal A and the outer portal 4 is referred to as portal B. The ID conversion table 531 is constructed with fields of a portal A node management number 531a, a portal A node transfer performance code 531b, a portal A node ID 531c, a portal B node management number 531d, a portal B node transfer performance code 531e, a portal B node ID 531f, a portal B node management number active flag 531g, a portal B node active flag 531h, a portal B self-node flag 531i, a portal B root flag 531j, a portal B contender flag 531k and a virtual port management number 531l.

In the field of the portal A node management number 531a, a node vendor ID (company identifier) 2302 and a chip ID 2303 of a registered node detected by the portal A, are stored. A registered node is detected at a time when the bus reset of the portal A occurs. This is performed by comparing nodes with the portal A node management number 531a and judging one of the nodes, which is consistent with the portal A node management number, as the registered node. That is, respective devices are identified by using the ID numbers (ID numbers inherent to the devices), which are unchanged at the time of bus reset. Although, in FIG. 5, the node vendor ID 2302 and the chip ID 2303 are merged to a 32-bit construction, the node vendor ID 2302 and the chip ID 2303 are made a 64-bit construction by storing them without merging. Such a 64-bit construction code is called as EUI-64: Extended Unique Identifier-64 bits. If there is other means for identifying the respective devices than the node vendor ID 2302 and the chip ID 2303, such means may be used as the management code.

The field of the portal A node transfer performance code 531b has a 2-bit construction and indicates a packet transfer speed allowed to the registered node. Thus, when a packet transfer from the portal A to the portal B or vice versa is performed, the local bus bridge of the present invention can convert the transfer speed to an appropriate value adjusted to the destination portal. Incidentally, in a case where the transfer performance is S100 (100 Mbps), the portal A node transfer performance code field is #0 and, when the transfer performance is S200 (200 Mbps), the code field is #2.

The field of the portal A node ID 531c has a 6-bit construction and indicates a node ID of a node in the portal A, which is registered in the portal A, and node IDs of the respective nodes of the portal B looked from the portal A.

EUI-64 of each of nodes existing in the portal B are stored in the field of the portal B node management number 531d. When a node is detected at a time when the bus reset of the portal B occurs, the identification of respective nodes is performed by using the portal B node management number 531d. This is also to identify respective devices by using the ID numbers, which are unchanged at the time of bus reset. If there is other means for identifying the respective devices than EUI-64, such means may be used as the management code.

The field of the portal B node transfer performance code 531e has a 2-bit construction and indicates the transfer speed allowed to the respective nodes of the portal B. Similarly to the portal A, the code field is #0 when the transfer performance is S100 (100 Mbps), the code field is #1 when the transfer performance is S200 (200 Mbps) and the code field is #2 when the transfer performance is S400 (400 Mbps). Thus, when a packet transfer from the portal A to the portal B or vice versa is performed, the local bus bridge 1 of the present invention can convert the transfer speed to an appropriate value adjusted to the destination portal.

The field of the portal B node ID 531f has a 6-bit construction and stores node IDs of the respective nodes on the portal B. The field of the portal B node management number active flag 531g has a 1-bit construction and indicates whether or not the portal B node management number 531d is valid. In a case where a bus reset occurs in the portal B, the field is made active at any time when each node is identified.

The field of the portal B node active flag 531h has a 1-bit construction and indicates whether or not there is a node in each virtual port of the portal B. The local bus bridge 1 of the present invention makes a port corresponding to a node recognized by the bus reset of the portal B active. For example, when a node of the portal B is dropped, the local bus bridge 1 clears the portal B node active flag 531h. If the dropped node is restored and becomes consistent with the portal B node management number 531d, the local bus bridge 1 makes the portal B node active flag 531h valid.

This scheme is prepared in order to improve the transfer efficiency of the portal A by preventing a careless sending of the bus reset of the portal B to the portal A. However, when a new node is found in the portal B, that is, when a node, which is consistent with the portal B node management number 531d whose the portal B node management number active flag 531g is active does not exist, it is possible to recognize that the new node is firstly added to the portal B.

The field of the portal B self node flag 531i has a 1-bit construction and, at a time of the node identification of the portal B, the local bus bridge 1 makes the flag thereof active.

The field of the portal B root flag 531j has a 1-bit construction and makes the flag of a root node of the portal B active. The field of the portal B contender flag 531k has a 1-bit construction and a contender of the portal B makes the flag of a possible node active. If the portal B root flag 531j is active and the portal contender flag 531k is inactive, there is no cycle master and, therefore, a matching between the cycle of the portal A and the cycle of the portal B becomes impossible. In order to avoid such mismatching, the portal B root flag 531*j* and the portal B contender flag 531*k* are provided.

The field of the virtual port management number 531*l* has a 4-bit construction and is prepared for managing an assignment of nodes of the portal B to respective ports. The virtual port management number 531*l* corresponds to any of 2nd to 15th ports of the virtual 16-ports in physical layer. A virtual port management number of a port of the virtual 16-ports PHY, in which the portal B self-node flag 531*i* is active, is counted by skipping over by 1. Therefore, the respective virtual port management numbers are consistent with the respective port numbers. The packet transfer is performed on the basis of the information of the ID conversion table 531.

When the CSR control portion 54 receives a packet directed to the self node register space 2206 of a self-node from one of the nodes connected to each of the portals, the CSR control portion 54 automatically generates a response packet and transmits it. When there is an access to the configuration ROM space 2211 of the self-node from the outer portal 4, the CSR control portion 4 returns a content of the configuration ROM preliminarily copied from the specific node connected to the side of the inner portal 3.

In order to realize the above mentioned ID conversion, it is necessary to notify the portal A of the topology of the portal B. However, it is impossible to merely send a self-ID packet of the self-node or a self-ID packet obtained by converting a node ID of the self-ID packet generated in the portal B. This is because the topologies of the portals A and B are constructed as local buses independent from the respective portals, so that the mismatching of the connection information of ports of the respective self-ID packets in the portal A shall occur. Therefore, a policy with which the occurrence of topology mismatching is prevented becomes necessary. In order to realize such policy, the portal A is made look like the virtual 16-ports PHY.

Figure 6:
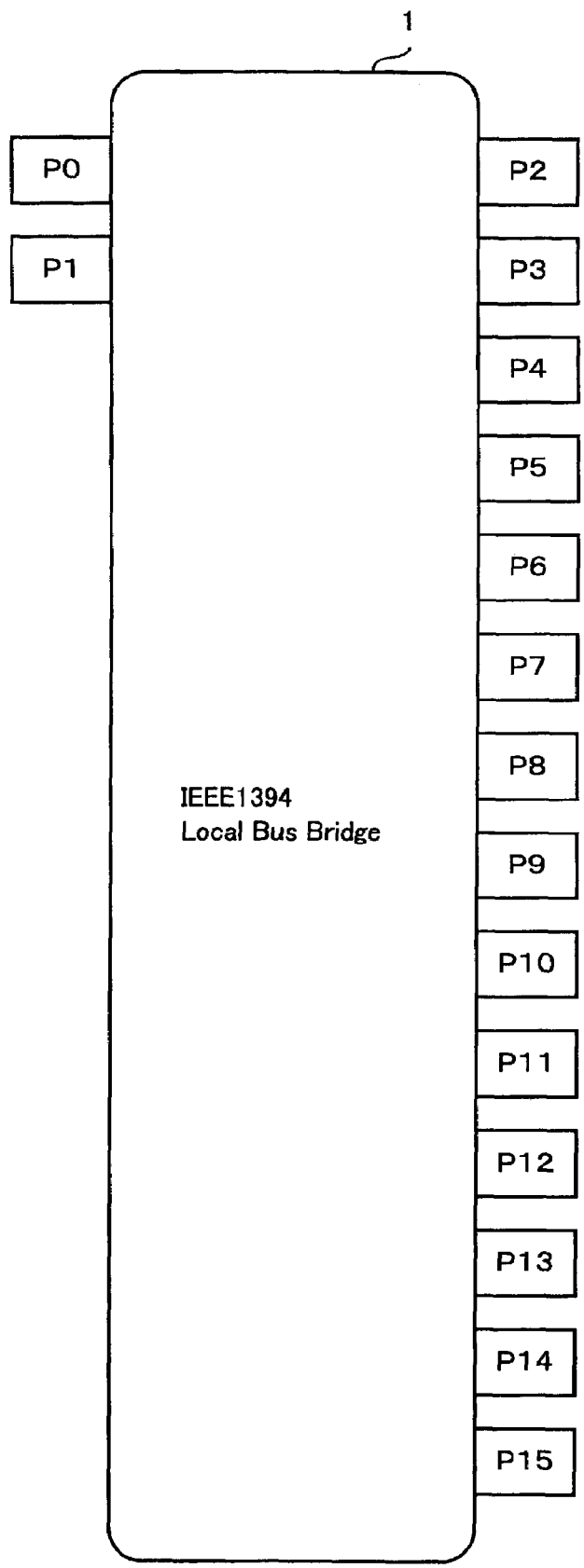
FIG. 6 shows an image of a virtual 16-port PHY used in an embodiment of the present invention.

FIG. 6 is an image drawing of the virtual 16-ports used in this embodiment of the present invention, showing an image of the policy. In FIG. 6, the policy is shown as if the virtual 16ports exist in the local bus bridge 1.

The ports practically existing in the portal A are ports P0 and P1. The remaining 14 ports P2 to P15 are virtual ports to which the respective nodes of the portal B are connected.

FIG. 7A to FIG. 7C show a detailed construction of a set of self-ID packets of the local bus bridge as a node according to this embodiment of the present invention and FIG. 8 shows a detailed construction of a self-ID packet of each node of the portal B according to the embodiment of the present invention. By FIGS. 7A, 7B, 7C and 8, self-ID packets for sending the topology of the portal B to the portal A are shown.

In FIGS. 7A to 7C showing a detailed construction of a set of self-ID packets of the local bus bridge, the self-ID packets include three packets PKT0, PKT1 and PKT2 as shown in FIGS. 7A, 7B and 7C respectively and it is possible to send the port status up to the port 15 by the virtual port fields "p0" to "p2" allocated to the 24th to 29th bits among the 0th to 31st bits of the PKT0, "p3" to "p10" allocated to the 14th to 29th bits of the PKT1 and "p11" to "p15" allocated to the 14th to 23rd bits of the PKT2.

That is, it is possible to notify the portal A of the topology information of the portal B by assigning 14 ports among the 16ports to the respective fields "p2", "p3", "p4", "p5", "p6", "p7", "p8", "p9", "p10", "p11", "p12", "p13", "p14" and "p15". Incidentally, the information of the respective packets are generated on the basis of the information of the ID conversion table 531 and then transmitted.

In FIG. 8 showing a detailed construction of the self-ID packet of each node of the portal B, the fields "p1" and "p2" allocated to the 26th to 29th bits of the self-ID packet are fixed to #00, which indicates that the virtual ports P1 and P2 are not connected to anywhere, in order to make the node look like as if it is connected to a virtual port and only one port exists in the node. Information of the field "p0" allocated the 24th to 25th bits of the packet and others can be generated on the basis of the information of the ID conversion table 531.

By realizing the virtual 16-ports PHY construction in this manner, it is possible to make the ID conversion efficient and simple. If the topology of the portal B is reflected as it is, the ID conversion table 531 may become very complicated and it may be impossible to correspond thereto by a hardware logic. In order to realize such local bus bridge, a high speed ID conversion is necessary. According to the present invention, the ID conversion table 531 is simplified to make the ID conversion speed high. In this connection, a virtual port management number 531*l* of the ID conversion table 531 corresponds to the above mentioned virtual port. The management number #00 is assigned to the virtual port P2, the management number #01 to the virtual port P3, and so on, to manage the ID conversion by skipping the portion of the self-node flag. The management number #14 is assigned to the virtual port P15. Therefore, the ID conversion table 531 and the topology management are substantially simplified, so that a high speed transmission of the self-ID packet and the high speed ID conversion become possible.

The isochronism of the isochronous subaction is maintained by the cycle start packet. In the local bus bridge 1 of the present invention, the portal A and the portal B are separate local buses and, in order to synchronize them, it is necessary to secure a root in either the portal A or the portal B.

There may be a case where another local bus bridge is connected to the portal B. In such case, there is a possibility of mutual scrambling of a root between the local bus bridge and the another local bus bridge. Therefore, it is necessary to provide a method for reliably securing a root in the portal A of the local bus bridge 1. In order to provide such method, physical layer on the side of the portal A has to have the dedicated PHY function 6.

The method for reliably securing the root will be described next. The usual determination of root is performed by exchanging a parent notify signal and a child notify signal in physical layer. When a bus reset occurs, the construction of topology is started.

When, except one port connected, a PHY has no port or when, except one port, the PHY receives a parent notify signal from a port, which is connected, other than the one port, the PHY waits for a predetermined time in order to determine whether or not the parent notify signal is to be received by the remaining one port. When the parent notify signal is not received, the PHY outputs the parent notify signal by itself.

On the contrary, when the PHY receives the parent notify signal from all of the ports, the same PHY becomes the root. The dedicated PHY function 6 used in the present invention makes the reliable securing of root possible by delaying a timing of the parent notify signal to the very limit with which a loop is not detected, when the topology is constructed after the bus reset.

Figure 9:
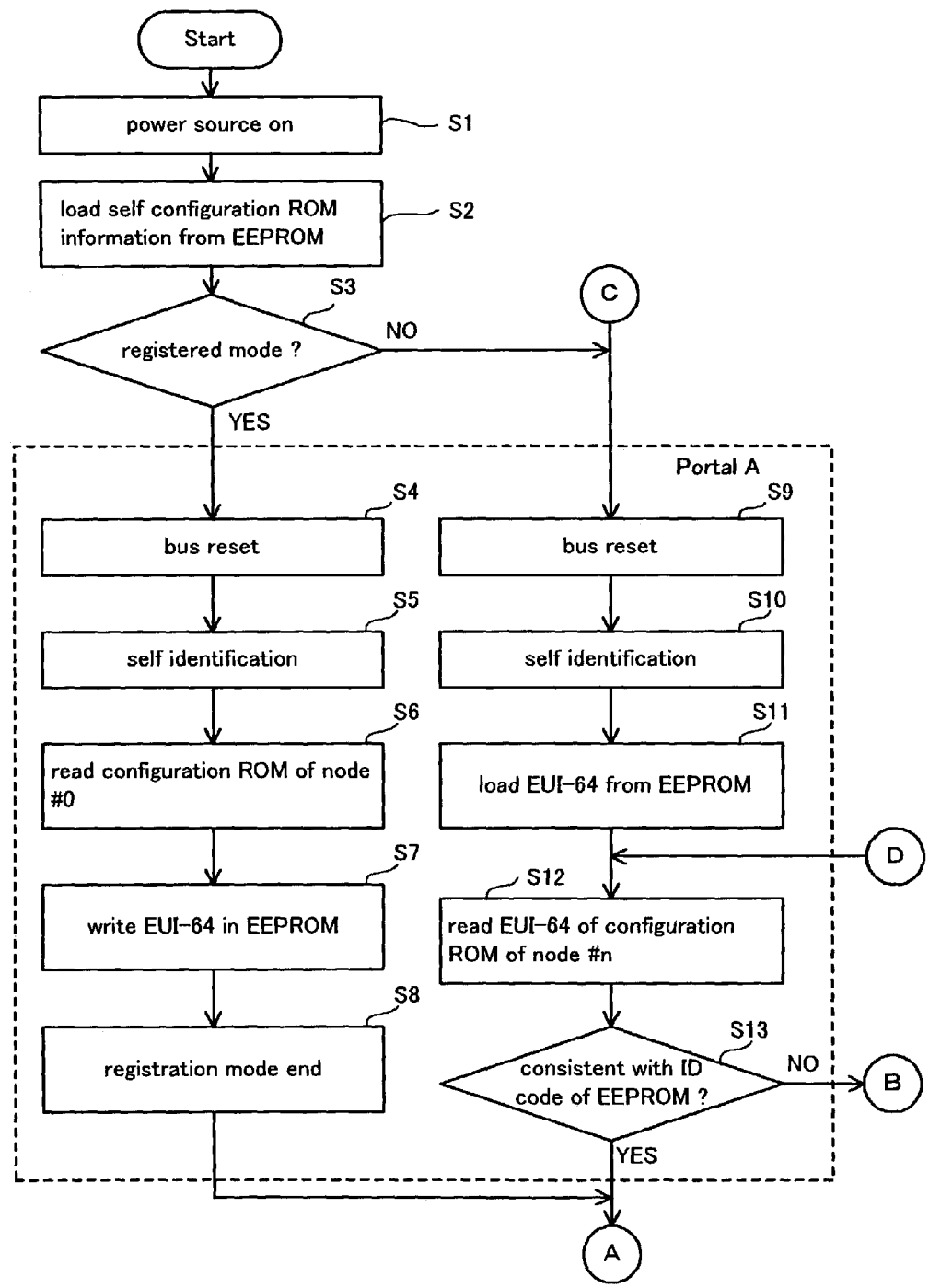
FIG. 9 is a flowchart showing an operation of the whole local bus bridge.
Figure 10:
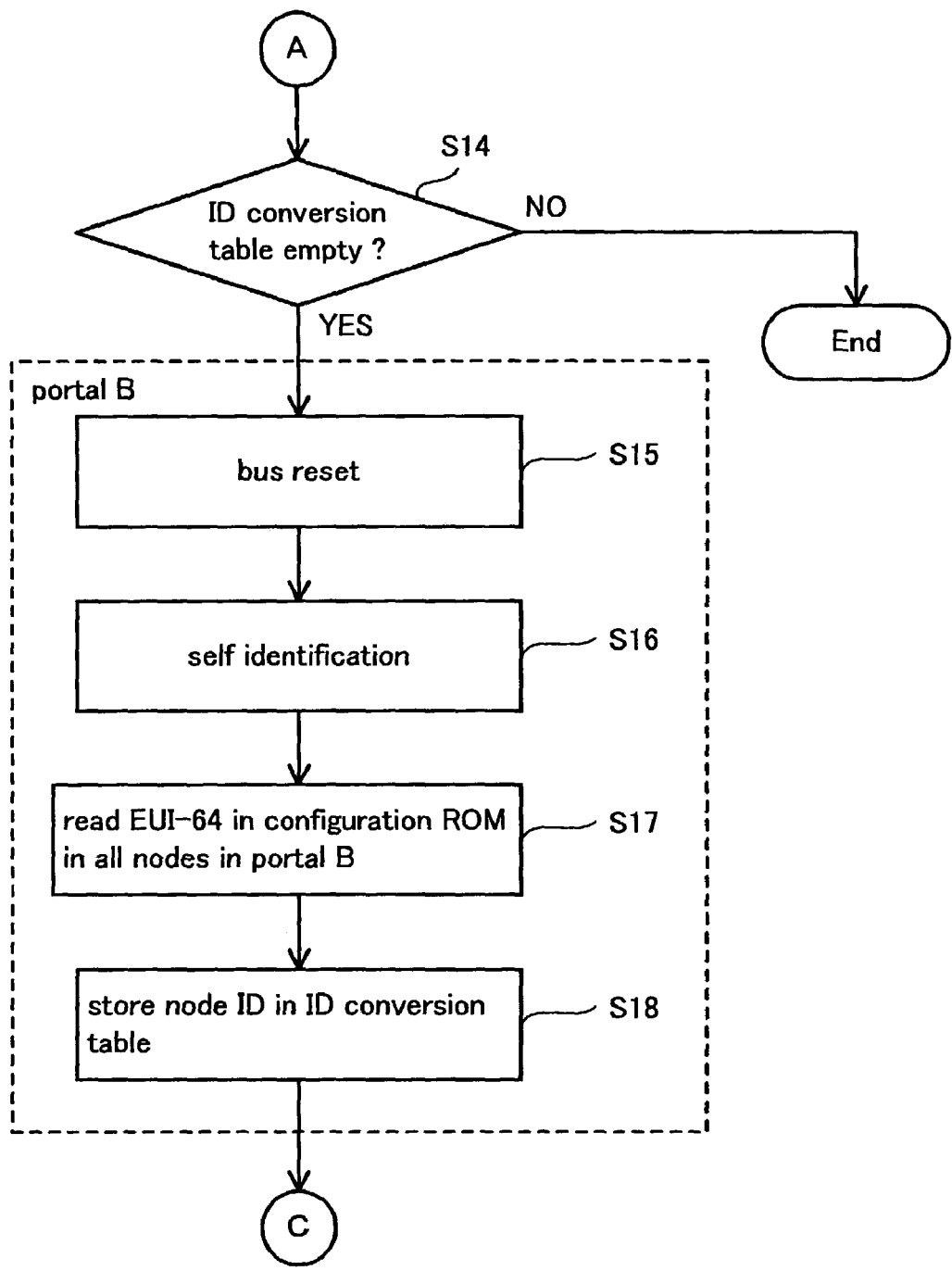
FIG. 10 is a flowchart showing an operation of the whole local bus bridge.
Figure 11:
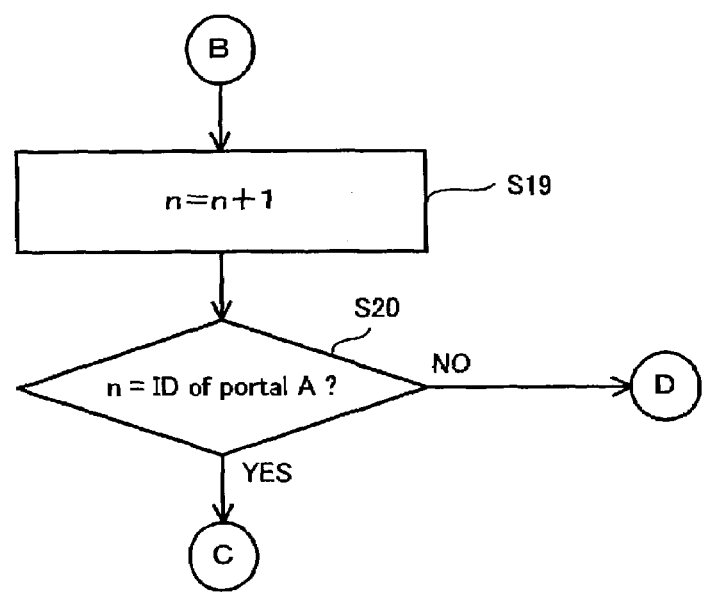
FIG. 11 is a flowchart showing an operation of the whole local bus bridge.

FIG. 9 to FIG. 11 are flowcharts showing an operation of the whole local bus bridge according to this embodiment.

Figure 12:
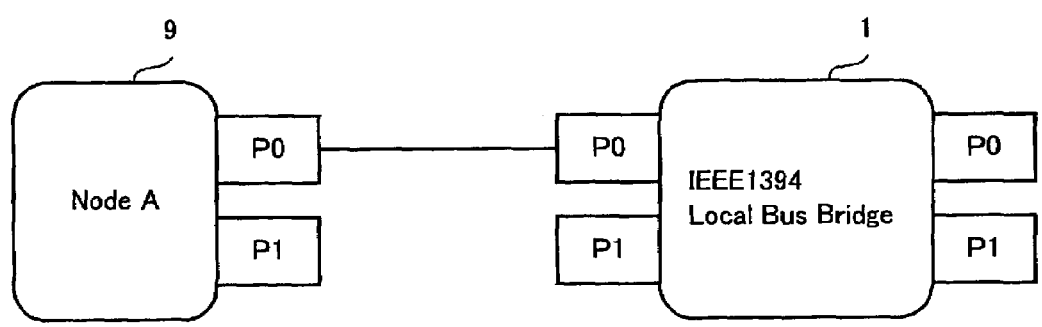
FIG. 12 shows a connection in a registering mode in the embodiment of the present invention.
Figure 13:
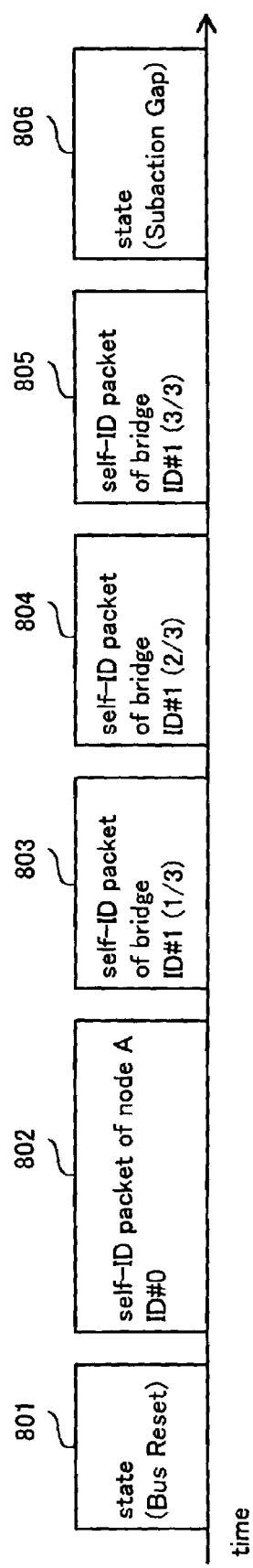
FIG. 13 shows a flow from an issuance of an initial bus reset to a portal A to an end of the self identification phase in the registering mode.

FIG. 12 shows a connection in a registration mode in this embodiment, FIG. 13 is a flow from an issuance of a first bus reset to the portal A to an end of the self identification phase in the registration mode in this embodiment and FIGS. 14A to 14D show a detailed construction of the self-ID packets at the time of the issuance of the first bus reset to the portal A in the registration mode.

The operation of the present invention will be described with reference to these drawings. First, the operation of the whole local bus bridge 1 will be described. In the following description, the inner portal 3 and the outer portal 4 will be referred to as the portal A and the portal B, respectively.

There are two operating systems of the local bus bridge and a setting method of either one of the operating systems is determined by looking a state of one input terminal when the hardware reset is cancelled. One of the operating systems is to preliminarily register a specific node connected to the portal A in the local bus bridge and the other operating system is used in the usual working. The former system will be referred to as a registration mode and the latter system will be referred to as a usual mode. The registration mode will be described first.

FIG. 12 shows a connection in the registration mode. In the registration mode, a terminal equipment 9 having an IEEE1394 interface is connected to either one of ports P0 and P1 on the portal A side of the local bus bridge 1. The terminal equipment 9 will be referred to as a node A.

After a user sets the local bus bridge 1 in the registration mode, a power source is turned on (step S1 in FIG. 9). Simultaneously with a cancellation of the hardware reset signal to the local bus bridge 1, the local bus bridge 1 enters into the registration mode.

First, regardless of the operating system, a content of an EEPROM (Electrically Erasable Programmable Read-Only Memory) 8 is loaded to a register (not shown) provided in the CSR control portion 54 (Step S2 in FIG. 9). This data content is a content of the configuration ROM of the local bus bridge 1, which is to be presented to nodes connected to the side of the portal A.

Next, the local bus bridge 1 generates a bus reset on the portal A side (steps S3 and S4 in FIG. 9). When the bus reset is generated, the self identification phase is started. The self identification phase will be described with reference to FIG. 13 and FIGS. 14A to 14D. Abscissa in FIG. 13 is a time axis and shows the operation from the generation of bus reset to an end of the self identification phase. FIG. 14A shows a self-ID packet PKT0 of the node A and FIGS. 14B to 14D show self-ID packets PKT1, PKT2 and PKT3 on the IEEE1394 local bus.

When a bus reset is generated on the local bus of the portal A, a state (Bus Reset) 801 for notifying a start of the bus reset is sent from the PHY. Next, a topology is constructed between the node A and the local bus bridge 1 and a child node and a parent node are determined. With thus determined parent and child nodes, the self identification phase is started.

Since the PHY on the portal A side has the dedicated PHY function 6 as mentioned previously, the local bus bridge 1 becomes the root, without fail. The transmission of self-ID packets is started sequentially from port 0 among the child nodes looked from the route. Since, in the connection state shown in FIG. 12, only the node A and the local bus bridge 1 are included, the self-ID packet of the node A as the child node corresponds to an ID packet (ID #0) 802 of the node A, which is issued from the node A. The detail of the self-ID packet PKT0 of the node A is shown in FIG. 14A.

Since, in this case, the self-ID packet PKT0 is the first self-ID packet, the physical ID field "phy ID" allocated to the 2nd to 7th bits of the self-ID packet PKT0 is set to #0. The gap count field "gap cnt" allocated to the 10th to 15th bits is set with reflecting a gap count value in the node A. Since this self identification phase is the first self identification phase, the gap count is #3F. The fields "sp" allocated to the 16th to 17th bits, "del" allocated to the 18th to 19th bits, "c" allocated to the 20th bit and "pwr" allocated to the 21st to 23rd bits are set according to he conditions of the node A.

The port field "p0" of the PKT0 shows a state of the virtual port P0 of the node A. Since the node A is the child node with respect to the local bus bridge 1, "p0" is set to #10. The port field "p1" bits shows a state of the virtual port P1 of the node A and is set to #01 since the corresponding port is not connected to anywhere as yet. The port field "p2" is set to #00 since no corresponding port exists in the node A.

The "i" bit allocated to the 30th bit of PKT0 shows whether or not a bus reset was generated and, therefore, it is variable upon situation. In this case, since the local bus bridge 1 generated the bus reset, it is set to #0. Since no other port exists in the node A, the "m" bit allocated to the 30th bit of the PKT0 is set to #0 for indicating absence of consolidated self-ID packet.

When the issuance of the self-ID packet of the node A. is completed, the local bus bridge 1, which is the root, issues the self-ID packets since there is no other node in the bridge. Since the 16 virtual ports exist in the local bus bridge 1, three self-ID packets 803 (ID #1 (1/3), 804 ( ID #1 (2/3) and 805 (ID #1 (3/3) are transmitted as shown in FIG. 13. Detailed constructions of the self-ID packets of the local bus bridge in this case are shown in FIGS. 14B to 14D as packets PKT1, PKT2 and PKT3, respectively.

On each self-ID packet of the bridge, "phy ID" is set into #1 since it is the second node. In this embodiment, "gap cnt" of the self-ID packet (ID #1 (1/3)) 803 or PKT1 is fixed to #3 However, "gap cnt" should be set appropriate depending upon a performance of the local bus bridge 1 of the present invention.

It is enough to preliminarily determine "sp" of the PKT1 depending upon a use condition. In this embodiment, it is supposed a data transfer speed of 400 Mbps and "sp" is set to #2. The "c" bit has to have a contender function since the local bus bridge 1 becomes the root in the portal A without fail. Therefore, it is set to #1.

There exist ports P0 and P1 in the local bus bridge 1 so that at least one of "p0" and "p1" of the PKT1 is set to #11. If both of the ports are connected to anywhere, both of the "p0" and the "p1" are set to #11.

Since the bus reset was generated by the local bus bridge 1, "i" bit is set to #1. Since three self-ID packets are required, "m" bit is set to #1. The ports fields "p2" of the PKT1, "p3" to "p10" of the self-ID packet (ID #1 (2/3)) 804 or PKT2 and "p11" to "p15" of the self-ID packet (ID #1 (3/3)) 805 or PKT3 are assigned to the information of the portal B. In this case, since there is no information of the portal B, these are set as #01 in order to make all of them look like non-connection for convenience.

When the set of the self-ID packets of the local bus bridge 1 is ended and the subaction gap occurs after the predetermined time lapses from the end of the self-ID packets, the state (subaction Gap) 806 is notified from the physical layer and the self identification phase is completed.

Figure 15:
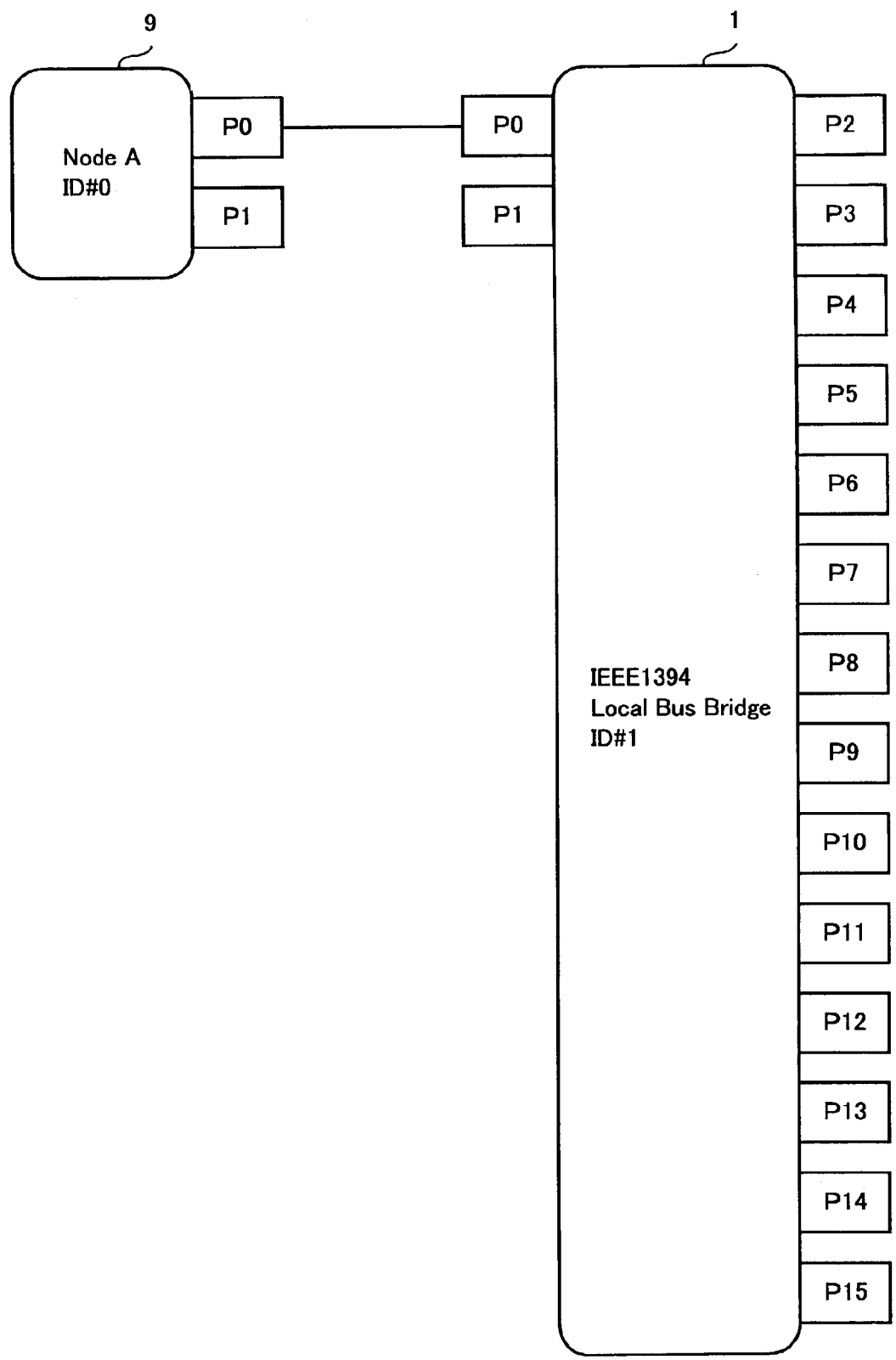
FIG. 15 shows a connection of the 16-port PHY at a time when an initial self identification phase of the portal A is ended in the registering mode.

FIG. 15 shows the connection state of the 16-port PHY at a time when the first self identification phase of the portal A is ended in the registration mode in this embodiment. In FIG.

15, an image connection state looked from the side of the portal A as the substitute for the 16-port PHY is shown.

The node ID of the node A becomes #0 and the node ID of the local bus bridge 1 becomes #1. Virtual ports P2 to P15 of the local bus bridge 1 are pretended as if they are connected to nowhere. At the time when the self identification phase (Step S5 in FIG. 9) is completed, the node IDs are assigned as shown in FIG. 15.

Figure 16:
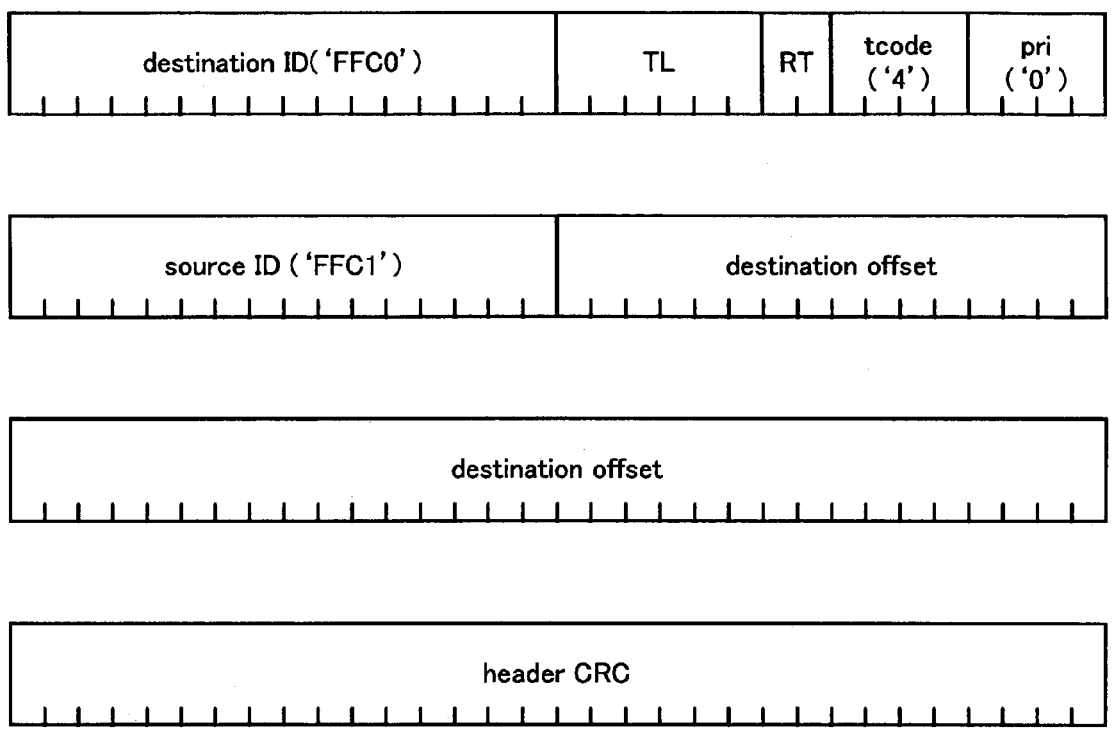
FIG. 16 shows a detailed construction of a read request packet in the embodiment of the present invention.
Figure 17:
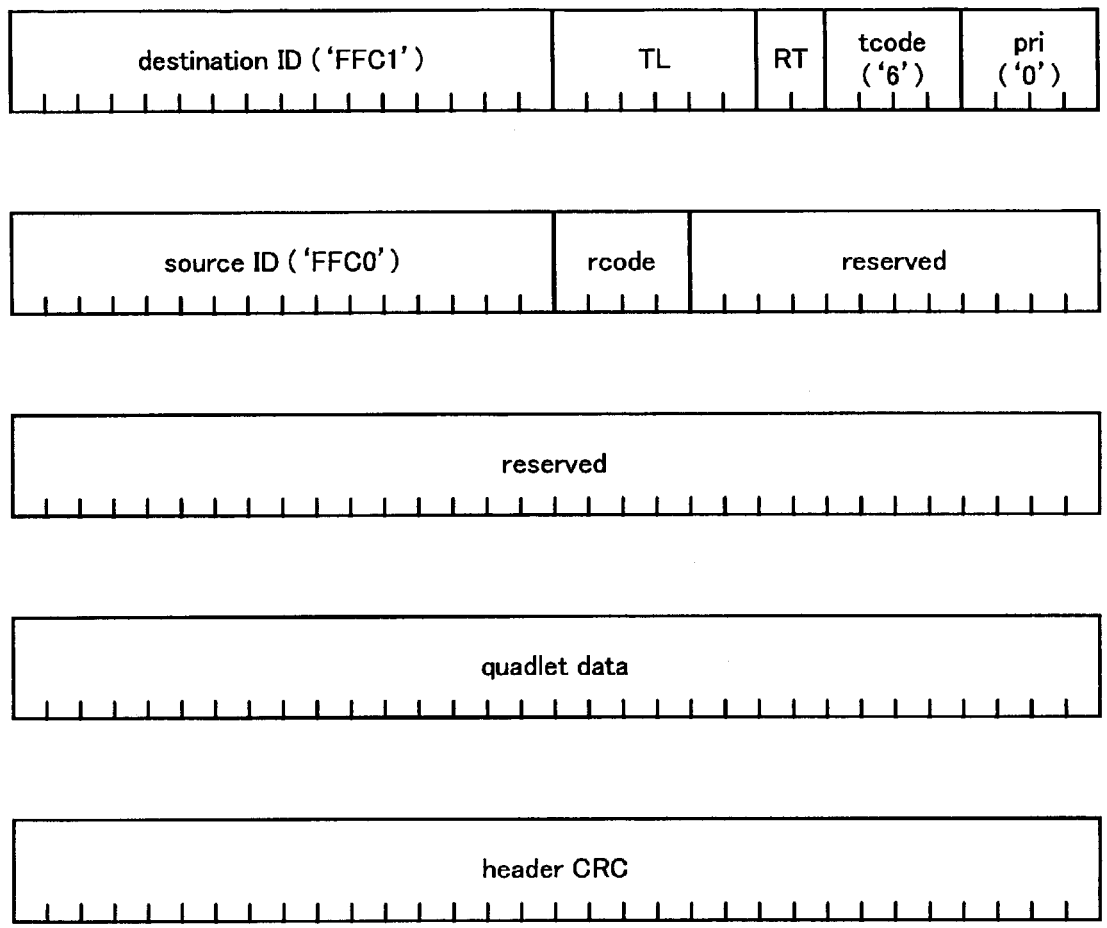
FIG. 17 shows a detailed construction of a response packet in the embodiment of the present invention.

FIG. 16 shows a detailed construction of a read request packet in this embodiment and FIG. 17 shows a detailed construction of the response packet in this embodiment.

In order to read the content of the configuration ROM of the node A, the local bus bridge 1 transmits the read request packet shown in FIG. 16.

In FIG. 16, "destination ID" indicates a node ID of a destination node of the packet transmission and a numerical value 'FFC0' (hexadecimal number) indicates PHY ID #0 of a local bus, that is, the destination node A. "TL" indicates a transaction label, which is arbitrarily assigned by the link layer logic on the transmission side. "RT" is a retry code. "Tcode" is the transaction code and '4' thereof indicates a data read request packet of a quadlet data (32-bit width).

"Source ID" indicates a node ID of the transmission side and a numerical value 'FFC1' indicates a node ID of the local bus bridge 1. "Destination offset" indicates a header address 'FFFFF0000400' of the configuration ROM region.

After the node A receives the read request packet, it transmits an acknowledge packet (pending). The local bus bridge 1 recognizes that the node A received the read request packet. And then the node A transmits a response packet such as shown in FIG. 17.

In FIG. 17, the same numerical value as that of "TL" of the above mentioned read request packet is set to "TL" of the response packet. For "quadlet data" of the response packet, 32-bit data in the header address of the configuration ROM is read out. The local bus bridge 1 stores the data of "quadlet data" in the register of the CSR control portion 54 and repeats this until the last address of the configuration ROM of the node A.

Figure 42:
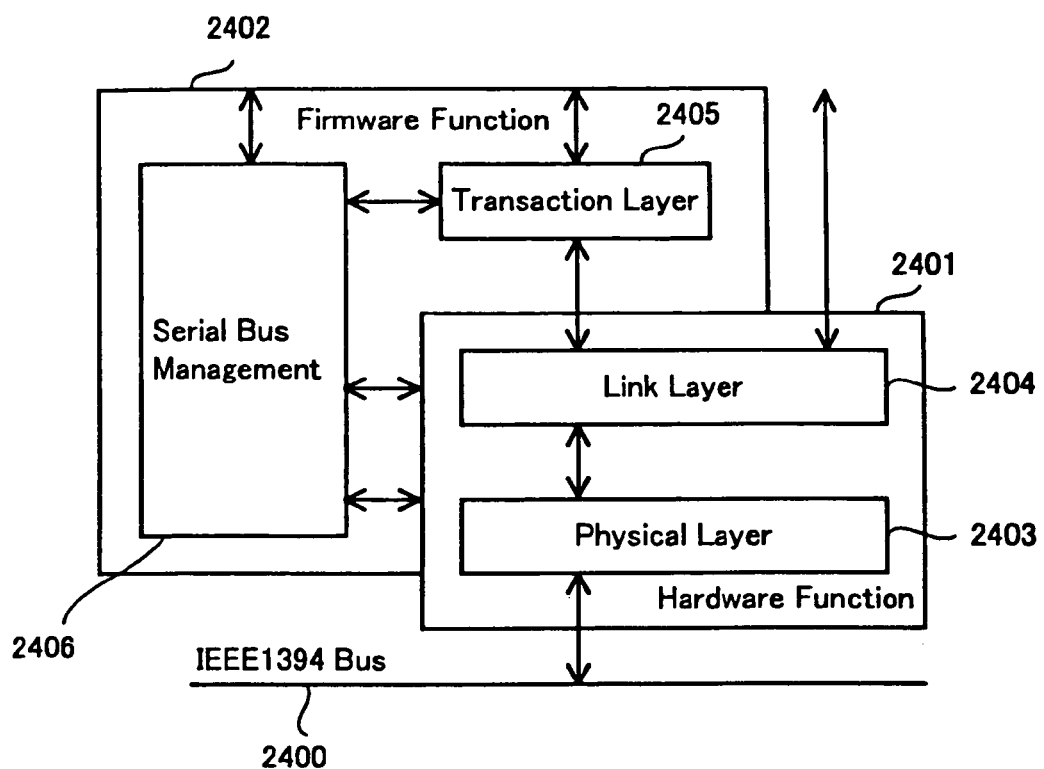
FIG. 42 shows an example of a system construction of the IEEE1394.
Figure 43:
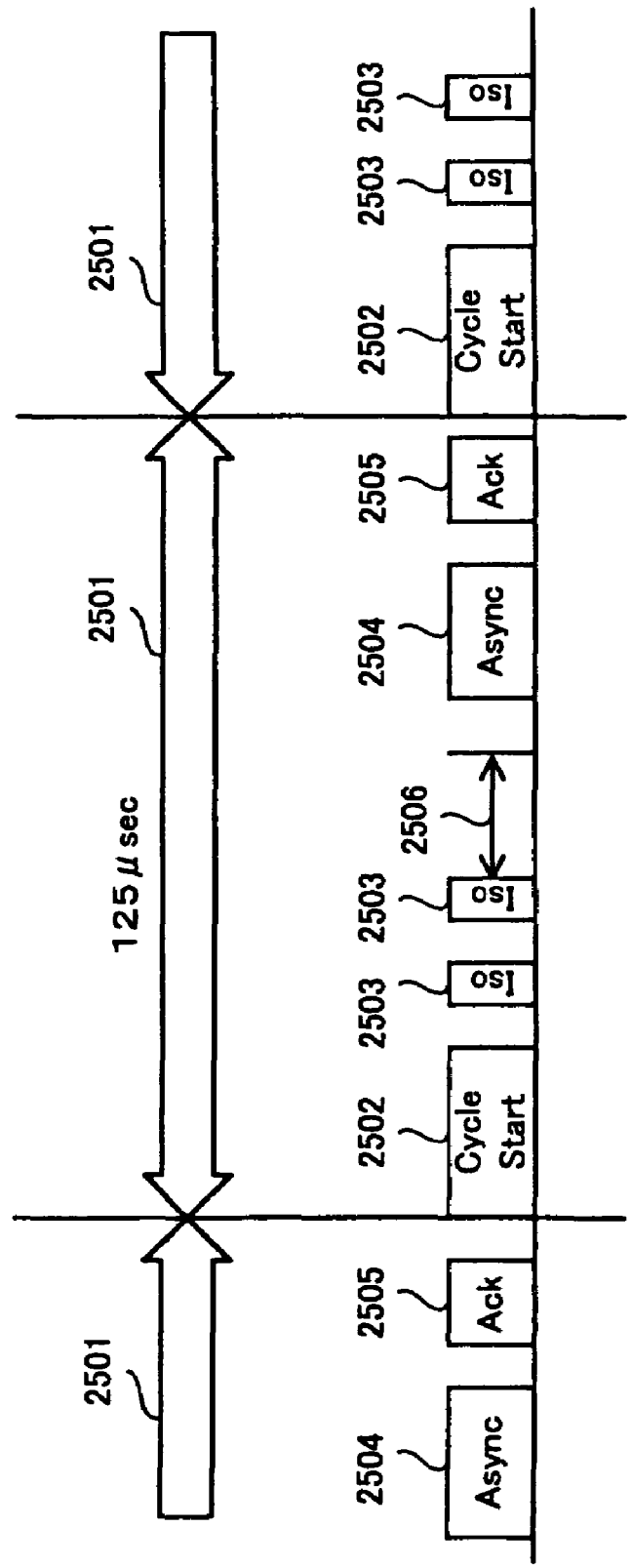
FIG. 43 shows an example of the IEEE1394 bus in which the isochronous subaction and the asynchronous subaction are performed.
Figure 44:
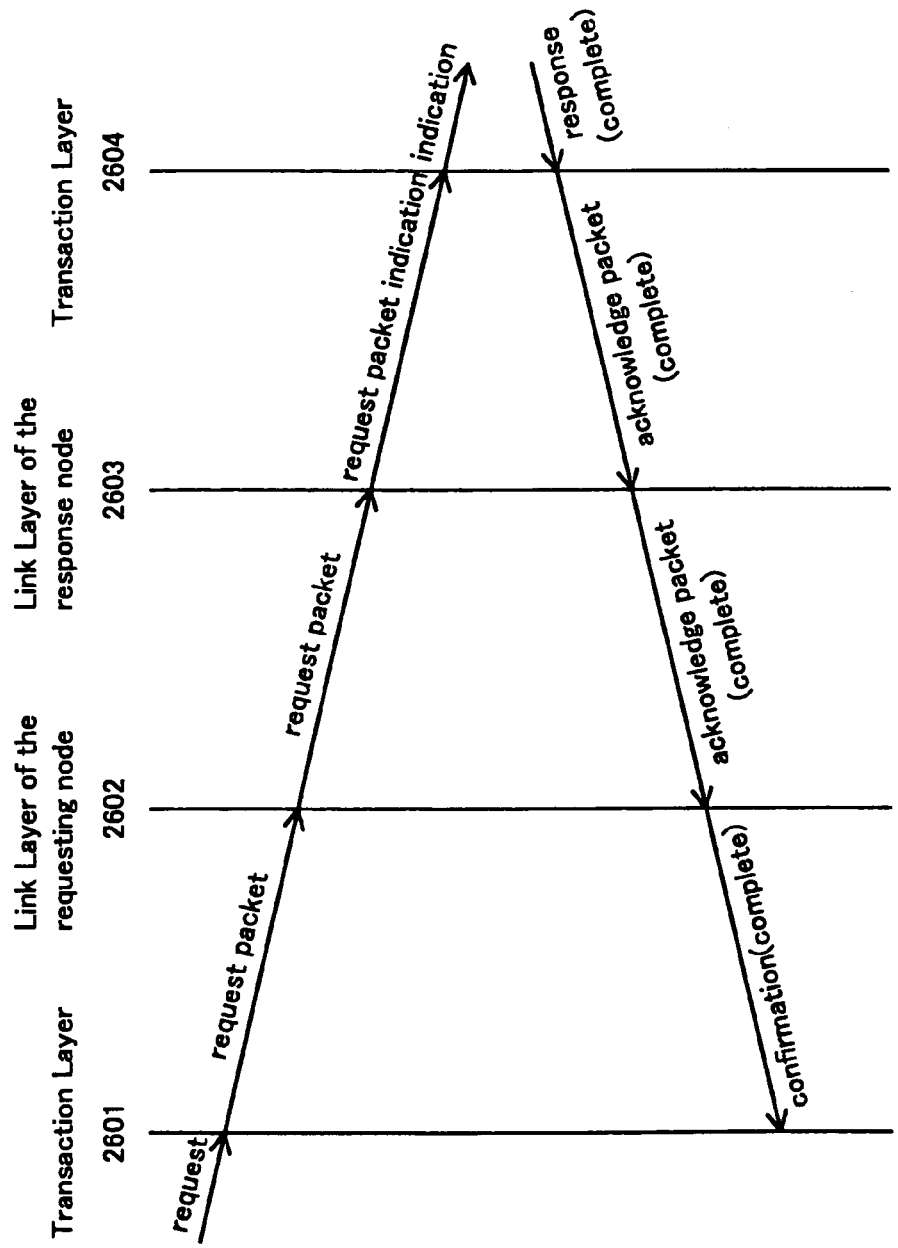
FIG. 44 shows a data flow in the unified transaction.
Figure 45:
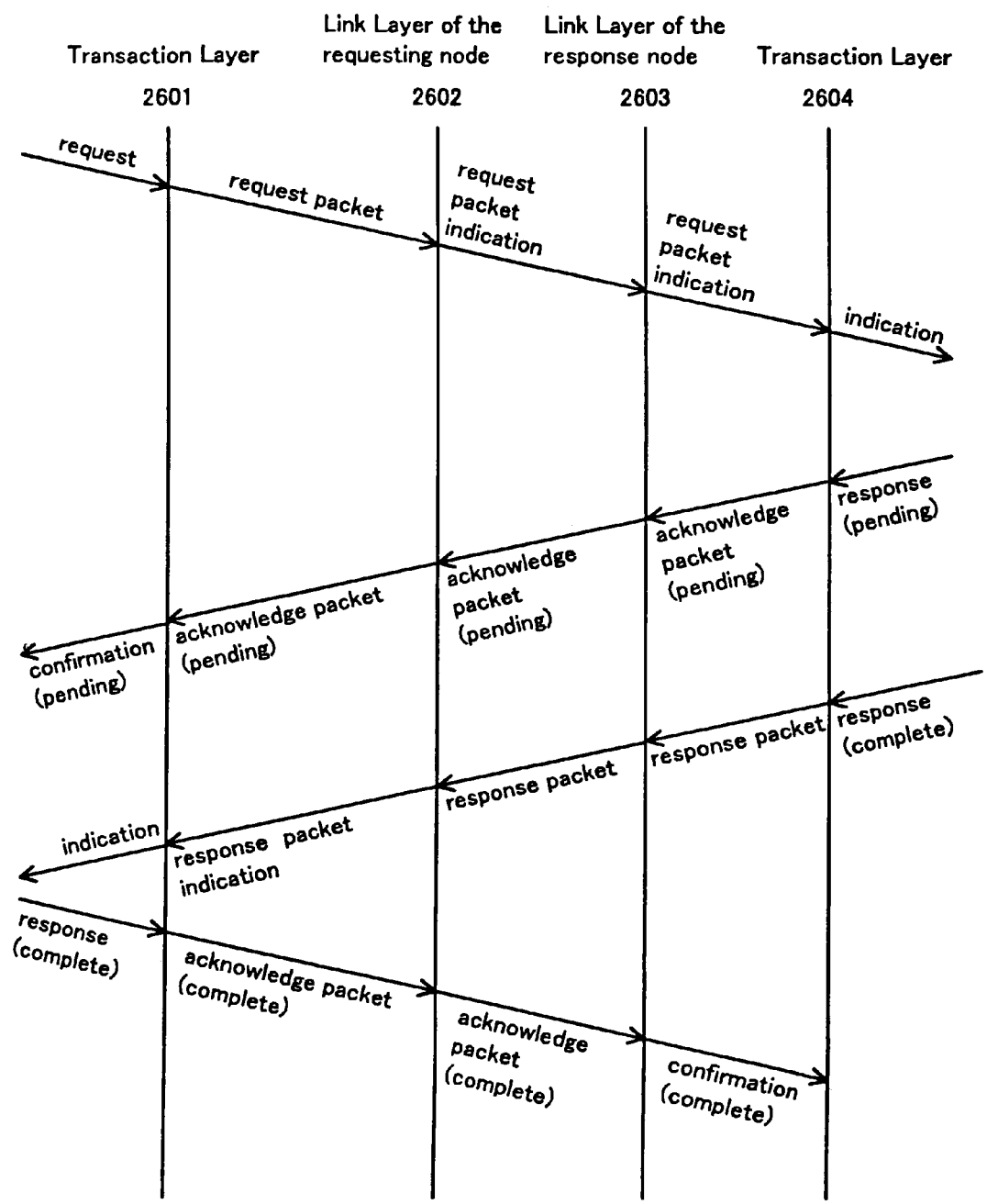
FIG. 45 shows a data flow in the split transaction.

A calculation of the last address of the configuration ROM is performed from a crc length (see FIG. 42) of the configuration ROM. The crc length provides a length of data subsequent to a bus info block 2301 of the configuration ROM in Quadlet (32 bits) unit. Therefore, the last address of the configuration ROM becomes 'FFFF F000 0400'+crc length×4.

After the whole content of the configuration ROM of the node A is stored in the register of the CSR control portion 54 (Step S6 in FIG. 9), the local bus bridge 1 stores EUI-64 of the node A from the CSR control portion 54 in the EEPROM 8 (Step S7 in FIG. 9). Thus, the registration mode of the local bus bridge 1 is completed (Step S8 in FIG. 9) and the operation is shifted to the usual mode.

Figure 18:
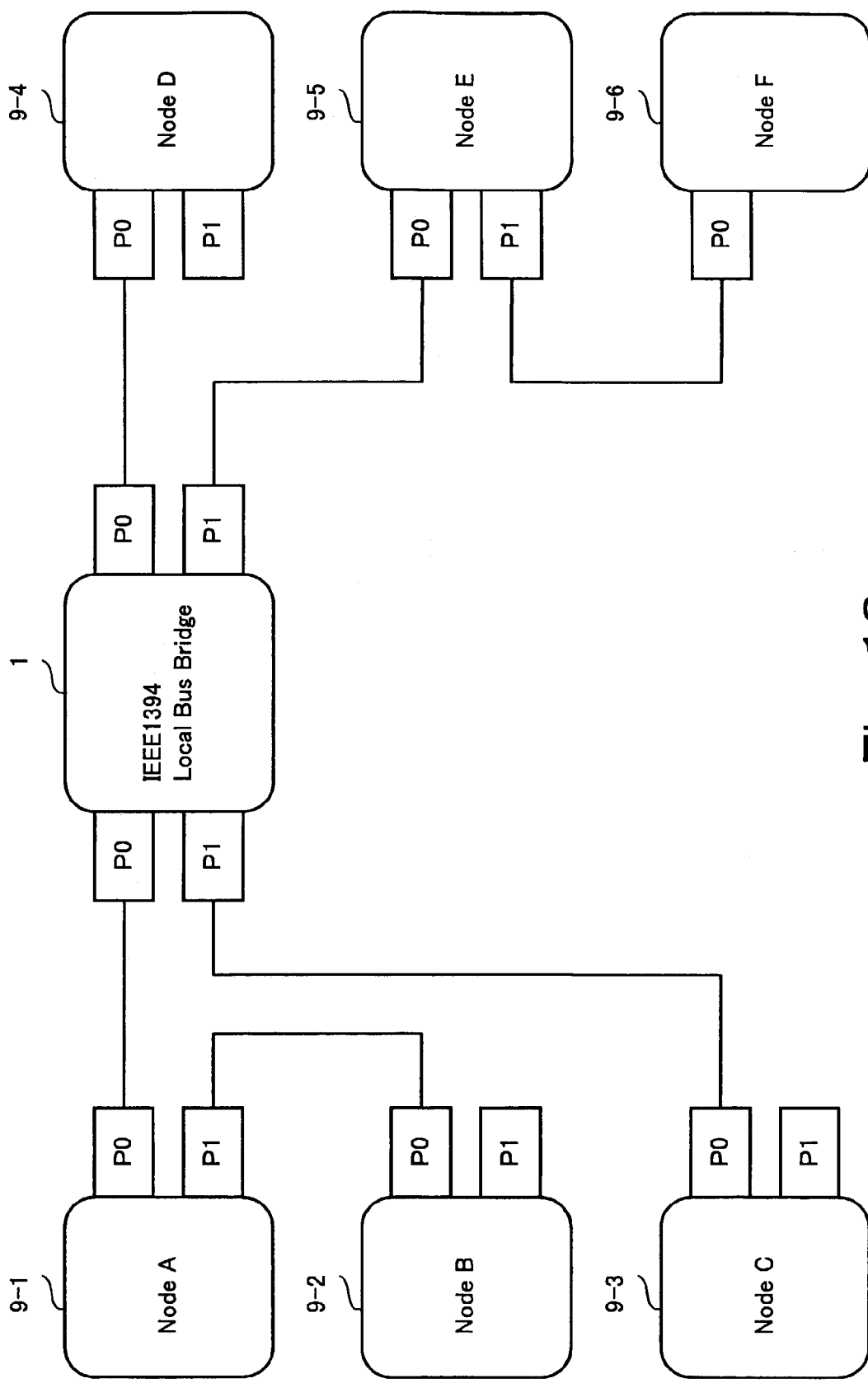
FIG. 18 shows a connection in a normal mode in the embodiment of the present invention.
Figure 19:
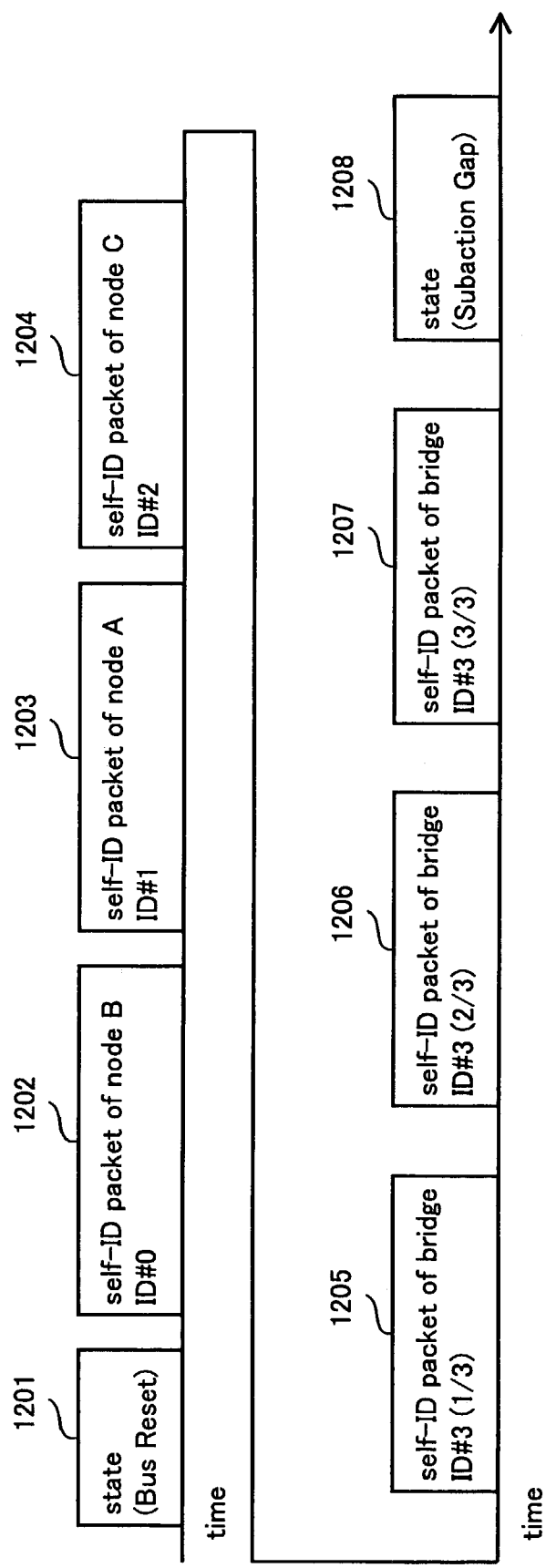
FIG. 19 shows a flow from an issuance of an initial bus reset to a portal A to an end of the self identification phase in the normal mode, according to the embodiment of the present invention.
Figure 21:
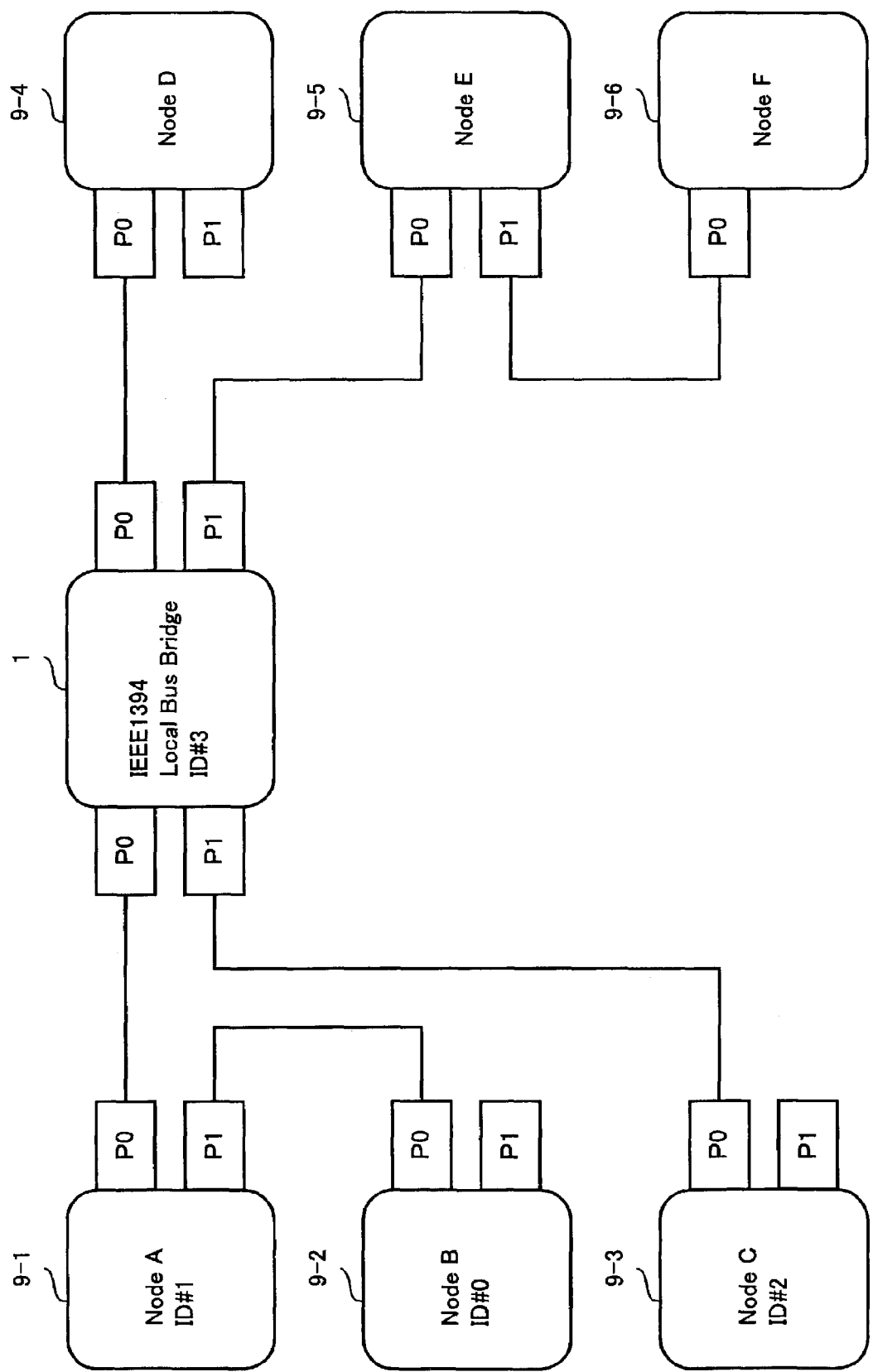
FIG. 21 shows a connection at a time when an initial self identification phase of the portal A is ended in the normal mode, according to the embodiment of the present invention.

FIG. 18 shows a connection state in the usual mode in this embodiment and FIG. 19 shows a flow from an issuance of a bus reset to the portal A in the usual mode to an end of the self identification phase in this embodiment. FIGS. 20A to 20F show detailed constructions of self-ID packets of each node when the first bus reset is issued to the portal A in the usual mode in this embodiment, FIG. 21 shows a connection state at a time when the first self identification phase of the portal A is ended in the usual mode and FIG. 22 shows a construction of the ID conversion table reflected by the information of the registered node.

Now, the operation of the local bus bridge in the usual mode will be described with reference to the flowcharts shown in FIG. 9 to FIG. 11 and with reference to FIG. 18 to FIG. 22.

FIG. 18 shows an example of the connection state in the usual mode in which a terminal equipment 9-1, which will be referred to as a node A, is connected through its port P0 to the port P0 on the portal A side of the local bus bridge 1, a terminal equipment 9-2, which will be referred to as a node B, is connected through its port P0 to the port P1 of the node A, a terminal equipment 9-3, which will be referred to as a node C, is connected through its port P0 to the port P1 on the portal A side of the local bus bridge 1, terminal equipments 9-4 and 9-5, which will be referred to as nodes D and E, are connected through their ports P0 to the ports P0 and P1 respectively on the portal B side of the local bus bridge 1 and a terminal equipment 9-6, which will be referred to as a node F, is connected through its port P0 to the port P1 of the node E.

After the power source of the local bus bridge 1 is turned on (Step S1 in FIG. 9), the bridge 1 stores the configuration ROM information of its self node from the EEPROM 8 in the register of the CSR control portion 54 (Step S2 in FIG. 9) as in the case of the registration mode. Subsequently thereto, the local bus bridge 1 generates the bus reset on the side of the portal A (Steps S3 and S9 in FIG. 9).

When the bus reset is generated, the self identification phase is started (Step S10 in FIG. 9). The operation of this self identification phase will be described with reference to FIG. 19 and FIG. 20.

In FIG. 19, the operation from the generation of bus reset to the end of self identification is shown along abscissa as a time axis. FIGS. 20A to 20F show configurations of a self-ID packet PKT0 of the node B, a self-ID packet PKT1 of the node A, self-ID packets PKT3, PKT4 and PKT5 of the local bus bridge 1 respectively.

When a bus reset is generated on the local bus of the portal A, a state (Bus Reset) 1201 notifying the bus reset start is given by the PHY. Thereafter, the construction of topology is performed between the node, the node B, the node C and the local bus bridge 1 to determine child nodes and a parent node to thereby start the self identification phase.

The PHY on the portal A side has the previously described dedicated PHY function 6. Therefore, the local bus bridge 1 becomes the root node. The transmission sequence of the self-ID packet is started sequentially from port P0 in the child nodes looked from the root. In the connection state shown in FIG. 18, a node B becomes the child node having the minimum number. Therefore, the initial self-ID packet is issued by the node B. The initial self-ID packet corresponds to the ID packet (ID #0) 1202 of the node B shown in FIG. 19. In this case, the self-ID packet becomes a packet PKT0 of the node B shown in FIG. 20A.

Since the PKT0 is the first self-ID packet, "phy ID" is set to #0. The value of "gap cnt" is set reflecting a value of a gap count presently set in the node B. The conditions of the node B are applied to "sp", "del", "c" and "pwr".

The port field "p0" of the PKT0 shows a connection state of the port P0 of the node B. Since the node A is the parent node, "p0" is set to #10. The field "p1" shows a state of the port P1 of the node B and is set to #01 since the port P1 is not connected anywhere. Since no port P2 is in the node B, "p2" is set to #00.

The "i" bit indicates whether or not a bus reset is generated and is changed according to the situation. Since, in this case, the local bus bridge 1 issues the bus reset, the "i" bit is set to #0. Since there is no other port in the node B, an absence of the consolidated self-ID packet is shown by setting "m" to #0.

Next, a node permitted by the root to transmit a self-ID packet is the node A having the larger number next to the minimum number. Therefore, a second self-ID packet is issued from the node A. This corresponds to the ID packet (ID #1) 1203 of the node A shown in FIG. 19. A detail of the self-ID packet at this time becomes as a packet PKT1 of the node A shown in FIG. 20B.

The PKT1 is the second self-ID packet and so "phy ID" of the PKT1 is set to #1. The value of "gap cnt" is set reflecting a value of a gap count presently set in the node A. The conditions of the node A are applied to "sp", "del", "c" and "pwr".

The field "p0" shows a connection state of the port P0 of the node A. Since the local bus bridge 1 is the parent node, "p0" is set to #10. The field "p1" shows a state of the port P1 of the node A and, since the node B is connected as a child node, "p1" is set to #11. Since no port P2 is in the node A, "p2" is set to #00.

The "i" bit indicates whether or not a bus reset is generated and is changed according to the situation. Since, in this case, the local bus bridge 1 issues the bus reset, "i" is set to #0. Since there is no other port in the node A9, an absence of the consolidated self-ID packet is shown by setting "m" to #0.

Next, a node permitted by the root to transmit a self-ID packet is the node having a number next to the larger number. Therefore, a third self-ID packet is issued from the node C9. This corresponds to the ID packet (ID #2) 1204 of the node C shown in FIG. 19. The self-ID packet at this time becomes PKT2 shown in FIG. 20C.

The PKT2 is the third self-ID packet and so "phy ID" of the PKT2 is set to #2. The value of "gap cnt" is reflected by a value of a gap count presently set in the node C. The conditions of the node C are applied to "sp", "del", "c" and "pwr".

The field "p0" shows a connection state of the port P0 of the node C. Since the local bus bridge 1 is the parent node, "p0" is set to #10. The field "p1" shows a state of the port P1 of the node C9 and, since the port P1 of the node C9 is not connected anywhere, it is set to #01. Since no port P2 is not in the node C9, "p2" is set to #00.

The "i" bit indicates whether or not a bus reset is generated and is changed according to the situation. Since, in this case, the local bus bridge 1 issues the bus reset, "i" is set to #0. Since there is no other port in the node C9, an absence of the consolidated self-ID packet is shown by setting "m" to #0.

When the issuance of the self-ID packet of the node C is completed, the local bus bridge 1 issues the self-ID packet as the root since there is no other node. Since the 16 virtual ports exist in the local bus bridge 1, three self-ID packets 1205 (ID #1 (1/3)), 1206 (ID #1 (2/3)) and 1207 (ID #1 (3/3)) are transmitted as shown in FIG. 19. Detailed constructions of the self-ID packets in this case are shown in FIGS. 20D, 20E and 20F as packets PKT3, PKT4 and PKT5, respectively.

The PKT3 is the fourth self-ID packet and so "phy ID" of the PKT3 is set to #3. The values of "gap cnt",. "sp" and "c" are the same as those in the registration mode.

The ports P0 and P1 are those actually existing in the local bus bridge 1. In the embodiment shown in FIG. 18, both of the 2 ports are connected to anywhere and, therefore, "p0" and "p1" are set to #11, respectively. Since the local bus bridge 1 generates the bus reset, "i" is set to #1. The "m" bit, which requires successive 3 self-ID packets, is set to #1.

Although the information of the portal B would be assigned to "p2", "p3" to "p10" of the self-ID packet (ID #1 (2/3)) 1206 or PKT4 and "p11" to "p15" of the self-ID packet (ID #1 (3/3)) 1207 or PKT4, the portal B information is not obtained at this time point. Therefore, they are set to #01, respectively, in order to make them look like non-connection states for convenience.

When a predetermined time lapses from an end of the self-ID packets of the local bus bridge 1 and the subaction gap is generated, the state (Subaction Gap) 1208 is sent from the PHY and the self identification phase is completed. The topology at this time point is configured by the node A, the node B, the node C and the local bus bridge 1 shown in FIG. 21.

Subsequent thereto, the local bus bridge 1 detects the registration mode on the local bus on the portal A side. In this detecting operation, EUI-64 of the node A, which is stored in the EEPROM 8 (shown in FIG. 1) in the registration mode, is stored in the register of the CSR control portion 54 (Step S11 in FIG. 9).

First, EUI-64 of the configuration ROM directed to the node B having the node ID #0 are read out at a transfer speed S100 (100 Mbps). The data of EUI-64 thus registered is compared with the data of EUI-64 of the configuration ROM. Since the registered data is of the node A, a result of the comparison is inconsistent. Similarly, data is read out from the node B having the node ID #0 and the data is compared with, a result being also inconsistent. Further, data is read out from the node A having the node ID #1. In this case, the values of EUI-64 are consistent with those of the node registered in the registration mode (Steps S12 and S13 in FIG. 9 and Steps S19 and S20 in FIG. 11).

Subsequent thereto, when an acknowledge packet and a response packet are received from the node A, which transmits the same read request packet at a transfer speed S200 (200 Mbps), the node A further transmits the read request packet at a transfer speed S400 (400 Mbps). When the node A does not transmit the acknowledge packet with respect to the read request packet transmitted at S400, the local bus bridge 1 determines that the transfer capability of the node A is up to S200. In this case, the node ID of the registered node A is #1 and the transfer performance code (S100 or S200 or S400) is notified to the ID conversion portion 53.

The node ID obtained at the determination of the registered node and the transfer performance code obtained at the detection of the registered node are stored in the ID conversion table 531 in the ID conversion portion 53 and managed. FIG. 22 shows the ID conversion table reflecting the above matters.

In FIG. 22, the values of EUI-64 of the registered node are in the portal A node management number 521*a*. In FIG. 22, it is #1, temporarily. The transfer performance code of the node A, which is consistent with the portal A node management number 531*a*, is stored in the field of the portal A transfer performance code 531*b*. #1 is stored therefor under an assumption of S200.

The node ID of the node A, which is consistent with the portal A management number 531*a*, is stored in the portal A node ID 531*c*. Thus, all information of the portal A in the ID conversion table 531 is obtained. Meanwhile, since the table on the portal A side related to the portal B side is not decided, the operation of ID conversion is not performed. This is represented by transmitting "ACK BUSY" to the portal B side. It is of course possible to obtain the same effect by transmitting "NO ACK" thereto. What is important is to not react to the transaction of the portal B.

Next, in order to obtain the topology of the portal B, the local bus bridge 1 causes the portal B to generate the bus reset (Steps S14 and S15 in FIG. 10). The bus reset is performed by issuing a bus reset request to the standard PHY function 7 connected to the outer portal 4.

Figure 23:
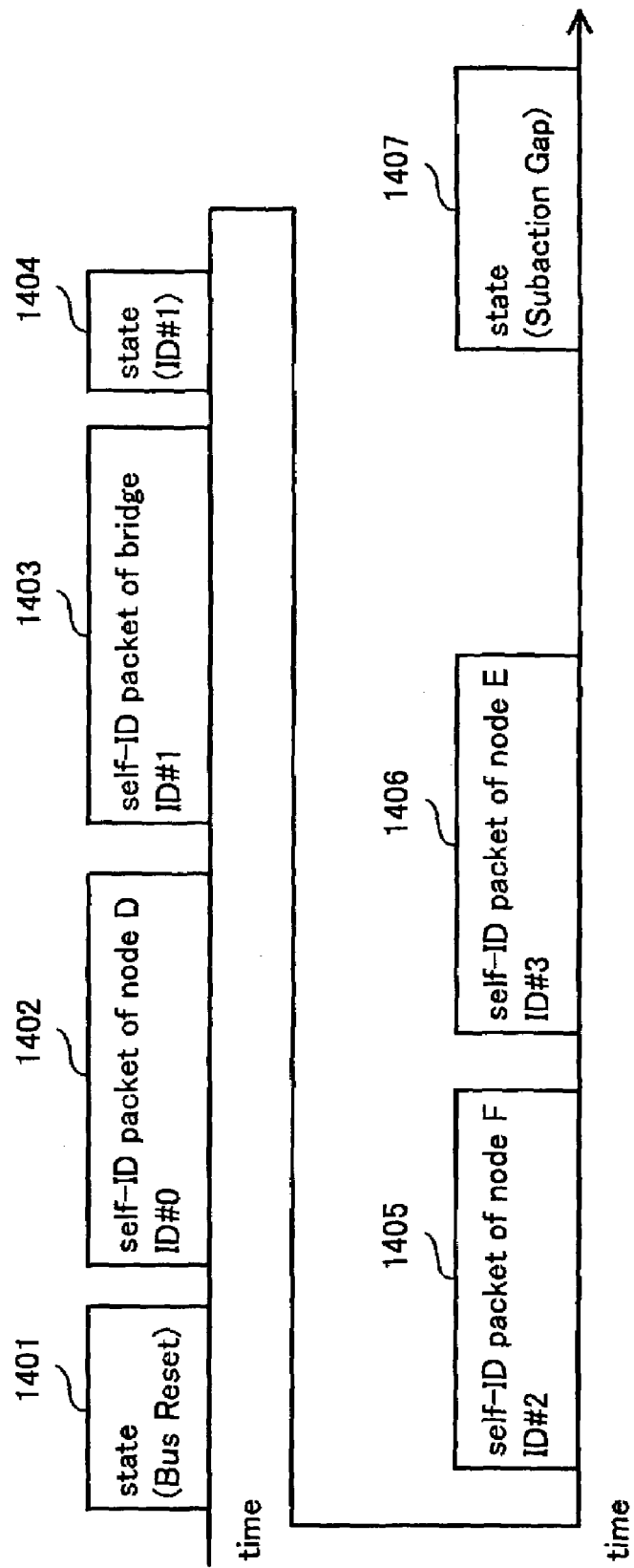
FIG. 23 shows a flow from an issuance of an initial bus reset to a portal B to an end of the self identification phase in the normal mode, according to the embodiment of the present invention.

FIG. 23 shows a flow from a transmission of a first bus reset to the portal B in the usual mode to an end of the self identification phase in this embodiment and FIG. 24 shows a construction of the ID conversion table constructed by the self identification phase of the portal B in this embodiment. The operation of the self identification phase of the portal B will be described with reference to FIG. 23 and FIG. 24.

In FIG. 23, the operational shift of the self identification phase from the generation of the bus reset to the end of the self identification is shown in time series. FIG. 24 shows the ID conversion table 531 in this operational shift. When the bus reset occurs on the local bus of the portal B, a state (Bus Reset) 1401 notifying a start of bus reset is generated by the PHY.

Next, the topology is constructed between the nodes D, E, F and the local bus bridge 1 to determine child nodes and a parent node to thereby start the self identification phase (Step S16 in FIG. 10). Since the PHY on the side of the portal B is the standard PHY function 7, the self identification is performed according to the IEEE1394 standard.

Assuming, in the connection state shown in FIG. 21, that the node E becomes the root, the transmission sequence of the self-ID packets is performed sequentially started from the side of a port 0 of the child node looked from the root. Therefore, in this case, the first self-ID packet is issued from the node D. This corresponds to the self-ID packet (ID #0) 1402 in FIG. 23. Since this self-ID packet is the first self-ID packet of the local bus of the portal B, the node ID of the node D becomes #0.

When the local bus bridge 1 receives this self-ID packet, the ID conversion portion 53 sets a pointer to the number #00 of the virtual port management number 531*l* of the ID conversion table 531 and stores #0 in the field of the node ID 531*f* of the portal B corresponding to the line including the pointer. Further, the ID conversion portion 53 sets the portal B node active flag 531*h* to #1. If this node is a contender, the ID conversion portion 53 will set the portal B contender flag 531*k* to #1. In this description, it is assumed that the node is not a contender.

Next, a node, which is allowed by the root to transmit a self-ID packet, is the local bus bridge 1, which has a larger number next to the minimum number. Therefore, a second self-ID packet is transmitted by the local bus bridge 1. This packet corresponds to the self-ID packet (ID #1) 1403 shown in FIG. 23.

Since the self-ID packet (ID #1) 1403 is the second self-ID packet, the node ID of the local bus bridge 1 becomes #1. When the local bus bridge 1 receives this self-ID packet, the ID conversion portion 53 sets a pointer to the number #01 to the virtual port management number 531*l* of the ID conversion table 531 and stores #1 in the field of the portal B node ID 531*f* corresponding to the line thereof. Further, the ID conversion portion 53 sets the portal B node active flag 351*h* to #1. Further, since the local bus bridge 1 is a contender, the ID conversion portion 53 sets the portal B contender flag 531*k* to #1.

The local bus bridge 1 is notified by the standard PHY function 7 of a state (ID #1) 1404 indicating that the node ID thereof is #1, after the self-ID packet (ID #1) 1403. When the local bus bridge 1 receives this notice, the bridge 1 recognizes that the PHY thereof transmits the former self-ID packet and, further, sets the portal B self node flag 531*i* to #1.

A node having a small number next to the larger number is the node F9. Therefore, a third self-ID packet is issued from the node F9. This packet corresponds to an ID packet (ID #2) 1405 of a node F shown in FIG. 23.

Since the ID packet (ID #2) 1405 of the node F is the third self-ID packet, the node ID of the node F9 becomes #2. When the local bus bridge 1 receives the third self-ID packet, the ID conversion portion 53 sets the pointer to the number #02 of the virtual port management number 531*l* of the ID conversion table 531 and stores #2 in the field of the portal B node ID 531*f* corresponding to the same line thereof. Further, the ID conversion portion 53 sets the portal B node active flag 351*h* to #1. Incidentally, the node F in this embodiment is assumed as being not a contender.

When the issuance of the self-ID of the node F is completed, the node E, which is the root, issues the self-ID packet since there is no other node. The self-ID packet corresponds to the node E self-ID packet (ID #3) 1406 in FIG. 23.

Since the node ID of the node E is a fourth node, the node ID becomes #3. When the local bus bridge 1 receives this self-ID packet, the ID conversion portion 53 sets the pointer to number #03 of the virtual port management number 531*l* of the ID conversion table 531 and stores #3 in the field of the portal B node ID 531*f* corresponding to the same line. Further, the ID conversion portion 53 sets the portal B node active flag 351*h* to #1. Assuming that the node E is a contender, the ID conversion portion 53 sets the portal B contender flag 531*k* to #1.

When a predetermined time lapses from an end of transmission of the self-ID packet of the node E and a subaction gap occurs, the local bus bridge 1 is notified by the PHY of a state (Subaction Gap) 1407 indicating that the self identification phase is ended. Thus, the local bus bridge 1 recognizes the end of the self identification phase and that the node E, which lastly transmitted the self-ID packet, is the root and, further, sets the portal B root flag 531*j* to #1.

At this time point, it is checked whether or not the root node is a contender. Since, in this embodiment, the node ID of the root node is consistent with the node ID of the contender node, the construction of the portal B side of the ID conversion table 531 is completed.

In a case where the node ID of the root node is inconsistent with the node ID of the contender node, the local bus bridge 1 issues the bus reset by transmitting a PHY configuration packet, which makes the self node of the local bus bridge 1 a fourth root. When the bus reset is issued by transmitting this packet, the local bus bridge 1, which is the contender, can become the root in a next construction of topology. Details of this matter are defined by the IEEE1394 standard.

Subsequently, the self identification phase is started again. In this case, the local bus bridge 1 becomes the root without fail and so it is possible to reliably complete the construction of the ID conversion table 531. FIG. 24 shows a state of the ID conversion table 531 constructed by the self identification phases of the portal B.

When the self identification phase is completed, the local bus bridge 1 starts a reading of all of node IDs of the node configuration ROM of the portal B (step S17 in FIG. 10). The node IDs in the configuration ROM includes EUI-64 of each of the nodes.

Each node ID of the portal B, which is obtained by an analysis of the topology, can not be used directly in identifying the node. This is because, when a next bus reset occurs, the node ID possibly becomes a completely different. Therefore, it becomes necessary to manage the respective nodes by using node IDs in the configuration ROM.

The ID conversion portion 53 reads the node IDs in the configuration ROM of the respective nodes by using the portal B node ID 531f, the portal B node active flag 531h, the portal B self node flag 531i and the portal B root flag 531j in the ID conversion table 531 constructed in the self identification phase at the time of the bus reset by the portal B and registers the identifiers in the portal B node management number 531d (step S18 in FIG. 10.

FIG. 25 shows a construction of the ID conversion table at the time when the node management number of the portal B is acquired in this embodiment. The acquisition procedures of the portal B node management number 531d will be described with reference to FIG. 25.

At the time when the above-mentioned self identification phase is completed, the local bus bridge 1 sets the pointer of the virtual port management number 531l to #00. Next, the local bus bridge 1 confirms that the portal B root flag 531j and the portal B self node flag 531i are inactive and that the portal B node active flag 531h is active.

In a line of the pointer #00 of the virtual port management number 531l of the ID conversion table 531, the above conditions are satisfied. Therefore, the local bus bridge 1 checks the portal B node ID 531f corresponding to the pointer #00 of the virtual port management number 531l. In this embodiment, the portal B node ID 531f is #0. Next, the local bus bridge 1 reads a node ID in the configuration ROM of a node whose node ID of the portal B is #0, that is, the node D. In this case, the local bus bridge 1 tries a reading at transfer speed S400. It is assumed here that the transfer speed capability of the node D is S100.

The node D does not react to a read request of the node ID in the configuration ROM from the local bus bridge 1 to the node D. Next, the local bus bridge 1 requests a reading of node ID in the configuration ROM at S200 to the node D. The node D can not react thereto necessarily.

Next, the local bus bridge 1 requests a reading of node ID in the configuration ROM at S100 to the node D. Since this transfer speed is consistent with the transfer capability of the node D, the node D reacts thereto and replies to the node ID in the configuration ROM. When the local bus bridge 1 recognizes that the transfer speed of the node D is S100 and can acquire the node ID in the configuration ROM.

The acquired node ID data in the configuration ROM is stored in the field of the portal B node management number 531d. In this example, it is assumed that the node ID of the node D in the configuration ROM is #2. Since the transfer performance of the local bus bridge 1 is S100, the portal B node transfer performance 531e is set to #00. Thus, all of the information of the node D are prepared.

Next, the local bus bridge 1 sets the pointer of the virtual port management number 531l to #0. The local bus bridge 1 checks whether the portal B root flag 531j and the portal B self node flag 531i are inactive and whether the portal B node active flag 531h is active. Thus, the local bus bridge 1 recognizes that the portal B self node flag 531i is active. That is, the local bus bridge 1 recognizes that the reading of the node ID in the configuration ROM is unnecessary. However, since the portal B root flag 531j is inactive, It is clear that nodes, for which the reading of node IDs in the configuration ROM is not ended, exist.

Next, the local bus bridge 1 sets the pointer of the virtual port management number 531l to #02 and checks whether the portal B root flag 531j and the portal B self node flag 531i are inactive and whether the portal B node active flag 531h is active. This condition is satisfied by the line including the pointer #02 of the virtual port management number 531l of the ID conversion table 531. Then, the local bus bridge 1 checks the portal B node ID 531f corresponding to the pointer #02 of the virtual port management number 531l. In this embodiment, the portal B node ID 531f is #2.

Next, the local bus bridge 1 reads the node ID in the configuration ROM for a node having the portal B node ID is #2, that is, the node F. Similarly to the case of the node D, the local bus bridge 1 tries a reading at the transfer speed of S400. It is assumed in this case that the transfer speed capability of the node F is S200.

The node F does not react to the read request of the node ID in the configuration ROM to the node F at S400. The node F reacts to the read request at S200 and sends a response to the node ID in the configuration ROM.

The local bus bridge 1 knows that the transfer speed of the node F is S200 and can acquire the node ID in the configuration ROM. The acquired node ID data in the configuration ROM is stored in the portal B node management number 531d.

In this embodiment, it is assumed that the node ID of the portal F in the configuration ROM is #3. Since the transfer performance of the node F is S200, the portal B node transfer performance code 531e is set to #01. Thus, all of the information of the node F are prepared.

Next, the local bus bridge 1 sets the pointer of the virtual port management number 531l to #03 and checks whether the portal B root flag 531j and the portal B self node flag 531i are inactive and whether the portal B node active flag 531h is active. It is clear from the line including the pointer #03 of the virtual port management number 531l of the ID conversion table 531 that the portal B root flag 531j is active and this node has the largest node ID and that there is no node having node ID larger than the largest node ID. Therefore, the local bus bridge 1 can recognize that this reading operation of the node ID in the configuration ROM is the last reading operation.

Next, the portal B node ID 531f corresponding to the pointer #03 of the virtual port management number 531l is checked. In this embodiment, the portal B node ID 531f is #3. The local bus bridge 1 reads the node ID in the configuration ROM for a node having the portal B node ID, which is #3, that is, the node E. Similarly to the case of the node D, the local bus bridge 1 tries a reading by changing the transfer speed from S400. It is assumed in this case that the transfer speed capability of the node F is S400.

The node E can react to the read request of the node ID in the configuration ROM to the node E at S400 and sends a response to the node ID in the configuration ROM. The local bus bridge 1 knows that the transfer speed of the node E is S400 and can acquire the node ID in the configuration ROM.

Data of the acquired node ID in the configuration ROM is stored in the portal B node management number 531d. In this embodiment, it is assumed that the node ID in the configuration ROM of the portal E is #4. Since the transfer performance of the node E is S400, the portal B node transfer performance code 531e is set to #10. Thus, all of the information of the node F are prepared. Further, since this node is the root node as mentioned previously, it is clear that an information of all nodes can be acquired.

An operation when the portal B node active flag 531h is inactive will be described. When the portal B node active flag 531h is inactive, the read operation of the node ID in the configuration ROM in this line is not performed and the pointer of the virtual port management number 531*l* is increased by one.

These operations will be described briefly. A node whose portal B node active flag 531*h* is active is the node having a node identifier in the configuration ROM to be checked and a node having the portal B self node flag 531*i* risen is excluded. When the portal B root flag 531*j* is found, the node corresponding thereto is the last node. The pointer of the virtual port management number 531*l* is started from #00 and the checking is performed by increasing the pointer one by one.

Figure 26:
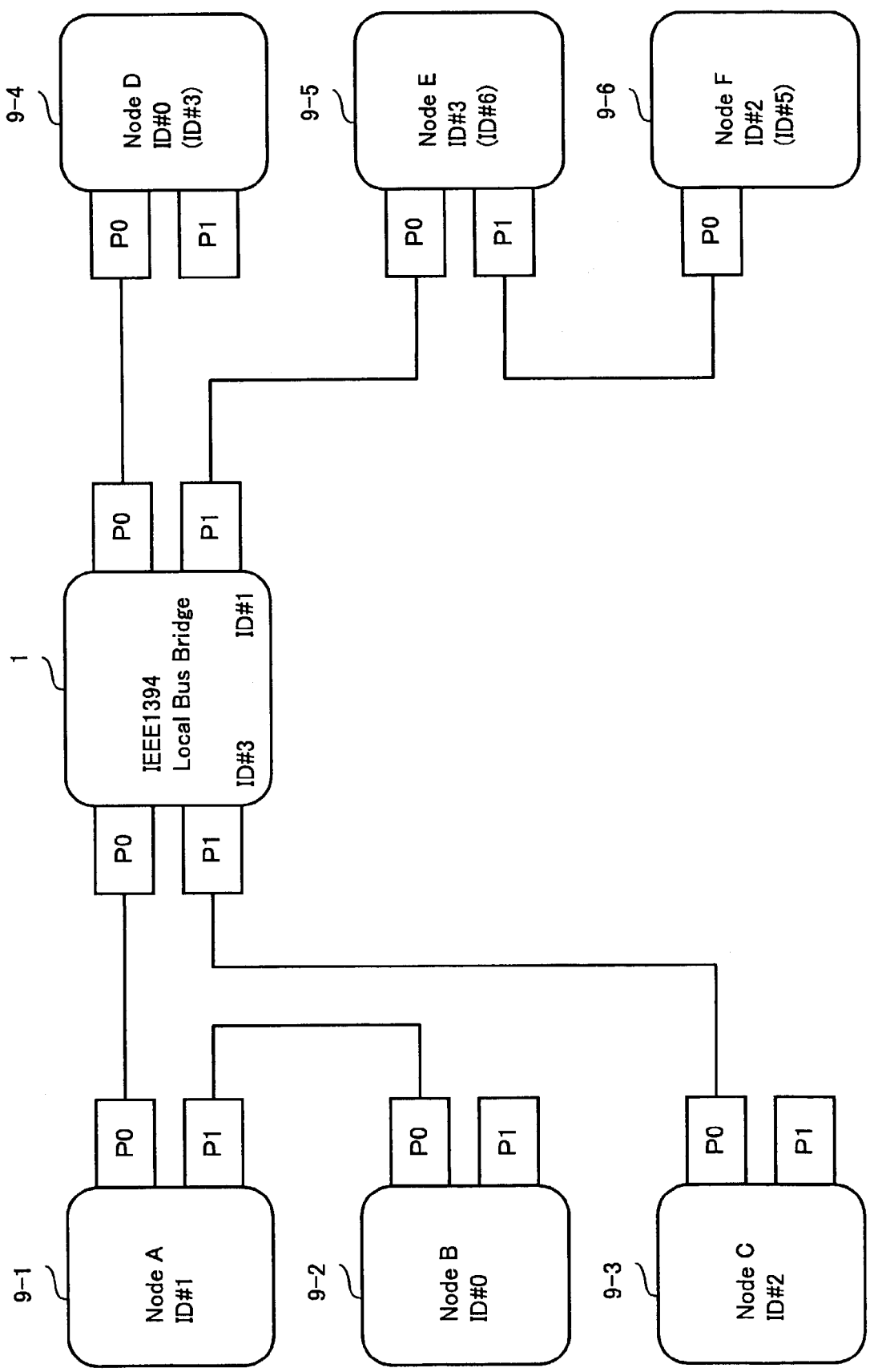
FIG. 26 shows a state where an ID conversion table information of the portal A and the portal B in the normal mode, in the embodiment of the present invention.

FIG. 26 shows a state where all of the ID conversion table information of the portals A and B in the usual mode are completed according to the embodiment of the present invention. In FIG. 26, the ID conversion table information of the portals A and B is established through the previously described procedures.

In FIG. 26, the portal A includes the node A, the node B, the node C and the local bus bridge 1 and the node IDs thereof are #1, #0, #2 and #3, respectively. The portal B includes the node D, the node E, the node F and the local bus bridge 1 and the node IDs thereof are #0, #3, #1 and #2, respectively.

In this state, the local buses of the portal A and the portal B are independent from each other and the packet transfer is possible in each of the local buses. However, since the portal B can not be seen by the portal A, it is impossible to transfer a packet from the portal A to the portal B.

Figure 27:
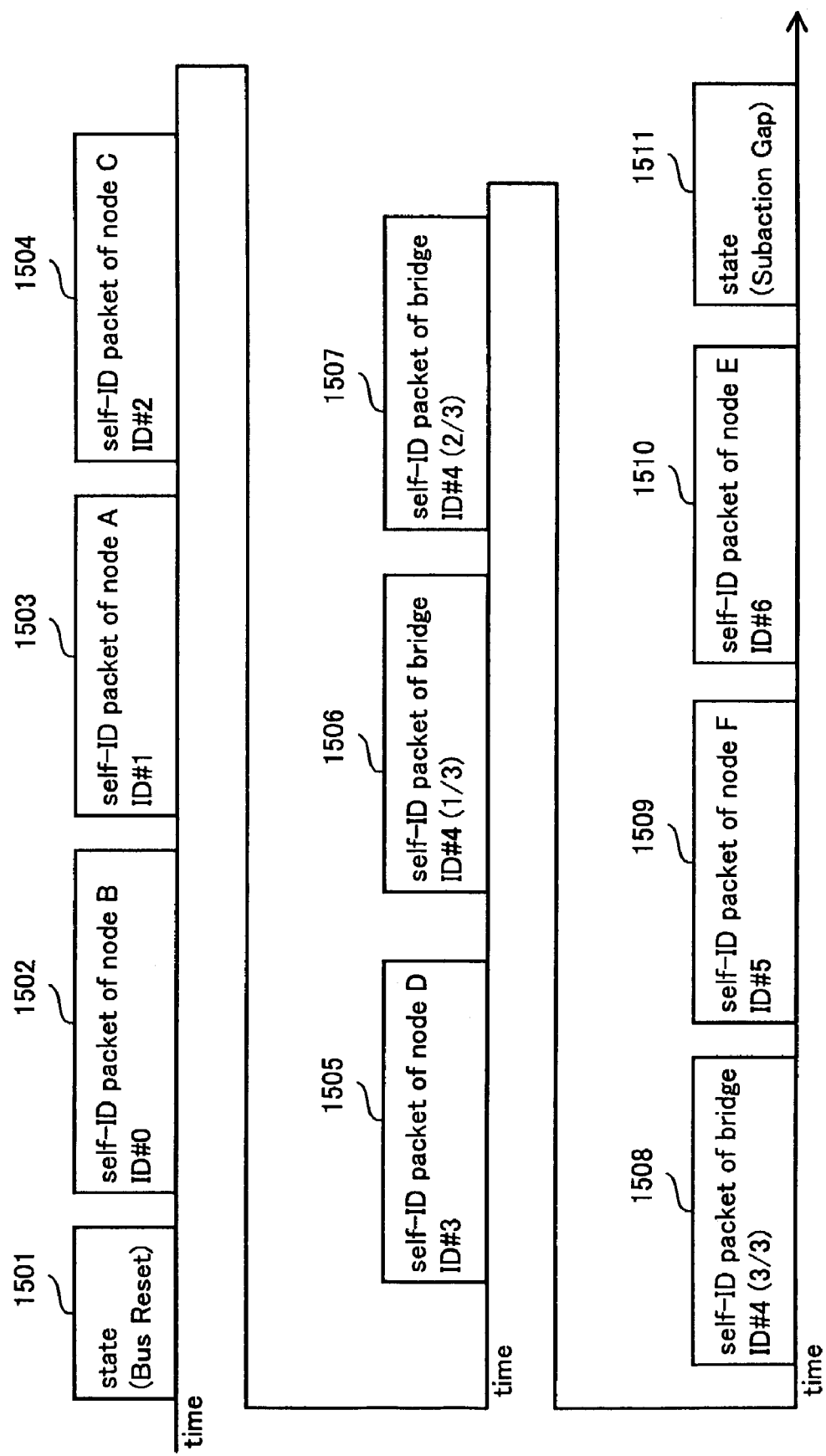
FIG. 27 shows a flow from a second issuance of an initial bus reset to the portal A to an end of the self identification phase in the normal mode, according to the embodiment of the present invention.
Figure 29:
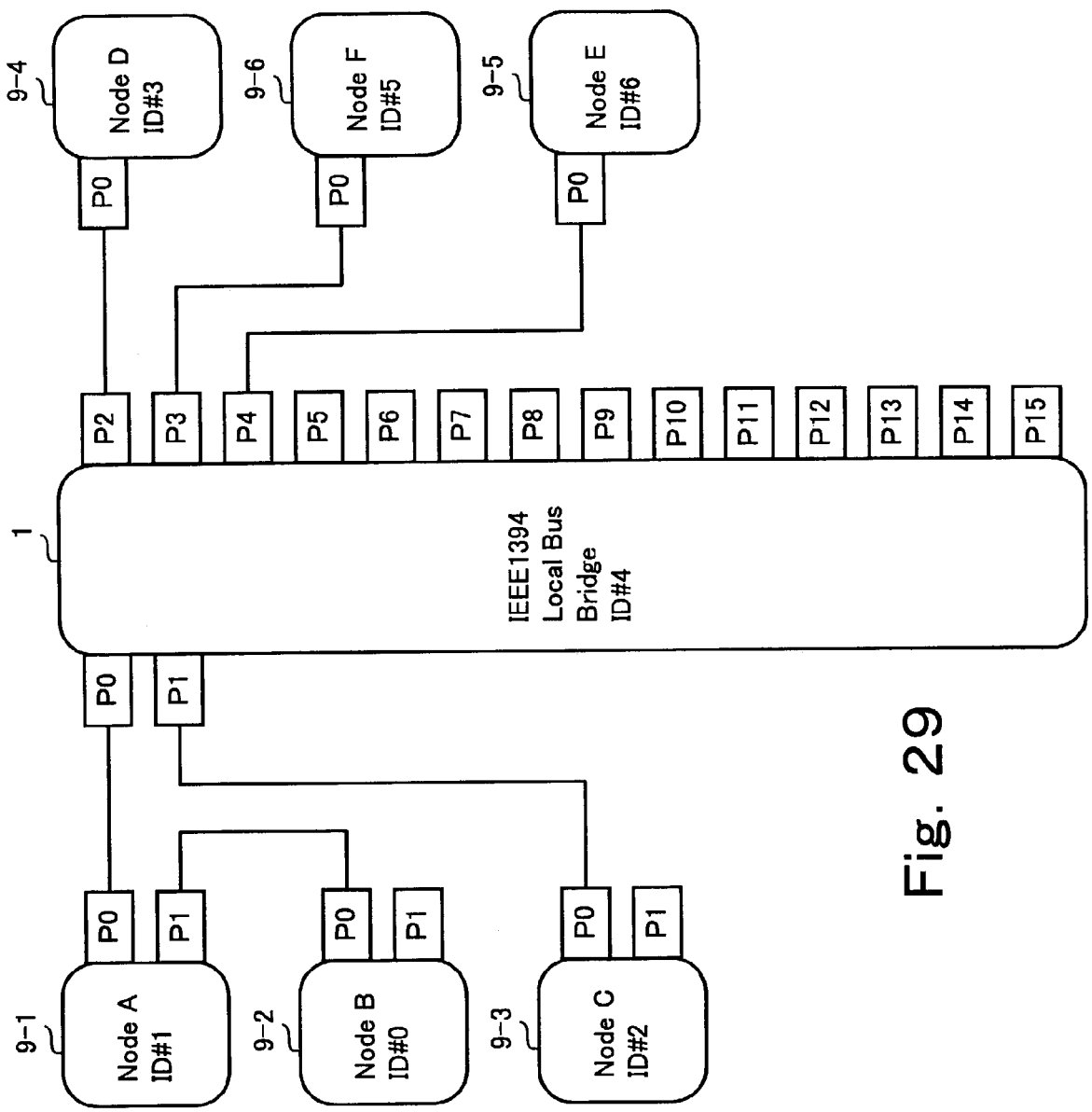
FIG. 29 shows an image of an ID conversion table looked from the portal A when the construction of the ID conversion table is ended in the embodiment of the present invention.
Figure 30:
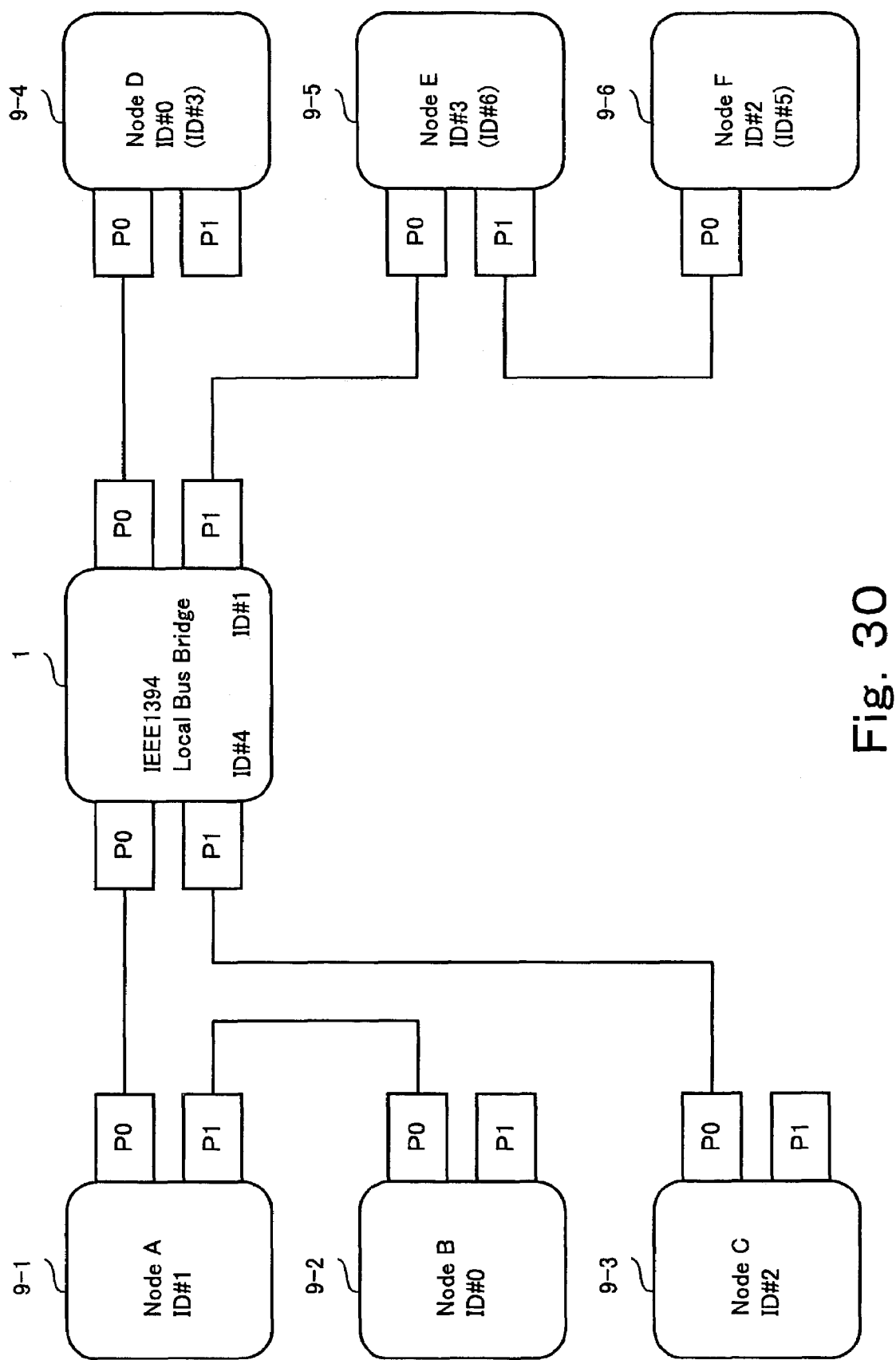
FIG. 30 shows a state of a node ID when the construction of the ID conversion table is ended in the embodiment of the present invention.

FIG. 27 shows a flow from an issuance of a second bus reset to the portal A to an end of the self identification phase in the usual mode according to the embodiment of the present invention and FIG. 28A to FIG. 28I show a detailed construction of the self-ID packet of each node at a time of issuance of the second bus reset of the portal A in the usual mode according to the embodiment of the present invention. FIG. 29 shows an image looked from the portal A at a time when the construction of the ID conversion table is completed, according to the embodiment and FIG. 30 shows a state of the node ID at the time when the construction of the ID conversion table is completed, according to the embodiment. A method for transmitting an information of the portal B to the portal A will be described with reference to FIG. 25 and FIG. 27 to FIG. 30.

In FIG. 27, the operational shift of the self identification phase from the generation of the bus reset to the end of the self identification is shown in time series. FIGS. 28A to 28I to 29D show details of a self-ID packet PKT0 of the node B, a self-ID packet PKT1 of the node A, a self-ID packet PKT2 of the node C, a self-ID packet PKT3 of the node D, self-ID packets PKT4, PKT5 and PKT6 of the IEEE1394 local bus, a self-ID packet PKT7 of the node F and a self-ID packet PKT8 of the node E.

First, the local bus bridge 1 issues a bus reset to the portal A. when the bus reset is generated, the self identification phase of the portal A is started. This operation is similar to the described portal A self identification phase. When a bus reset is generated on the local bus of the portal A, a state (Bus Reset) 1501 notifying the bus reset start is given by the PHY. Thereafter, the construction of topology is performed within the portal A.

Next, the self identification phase is started in the portal A. As shown in FIG. 27, FIGS. 28A to 28I, the self-ID packets are transmitted in the order from the node B, the node A and the node C. After the self-ID packets of the nodes of the portal A are received, the local bus bridge 1 transmits the self-ID packets thereof. The ID conversion table 531 of the ID conversion portion 53 sets the pointer of the virtual port management number 531*l* to #00.

Next, the ID conversion portion 53 checks whether or not the portal B node active flag 531*h* is active. When it is active, the ID conversion portion 53 checks whether or not the portal B self node flag 531*i* is active and then checks the state of the portal B root flag 531*j*. If the portal B node active flag 531*i* is inactive, the ID conversion portion 53 adds #1 to the pointer of the virtual port management number 531*l* and performs the same checking.

In this embodiment, the portal B node active flag 531*h* in the line of the pointer #00 of the virtual port management number 531*l* is active. Therefore, the ID conversion portion 53 sets a node ID #3, which is the last node ID #2 of the self-ID packets received from the nodes of the portal A added by #1, in the ID conversion table 531. This is to assign successively increasing numbers to the node IDs of the self-ID packets according to the IEEE1394 standard.

As to the checking of the portal B self-ID flag 531*i*, it is not active. Therefore, the ID conversion portion 53 decides that the self-ID packet of the virtual port of the portal B has to be transmitted as a child node of the local bus bridge 1. As to the checking of the state of the portal B root flag 531*j*, it is not active and the ID conversion portion 53 recognizes that there is a next self-ID packet. When the ID conversion portion 53 confirms these checking, it generates a self-ID packet on the basis of the information of the ID conversion table 531. This corresponds to the self-ID packet PKT3 of the node D shown in FIG. 28D.

On the PKT3, "phy ID" is set to #3 which is the value of the portal A node ID 531*c* in the ID conversion table 531, "sp" is set to #0 which is the value of the portal B transfer performance code 531*e* of the ID conversion table 531, "c" is set to #0 which is the the state of the portal B contender flag 531*k* of the ID conversion table 531. Since the portal B self node flag 531*i* is not active, "p0" is set to #10 as a child node.

When the generation of the self-ID packet corresponding to the node D is completed, the ID conversion portion 53 transmits the self-ID packet to the portal A. This corresponds to the ID packet (ID #3) 1505 of the node D shown in FIG. 27. Since the portal B root flag 531*j* is not active as yet, a preparation of transmission of a next self-ID packet is performed.

First, the ID conversion portion 53 sets the pointer of the virtual port management number 531*l* to #01 by adding #1 thereto. The portal B node active flag 531*h* in the line of the virtual port management number 531*l* #01 is active. Therefore, the ID conversion portion 53 sets a node ID #4, which is the node ID number #3 assigned to the portal a node ID 531*c* added by #1, in the ID conversion table 531.

Next, the ID conversion portion 53 checks the portal B self node flag 531*i*, which is active. Therefore, the local bus bridge 1 decides that self-ID packets are to be transmitted subsequent thereto. The ID conversion portion 53 generates the self-ID packets on the basis of the ID conversion table 531. The self-ID packets are shown in FIGS. 28E to 28G as PKT4, PKT5 and PKT6 respectively.

On each of the self-ID packets PKT4, PKT5 and PKT6, "phy ID" is set to #4 which is the value of the portal A node ID 531*c* in the ID conversion table 531. Since nodes connected to the port P0, P1 and P2 of the local bus bridge 1 have smaller IDs than that of the local bus bridge 1, these nodes are handled as child nodes. Therefore, "p0", "p1" and "p2" of the PKT4 are set to #11. Since nodes connected to the port P3 and P4 of the local bus bridge 1 have larger IDs than that of the local bus bridge 1, these nodes are handled as parent nodes and "p3" and "p4" of the PKT5 are set to #10. Since no node is connected to ports P5 to P15 of the local bus bridge 1, "p5" to "p10" of the PKT5 and "p11" to "p15" of the PKT6 are set to #01 as being not connected. When the self-ID packets corresponding to the self nodes are generated, the ID conversion portion 53 transmits the self-ID packets 1505 (ID #1 (1/3)), 1506 (ID #1 (2/3) and 1507 (ID #1 (3/3) shown in FIG. 27 to the portal A.

Since the portal B root flag 531*j* is still not active, the ID conversion portion 53 is moved to a preparation of transmission of the self-ID packet. The ID conversion portion 53 sets the pointer of the virtual port management number 531*l* to #02 by adding #1. The portal B node active flag 531*h* of the same line is active. Therefore, the ID conversion portion 53 sets the node ID #5 in the ID conversion table 531 by adding #1 to the node ID number #4 assigned to the portal a node ID 531*c*.

Next, the ID conversion portion 53 decides that the portal B self node flag 531*i* is already transmitted and that the self-ID packet of the virtual port of the portal B is to be transmitted as the parent node of the local bus bridge 1. After the ID conversion portion 53 confirms these matters, it generates the self-ID packet on the basis of the information of the ID conversion table 531. The self-ID packet is the self-ID packet PKT7 of the node F shown in FIG. 28H.

On the PKT7, "phy ID" is set to #5 which is the value of the portal A node ID 531*c* of the ID conversion table 531, "sp" is set to #1 which is the value of the portal B transfer performance code 531*e* of the ID conversion table 531, "c" is set to #0 which is the state of the portal B contender flag 531*k* of the ID conversion table 531. Since the portal B self node flag 531*i* becomes active, "p0" is set to #11 as a parent node. After the self-ID packet corresponding to the node F is generated, the ID conversion portion 53 transmits the self-ID packet to the portal A. This packet corresponds to the ID packet (ID #5) 1509 of the node F shown in FIG. 27. Since the portal B root flag 531*j* is still not active, the ID conversion portion 53 enters into the preparation of transmission of a next self-ID packet.

The ID conversion portion 53 sets the pointer of the virtual port management number 531*l* to #03 by adding #1 thereto. The portal B node active flag 531*h* in the same line is active. Therefore, the ID conversion portion 53 sets the node ID #6 in the ID conversion table 531 by adding #1 to the node ID number #4 assigned to the portal a node ID 531*c*.

Next, the ID conversion portion 53 decides that the portal B self node flag 531*i* is already transmitted and that the self-ID packet of the virtual port of the portal B is to be transmitted as the parent node of the local bus bridge 1. After the ID conversion portion 53 confirms these matters, it generates the self-ID packet on the basis of the information of the ID conversion table 531. The self-ID packet is the self-ID packet PKT8 of the node F shown in FIG. 28I.

On the PKT8, "phy ID" is set to #6 which is the value of the portal A node ID 531*c* of the ID conversion table 531, "sp" is set to #2 which is the value of the portal B transfer performance code 531*e* of the ID conversion table 531 and "c" is set to #1 which is the state of the portal B contender flag 531*k* of the ID conversion table 531. Since the portal B self node flag 531*i* becomes active, "p0" is set to #11 as a parent node. After the self-ID packet corresponding to the node E is generated, the ID conversion portion 53 transmits the self-ID packet to the portal A. This packet corresponds to the ID packet (ID #6) 1510 of the node E shown in FIG. 27. Since the portal B root flag 531*j* is active, the ID conversion portion 53 decides that the transmission of the self-ID packets is completed and does not enter into the preparation of transmission of a next self-ID packet.

When the subaction gap is generated after a predetermined time from the completion of self-ID packet transmission, the state (Subaction Gap) 1511 is notified by the PHY and the self identification phase is ended. The information of the portal B is transmitted to the portal A through these self identification phase of the portal A.

FIG. 29 shows the topology image looked from the portal A in which the node IDs of the nodes A, B and C become #1, #0 and #2, respectively. Next, the node D is connected to the port P2 of the local bus bridge 1 and the node ID thereof is #3 and the node ID of the local bus bridge 1 becomes #4.

The node F is connected to the port P3 of the local bus bridge 1 and the node ID thereof becomes #5. The node E is connected to the port P4 of the local bus bridge 1 and becomes the root having the node ID of #6. Other virtual ports are looked like being connected to nothing. In this manner, the self identification phase for transmitting the topology of the portal B to the portal A is completed.

Thereafter, the local bus bridge 1 detects registered nodes on the bus on the side of the portal A. Since an operation therefor is the same as that described above, the operation will not be described. The node ID number #2 and the transfer performance code of the detected node A is notified to the ID conversion portion 53.

The construction of the ID conversion table 531 is completed through these operations, resulting in that the usual ID conversion becomes possible. FIG. 30 shows the node IDs looked from the portal A and the node IDs looked from the portal B.

The topology of the portal A becomes, from lower node ID, the node B, the node A, the node C, the node D, the local bus bridge 1, the node F and the node E. The registered node A can access to these nodes.

Next, the topology of the portal B becomes, from lower node ID, the node D, the local bus bridge 1, the node F and the node E. Since the local bus bridge 1 completely becomes the registered node A, the actual topology of the portal B looks, from lower node ID, the node D, the node A, the node F and the node E. That is, the node B and the node C, which belong to the local bus bridge 1 to which the registered node A is connected, can be completely hidden from the portal B.

Now, the operation for ID conversion will be described with reference to FIG. 25 and FIG. 30. In FIG. 30, it is assumed that the packet transfer from the node A to the node E occurs. The node ID of the node E looked from the portal A is #6. Therefore, the packet is transmitted from the node A with the origination node ID being #1 and the destination node ID being #6.

When the local bus bridge 1 receives that packet, it checks the originating node ID by referring to the ID conversion table 531 shown in FIG. 25. Since the node ID is #1, the local bus bridge 1 recognizes that the packet is from the node A, which is permitted to transfer the packet to the portal B. If the packet is from a node other than the node A, the transfer to the portal B is not performed.

Next, the local bus bridge 1 checks the destination node ID. The local bus bridge 1 finds the node ID #6 by referring to the portal A node ID 531*c* of the ID conversion table 531 and recognizes that it is a node of the portal B. If the node is not the portal B node, the packet transfer to the portal B is not performed.

And then, the local bus bridge 1 checks the portal B node active flag 531*h* and recognizes that it is active. If the portal B node active flag 531*h* is not risen, the local bus bridge 1 decides that a change of topology of the portal B occurs and the portal A is not notified of this information. Therefore, the local bus bridge 1 issues the bus reset to the portal A and notifies the portal A of the topology of the portal B. When the local bus bridge 1 recognizes through these checks that the packet is to be transferred to the portal B, the ID conversion is started.

The ID conversion is performed through procedures described below. The ID conversion portion 53 searches the portal B node ID 531d in the line in which the portal A node ID 531c of the ID conversion table 531 shown in FIG. 25 is #6 and recognizes the node ID #3. Further, the ID conversion portion 53 recognizes from the portal B node transfer performance code 531e that the transfer at S400 is possible. On the basis of this information, the ID conversion portion 53 converts the originating node ID into #1, which is the node ID of the local bus bridge 1 and the destination node ID into #3, which is the node ID of the portal B node E. After these conversions are completed, the local bus bridge 1 transfers the packet to the portal B and starts a transfer of the packet by changing the transfer speed from S200 to S400.

Next, in FIG. 30, it is assumed that a packet transfer from the node E to the node A occurs. The node ID of the node A looked from the portal B is the node ID of the local bus bridge 1, which is #1. Therefore, the packet is transmitted from the node E with the originating node ID being #3 and the destination node ID being #1. The local bus bridge 1 recognizes that that packet is directed to the local bus bridge itself and it means that the packet transfer to the portal A. If the destination of the packet is other than the self node, the packet transfer to the portal A is not performed.

The local bus bridge 1 completes these checks and, when it recognizes that the packet is to be transferred to the portal A, starts the ID conversion. The ID conversion is performed through procedures described below. The ID conversion portion 53 searches the portal A node ID 531c in the line in which the portal B node ID 531d of the ID conversion table 531 shown in FIG. 25 is #3 and recognizes the node ID #6. Further, the ID conversion portion 53 recognizes from the portal A node transfer performance code 531b that the transfer at S200 is possible. On the basis of this information, the ID conversion portion 53 converts the originating node ID into #6, which is the node ID of the node E. The destination node ID is converted into #1, which is the node ID of the portal A node A. After these conversions are completed, the local bus bridge 1 transfers the packet to the portal A and starts a transfer of the packet by changing the transfer speed from S400 to S200.

The bus reset may occur due to various reasons such as removal or addition of a node in the portal B or change of the root node, etc. When the bus reset occurs, the topology of the portal B must be changed and the topology change must be notified to the portal A. However, when all bus resets are notified to the portal A, the transfer efficiency of the portal A is lowered. Therefore, the local bus bridge 1 can improve the transfer efficiency of the portal A by notifying the latter of only a minimum number of bus resets. Matters under which the portal A is notified of the minimum number of bus resets of the portal B are given below.

First, in the LOCK transaction from the portal A to the portal B, a mismatching between the portal A and the portal B occurs after a LOCK transaction occurs when a substitute function for substituting the local bus bridge 1 for the portal A is given to the local bus bridge 1 in designing the latter and the local bus bridge 1 does not perform the substitution operation or when a bus reset of the portal B occurs after a LOCK transaction occurs when the substitute function is not given to the local bus bridge 1 in designing the latter. In such cases, the mismatching problem is solved by generating a bus reset to the portal A and urging the portal A to issue the LOCK transaction voluntarily.

Second, it is possible to improve the transfer efficiency of the portal A by giving a function of making the isochronous packet transfer to the portal A possible in designing the local bus bridge 1. When another function for making the function valid or invalid is given further, there is a case where a bus reset is expected by an application of the portal A. Therefore, in switching the isochronous packet transfer between valid and invalid, a bus reset is generated in order to notify the application of the fact.

Third, when a new node is added to the portal B, it is necessary to generate a bus reset to the portal A to thereby notify the portal A of the addition of the new node. Fourth, when the root node of the portal B is changed, it is necessary to re-acquire the resources. Therefore, it is necessary to notify the portal A of the bus reset.

The above-described matters under which the bus reset is to be transmitted to the portal A may be summarized as follow: When a case where some thing, which can not be absorbed by the local bus bridge 1, occurs, the matching is performed by the bus reset. When a node is dropped from the portal B, the topology may be transmitted to the portal A by issuing the bus reset thereto. In the local bus bridge 1 of the present invention, however, in order to improve the transfer efficiency of the portal A, the local bus bridge 1 does not generate the bus reset to the portal A by absorbing it in the ID conversion table 531.

Figure 31:
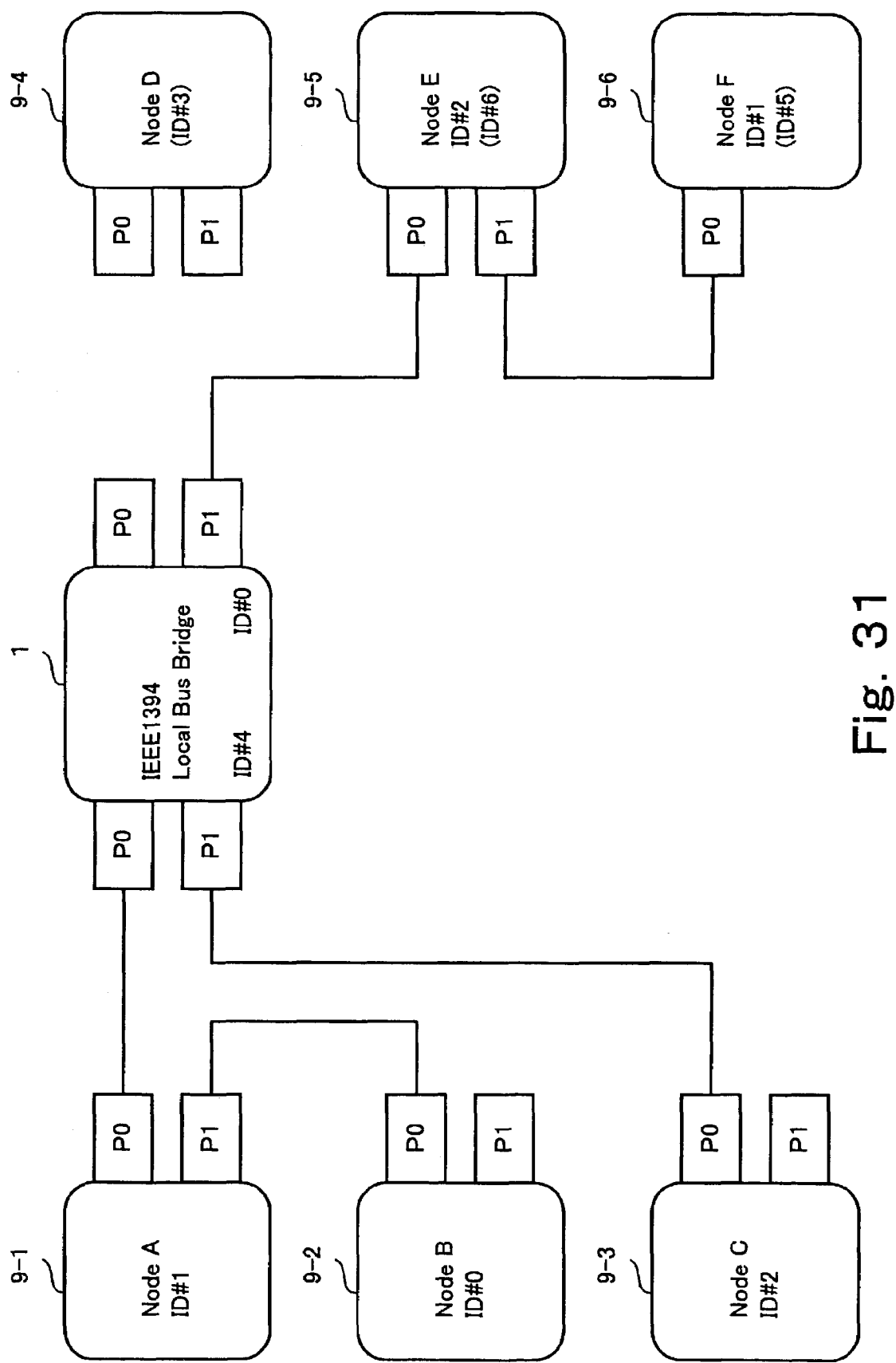
FIG. 31 shows a connection when a node D is disconnected in the embodiment of the present invention.

FIG. 31 shows a connection when the node D is dropped in the embodiment of the present invention and FIG. 32 shows the construction of the ID conversion table when the node D is dropped in the embodiment of the present invention. The above-mentioned method will be described with reference to FIG. 31 and FIG. 32.

FIG. 31 shows a state in which the node D is dropped from the construction shown in FIG. 30. When the node D is dropped, the bus reset is generated in the portal B. In response to the bus reset generation, the local bus bridge 1 clears the portal B node active flag 531h of the ID conversion table 531. Since the bus reset occurs in the portal B, the self identification process is started by self-identifying between the respective nodes. In FIG. 31, the same is performed between the node E, the node F and the local bus bridge 1.

When the self identification process is completed, the local bus bridge 1 starts an acquisition of the node ID of the configuration ROM of each node in order to reconstruct the ID conversion table 531. The acquisition of the node IDs of the configuration ROMs is started from the node of the portal B, which has the youngest node ID. It is assumed in this bus reset that the node ID of the local bus bridge 1 is the youngest and the node ID of the node E is the oldest, the node F being intermediate. The local bus bridge 1 checks the node ID #0, first. Since it is the self node of the local bus bridge 1, the local bus bridge 1 sets the portal B node active flag 531h in a line in the FIG. 32 in which the portal B self node flag 531i is set, that is, the line in which the pointer of the virtual port management number 531l is #01.

Next, the local bus bridge 1 checks the node ID #1 and compares a result of acquisition of the node ID of the configuration ROM having the node ID #1 with the portal B node management number 531d to find a consistency. In this case, the node ID #1 is that of the existing node F and consistent with the pointer #2 of the virtual port management number 531l. The local bus bridge 1 sets the portal B node active flag 531h in the consistent line and updates the portal B node ID 531f and the portal B node transfer performance code 531e.

Next, the local bus bridge 1 checks the node ID #2 and compares a result of acquisition of the node ID of the configuration ROM having the node ID #2 with the portal B node management number 531d to find a consistency. In this case, the node ID #2 is that of the existing node E and is consistent with the pointer #3 of the virtual port management number 531l. The local bus bridge 1 sets the portal B node active flag 531h in the consistent line and updates the portal B node ID 531f and the portal B node transfer performance code 531e.

Further, since this node is the highest node, that is, the root node, the local bus bridge 1 checks whether or not this node is consistent with a previous root node before the bus reset occur. If the root node is changed, the local bus bridge 1 issues the bus reset to the portal A. However, in this example, the root node is not changed. Therefore, the update of the ID conversion table is ended. As a result, the ID conversion table 531 becomes as shown in FIG. 32.

What is important in this time is that the portal A node ID is not changed. Since the relation to the portal A is managed by using the portal B node management number 531d, the mismatching never occurs even when the portal B node ID is changed in any way. If there is any mismatching, it is due to that the node A of the portal A does not aware of dropping of the node D. Such mismatching may be solved by notifying the portal A of the dropping of the node D by generating the bus reset to the portal A when the node A accesses the node D. When there is no access after the node D is dropped and the node D is connected again, the ID conversion table 531 is updated as mentioned previously. However, there is no need of notifying the portal A of the bus reset, provided that there is no change of the root.

When the bus reset occurs in the portal A, there is basically no need of notifying the portal B of the bus reset. However, it is necessary to issue the bus reset to the portal B only a case where the state of the registered nodes is transmitted to the portal B such as a case where the content of the configuration ROM of the registered node of the portal A is changed.

A packet from the registered node connected to the portal A to the side of the portal B is received by the local bus bridge 1 and the local bus bridge 1 sends the acknowledge packet (pending) thereto. The local bus bridge 1 transmits the received packet to the portal B after converting its ID to an ID for the portal B.

When the local bus bridge 1 receives the acknowledge packet on the portal B side, the local bus bridge 1 generates an acknowledge packet and sends it to the portal A side. When the communication in the portal B is the split it transaction, an acknowledge packet is transmitted from a node of the portal B. The local bus bridge 1 receives that packet and transmits the acknowledge packet (pending). Simultaneously, it transmits the packet to the registered node on the portal A side by converting its ID.

The registered node transmits an acknowledge packet for the confirm packet. The local bus bridge 1 receives the acknowledge packet and generates and transmits a confirm packet to the portal B side. With respect to the packet from a node connected to the portal A to the local bus bridge 1, the CSR control portion 54 responds thereto with a unified transaction if it is an access of the CSR. Otherwise, the communication is ended by returning a confirm packet (address error).

As to a packet from a node other than registered node of the portal A to a node of the portal B, the communication is ended by returning a confirm packet (address error) by the local bus bridge 1.

When the local bus bridge 1 is accessed by a node connected to the portal B, the local bus bridge 1 responds thereto by the unified transaction in the CSR control portion 54 if the access is to the CSR. Otherwise, it returns a confirmatory packet (pending) temporarily and then transfers it to the portal A.

Thereafter, when the confirmatory packet from the portal is other than busy and pending, the local bus bridge 1 completes the split it transaction by automatically generating a response packet corresponding thereto and transmitting it to the portal A.

If the confirmatory packet from the portal A is busy, the local bus bridge 1 transmits the same packet to the portal A again. If the confirmatory packet is pending, the local bus bridge 1 entrusts it to the response packet from the portal A and the local bus bridge does not transmit a response packet to the portal B. The transfer method of packet from the portal A to the portal B is the same as that mentioned previously.

Now, the cycle start packet will be described. As mentioned previously, the local bus bridge 1 becomes a root node without fail in the portal A. However, in the portal B, the local bus bridge 1 does not always become a root node for every bus reset. The operation of the local bus bridge 1 in the portal B when it is a root node is different from that when it is not a root node.

When the local bus bridge 1 becomes the root node in the portal B, it transmits the cycle start packet to the portal B with the timing of cycle start and, after a constant time from the transmission of the cycle start packet, the local bus bridge transmits the cycle start packet to the portal A. When the local bus bridge 1 does not become the root node in the portal B, it receives the cycle start packet on the portal B side and starts a transmission of the cycle start packet to the portal A at a time when the receiving of the cycle start packet is completed. Thus, a difference in the cycle start timing between the portal A and the portal B disappears regardless of whether or not the local bus bridge becomes the root node in the portal B.

In the buses around the local bus bridge 1, the cycle start packets flow with the above-mentioned timing. Therefore, the transfer of the isochronous packet from the portal B to the portal A is realized by transmitting it simultaneously with receiving it. However, since, in transferring the isochronous packet from the portal A to the portal B, there is a possibility that the subaction gap is detected in the portal B side at a time when the portal A receives the isochronous packet, the isochronous packet for one cycle is stored in the FIFO and starts a transmission thereof by waiting for a next cycle start packet.

At present, almost all IEEE1394 equipment can not correspond to the bridge according to P1394.1 standard. This is because the P1394.1 standard has no practical definition in IEEE1394-1995 and IEEE1394a-2000 and, when the equipment based on these standards receives a packet having BUS ID, which does not indicate the local bus, it can not react thereto.

However, by providing the local bus bridge of the present invention between the IEEE1394 equipments to transfer a packet from the portal B to the portal A by converting the BUS ID of the PHY IDs, which indicates the destination, into the local bus, the equipments, which can not correspond to the bridge, can be connected to the bridge.

In another embodiment, which has substantially the same construction as that of the previous embodiment, the present invention is applied to a case where there is a repeater in the portal B. Although it is usual to assign a node ID to the repeater, a function thereof can be thought as an extension of a cable. That is, in the IEEE1394 local bus bridge, it is not necessary to notify the portal A of the node ID of the repeater. Therefore, the case where the repeater exists in the portal B will be described.

Figure 33:
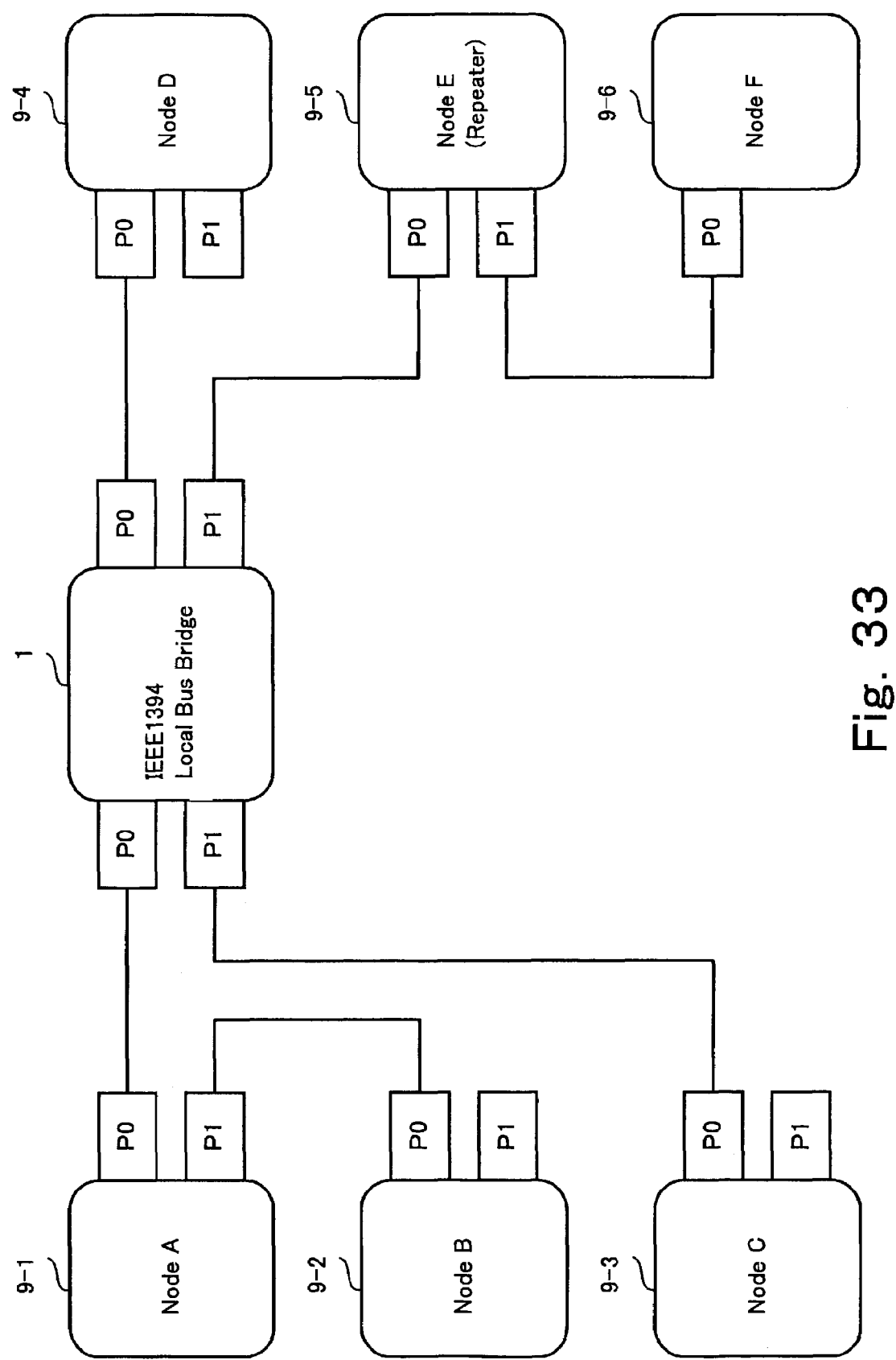
FIG. 33 shows a connection in a case where a repeater exists, in another embodiment of the present invention.
Figure 34:
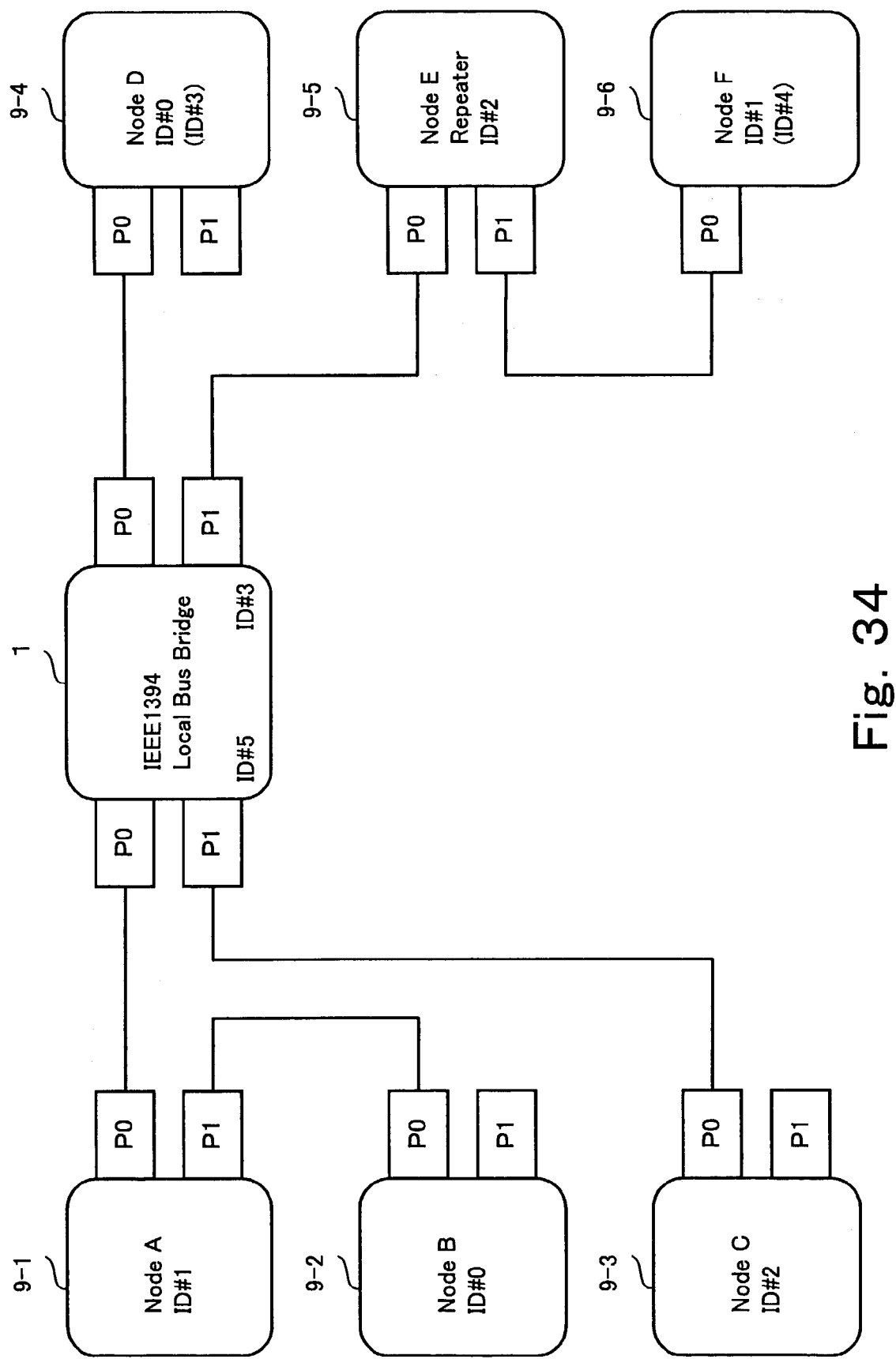
FIG. 34 shows the node ID in the case where the repeater exists, in the another embodiment of the present invention.
Figure 35:
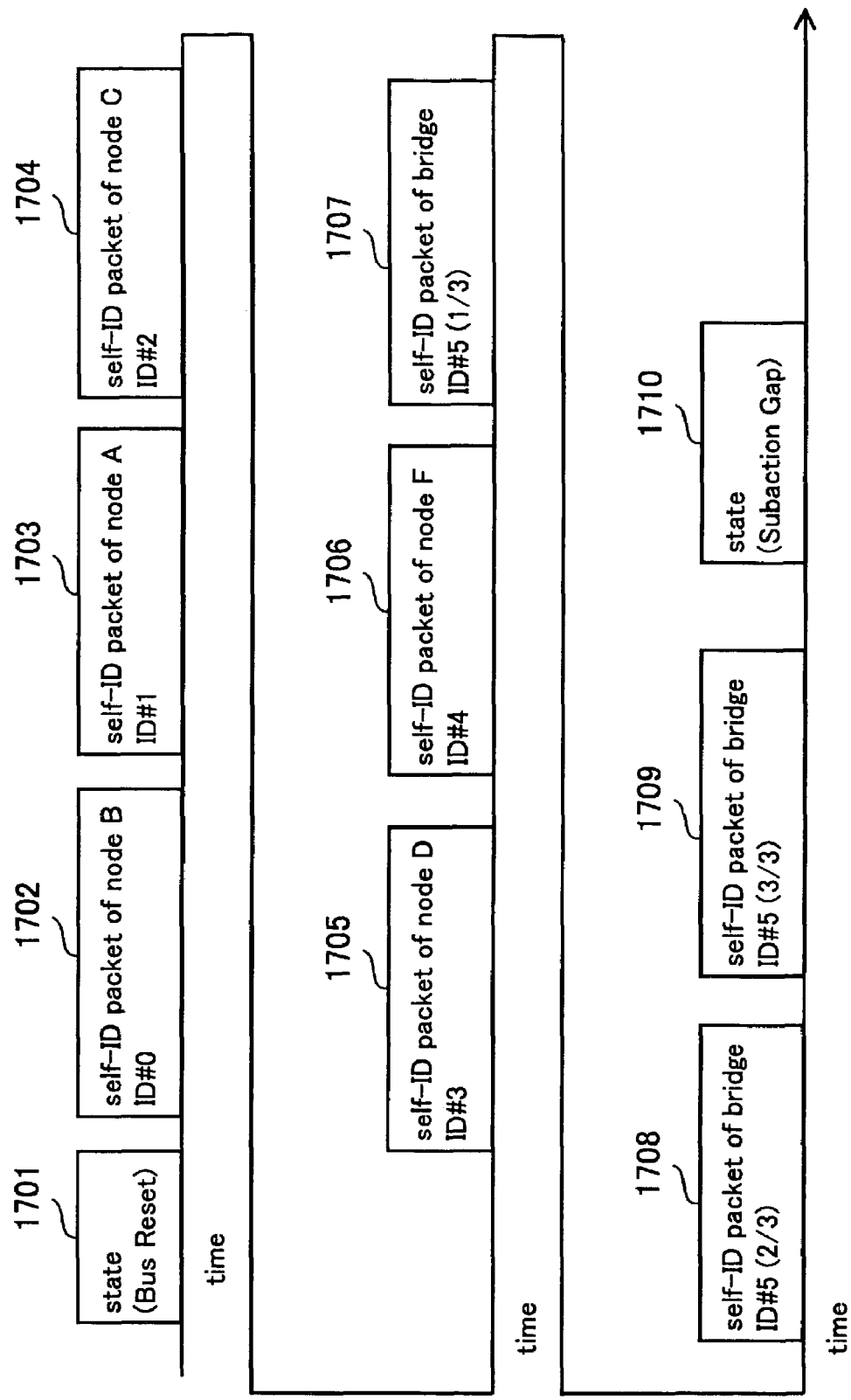
FIG. 35 shows a flow from an issuance of an initial bus reset to an end of the self identification phase in the case where the repeater exists, in the another embodiment of the present invention.

FIG. 33 shows a connection when there is the repeater in this embodiment of the present invention, FIG. 34 shows the node ID when there is the repeater in this embodiment and FIG. 35 shows a flow an issuance of the bus reset to an end of the self identification phase when there is the repeater.

Figure 37:
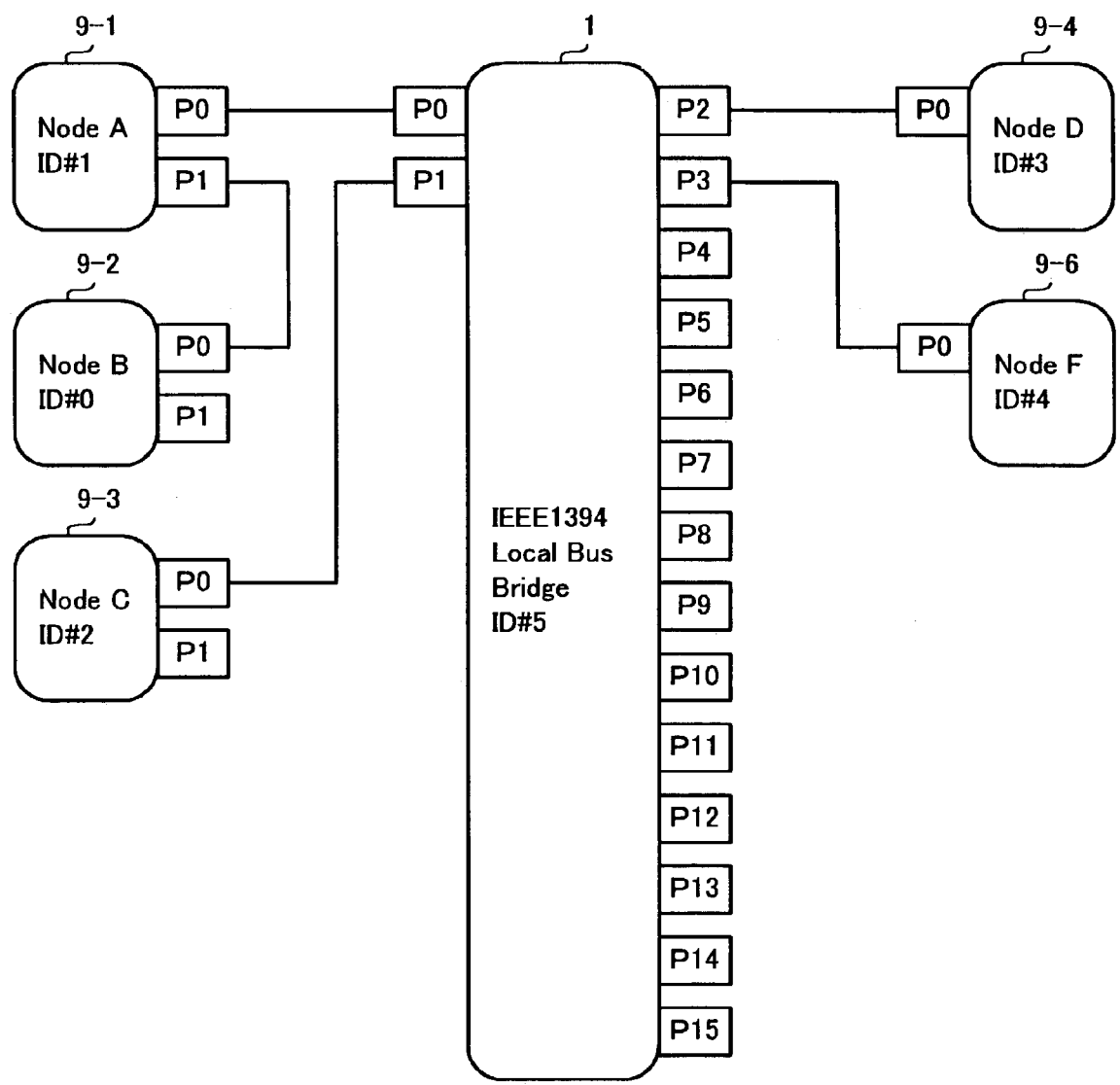
FIG. 37 shows a connection looked from the portal A when the repeater exists in the another embodiment of the present invention.
Figure 38:
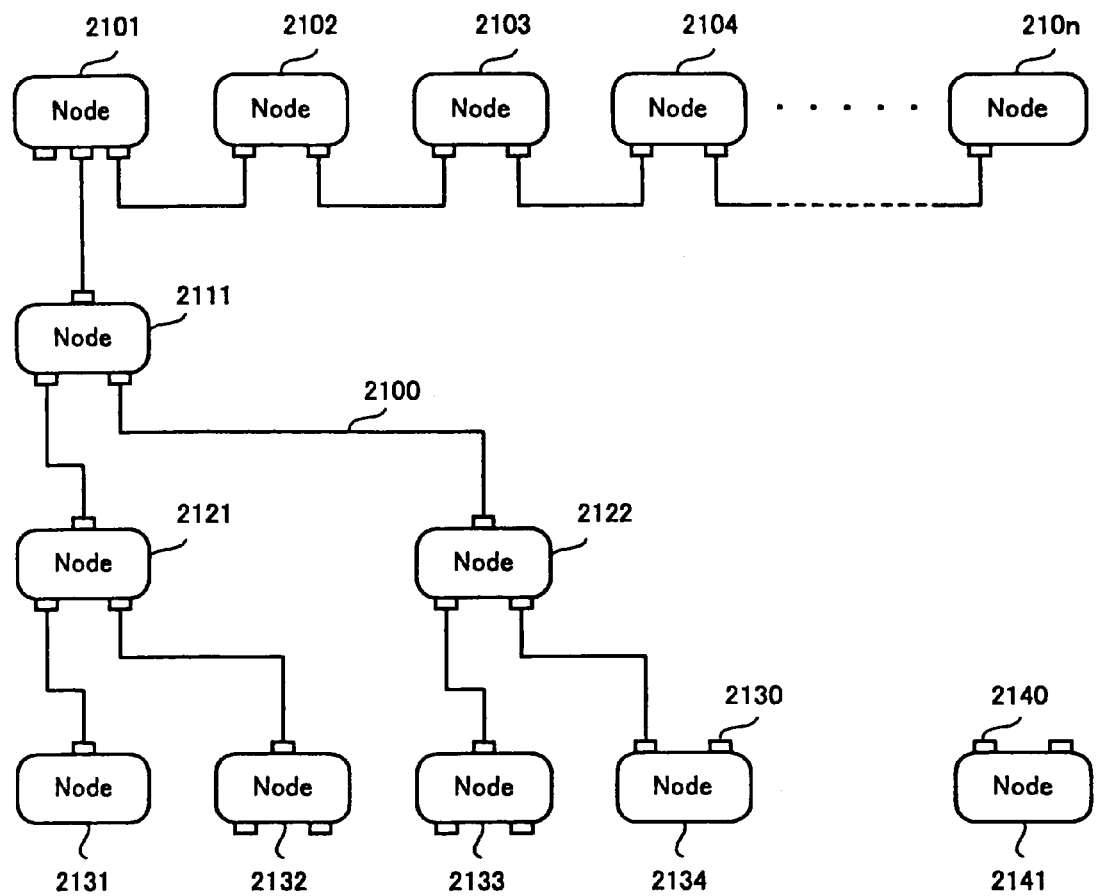
FIG. 38 shows an example of a network constructed with using the IEEE1394 bus.
Figure 39:
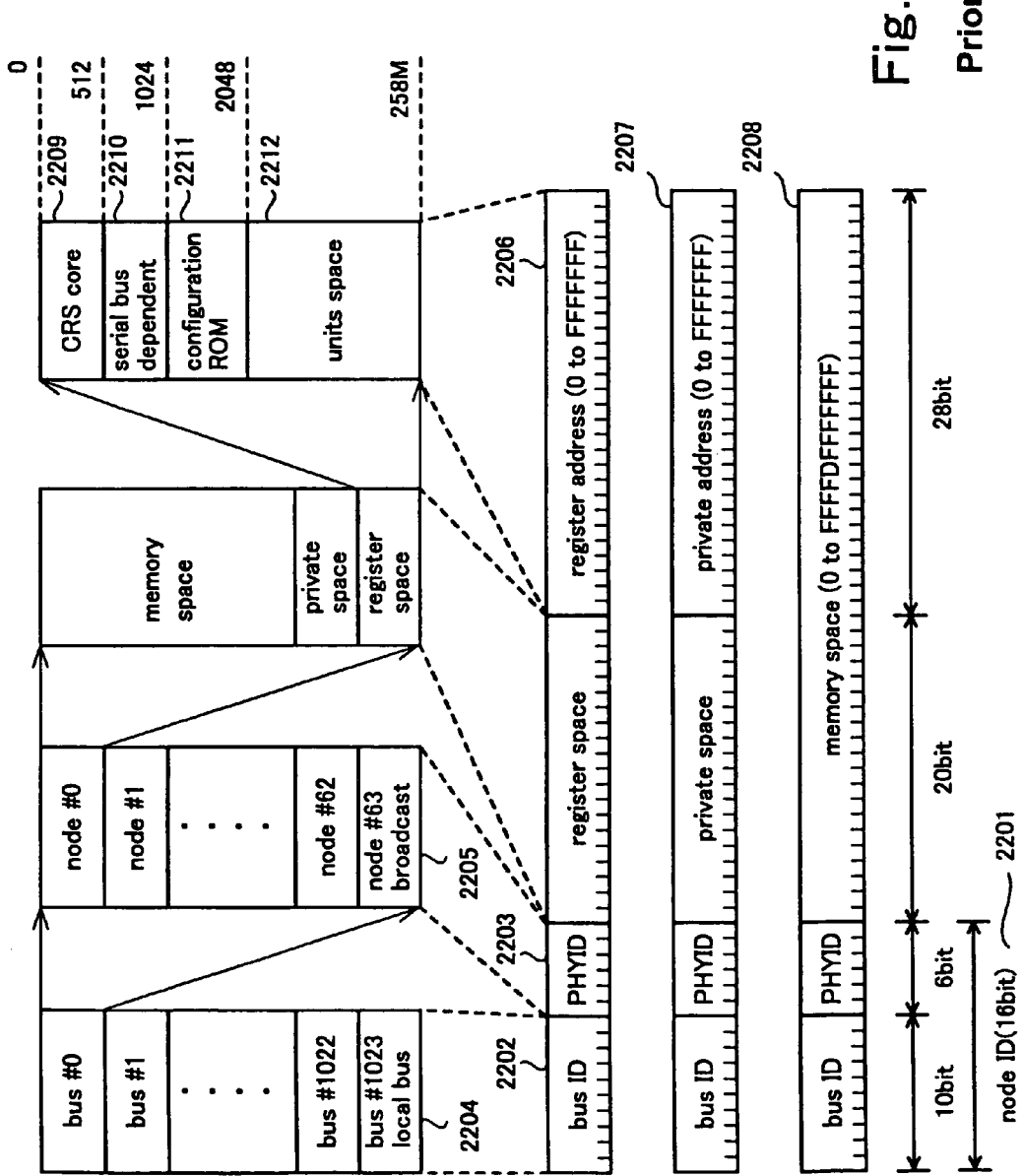
FIG. 39 shows an address map of the IEEE1394.
Figure 40:
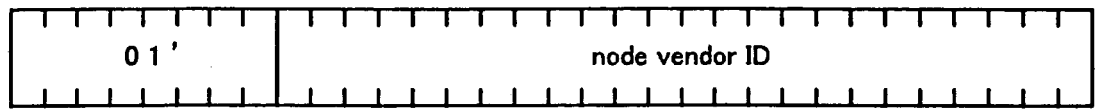
FIG. 40 shows a content of a configuration ROM of the minimum format including only a company ID.
Figure 41:
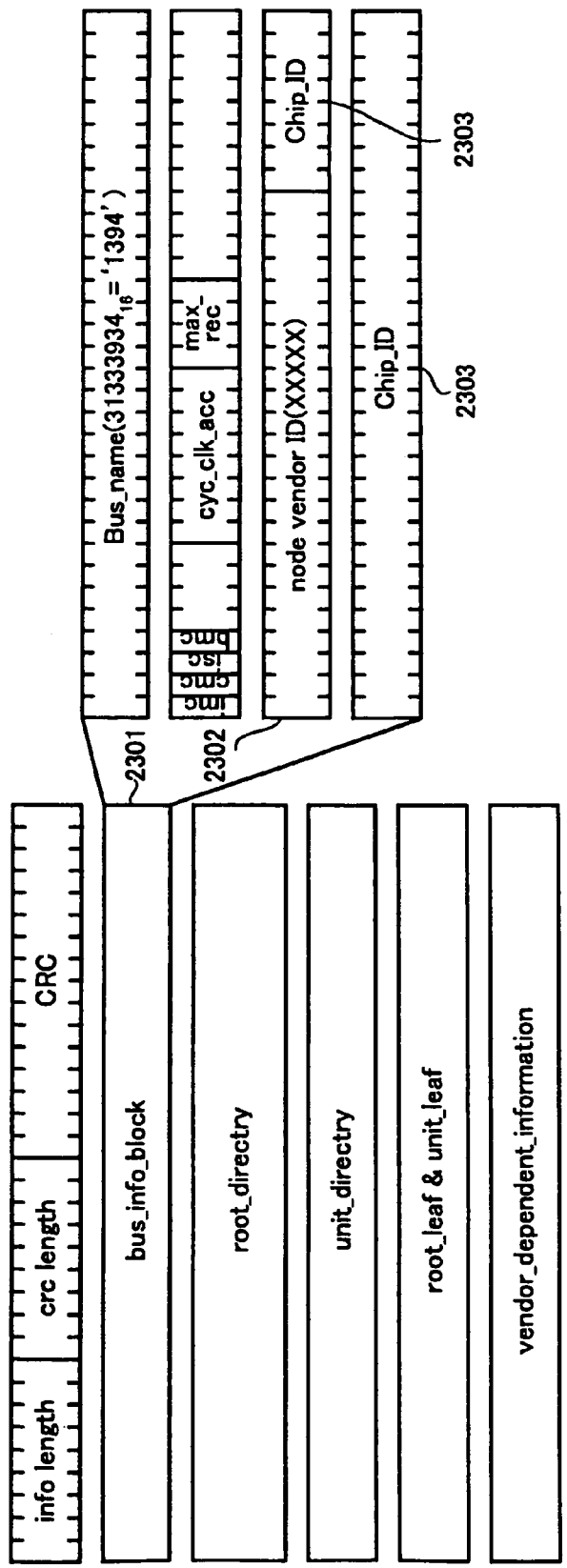
FIG. 41 shows a content of a configuration ROM in the general format.

Further, FIGS. 36A to 36H show a detailed construction of the self-ID packets in the respective nodes at a time when the bus reset is issued where there is the repeater in this embodiment and FIG. 37 shows a connection looked from the portal A when there is the repeater in this embodiment. This embodiment of the present invention will be described with reference to FIG. 33 to FIG. 37.

It is assumed that the node E is the repeater as shown in FIG. 33. As described previously, the local bus bridge 1 confirms the topology of the portal A, confirms the topology of the portal B and then transmits the topology of the portal B to the portal A. These successive operations are basically the same as those in the previous embodiment. A difference from the previous embodiment is that, in confirming the topology of the portal B, the existence of the repeater is confirmed and, in transmitting the topology of the portal B to the portal A, the existence of the repeater is not transmitted to the portal A.

The confirmation of whether or not the node is a repeater can be done by checking an L bit of the self-ID packet. In the case where the node is the repeater, the L bit is inactive. In checking the topology of the portal B, the local bus bridge 1 checks the L bit of the self-ID packet. If this bit is inactive, it is not registered in the ID conversion table 531.

In the practical topology, the node ID #2 is assigned to the node E in the portal B as shown in FIG. 34. However, since the node E is the repeater, the self-ID packet is transmitted when the topology of the portal B is transmitted to the portal A, as shown in FIG. 35 and FIGS. 36A to 36H.

FIG. 35 shows a flow from a generation of the bus reset to an end of self identification phase in time series. FIGS. 36A to 36H show the self-ID packet PKT0 of the node B, the self-ID packet PKT1 of the node A, the self-ID packet PKT2 of the node C, the self-ID packet PKT3 of the node D, the self-ID packet PKT4 of the node F and the self-ID packets PKT5, PKT6 and PKT7 of the local bus.

First, the local bus bridge 1 issues the bus reset to the portal A. When the bus reset is generated, the self identification phase of the portal A is started. This operation is basically the same as that described above. When the bus reset occurs on the local bus of the portal A, a state (Bus Reset) 1701 announcing the start of bus reset is transmitted from the PHY and the construction of the topology is performed within the portal A.

Thereafter, the self identification phase of the portal A is started. The self-ID packets are transmitted in the sequence of the self-ID packet (ID #0) 1702 of the node B, the self-ID packet (ID #1) 1703 of the node A and the self-ID packet (ID #2) 1704 of the node C.

When the local bus bridge 1 receives the self-ID packets of the respective nodes in the portal A, the local bus bridge 1 transmits the self-ID packet (ID #3) 1705 of the node D, the self-ID packet (ID #4) 1706 of the node F and the self-ID packets ID #5(1/3) 1707, ID #5(2/3) 1708 and ID #5(3/3) 1709 thereof.

FIGS. 36A to 36H show the detailed constructions thereof. What is important here is to not transmit the self-ID packet of the node E. When a predetermined time lapses from the transmission of the self-ID packets from the local bus bridge, a state (Subaction Gap) 1710 is transmitted from the PHY and the self identification phase is ended. By the self identification phase of the portal A, the information of the portal B is transmitted to the portal A.

FIG. 37 shows a topology image looked from the portal A. In FIG. 37, the node IDs of the nodes A, B and C become #1, #0 and #2, respectively. Thereafter, the node D is connected to the port P2 of the local bus bridge 1 and the node ID thereof becomes #3, the node F is connected to the port P3 of the local bus ridge 1 and the node ID thereof becomes #4 and the node ID of the local bus bridge 1 becomes #5.

Thus, the node E is made looks like absent and other virtual ports are made look like connected to nothing. By transmitting the topology of the portal B to the portal A in this manner, it becomes possible in the portal A to remove the repeater on the portal B to thereby efficiently use the node ID of the portal B.

The local bus bridge according to each of the described embodiments can be realized by either the hardware except portions specific thereto such as the dedicated PHY or the firmware.

Further, the local bus bridge of the present invention can be realized in not only the IEEE1394 system but also a system, which forms a similar serial network. It should be noted that the present invention is not limited to the described embodiments. It is clear for those skilled in the art that these embodiments can be modified within the scope of the technical concept of the present invention.

In the present invention, it is possible to divide a bus to local buses by the IEEE1394 local bus bridge 1 without changing the BUS ID and the nodes connected to the local buses can mutually identify without being unconscious of the division of the bus.

Further, in the present invention, the local bus bridge 1 behaves as a specific node connected to one of the local buses with respect to the other local bus to hide other nodes. Therefore, the specific node can occupy nodes connected to the one local bus.

Further, in the present invention, the local bus bridge 1 divides the bus reset and automatically notifies the local bus in which the bus reset occurs of an information of nodes connected to the other local bus. Therefore, it is possible to avoid degradation of utilization efficiency of the both local buses.

Further more, in the present invention, a packet closed in one of the local buses is not transmitted to the other local bus. Therefore, it is possible to improve the utilization efficiency of the both local buses.

As describe hereinbefore, the local bus bridge of the present invention including a first and second local buses to each of which a plurality of nodes are connected notifies the first local bus, to which a preliminarily set specific node is connected, of a connection information of the second local bus and provides only an information of the specific node to the second local bus. Therefore, it is possible to provide an environment in which the specific node reliably occupies the nodes connected to the IEEE1394 bus.

Further, according to another embodiment, the local bus bridge of the present invention, which includes a first and second local buses to each of which a plurality of nodes are connected, notifies the first local bus, to which a preliminarily set specific node is connected, of a connection information of the second local bus and provides only an information of the specific node to the second local bus. Therefore, it is possible to provide an environment in which the nodes connected to the local buses can mutually identify regardless of the division of the bus.

What is claimed is:

1. A local bus bridge for mutually connecting a first local bus and a second local bus provided by dividing a serial bus and each having a plurality of nodes connected thereto, comprising:

means for notifying said first local bus, to which a preliminarily set specific node among said plurality of nodes of said first local bus is connected, of connection information of said second local bus; and means for providing only information of said specific node to said second local bus;

wherein said first local bus and said second local bus have a same bus ID.

2. A local bus bridge as claimed in claim 1, wherein said local bus bridge becomes a root node without fail in said first local bus.

3. A local bus bridge as claimed in claim 1, further comprising:

ID conversion means for performing an ID conversion in order to allow a mutual data transfer between a node connected to said first local bus and a node connected to said second local bus.

4. A local bus bridge as claimed in claim 3, wherein said ID conversion means analyzes topologies of each of said first and second local buses to manage ID information of said plurality of nodes connected to said first and second local buses.

5. A local bus bridge as claimed in claim 3, wherein said ID conversion means includes:

an ID conversion table for managing the information of said specific node connected to said first local bus and the information of said plurality of nodes connected to said second local bus, the data transfer between said specific node and said plurality of nodes connected to said second local bus being possible by using said ID conversion table.

6. A local bus bridge as claimed in claim 5, wherein said ID conversion table performs the management by using ID numbers peculiar to said specific node and said plurality of nodes connected to said second local bus.

7. A local bus bridge as claimed in claim 6, wherein said ID numbers are node vendor IDs and chip IDs.

8. A local bus bridge as claimed in claim 5, wherein said ID conversion table manages transfer performances of said specific node and said plurality of nodes connected to said second local bus to make a transfer speed of said specific node and said plurality of nodes connected to said second local bus appropriate.

9. A local bus bridge as claimed in claim 5, wherein said ID conversion table maintains a matching between said first and second local buses by absorbing changes of the topologies of said first and second local buses due to a bus reset for initializing a network in said ID conversion table.

10. A local bus bridge as claimed in claim 5, wherein said local bus bridge issues the bus reset when a mismatching, which cannot be absorbed by said ID conversion table, occurs between said first and second local buses to reconstruct the topologies.

11. A local bus bridge as claimed in claim 1, wherein said local bus bridge behaves as a substitute for said specific node with respect to an access from any of said plurality of nodes connected to said second local bus to said specific node.

12. A local bus bridge as claimed in claim 1, wherein a topology of said second local bus is formed by assigning the topology to a virtual port and the topology is transmitted to said first local bus.

13. A local bus bridge as claimed in claim 1, wherein, when the topology of said second local bus is transmitted to said first local bus, said local bus bridge generates a self-ID packet and transmits the self-ID packet to said first local bus.

14. A local bus bridge as claimed in claim 1, wherein an information of a repeater in said second local bus is excluded from the topology and the topology is transmitted to said first local bus.

15. A local bus bridge as claimed in claim 1, wherein said local buses are IEEE1394 local buses, respectively.

16. A method for mutually connecting a first local bus and a second local bus with a local bus bridge, said first local bus and said second local bus provided by dividing a serial bus, said first local bus connected to a first plurality of nodes, said second local bus connected to a second plurality of nodes, said method comprising:

notifying said first local bus, to which a preliminarily set specific node among said first plurality of nodes is connected, of connection information of said second local bus; and providing only information of said specific node to said second local bus;

wherein said first local bus and said second local bus have a same bus ID.

17. The method of claim 16, further comprising:

performing an ID conversion in order to allow a mutual data transfer between a first node connected to said first local bus and a second node connected to said second local bus.

18. The method of claim 16, further comprising:

analyzing topologies of said first and second local buses to manage ID information of said first plurality of nodes and said second plurality of nodes.

* * * * *